US012508057B2

(12) United States Patent
Nycz et al.

(10) Patent No.: US 12,508,057 B2
(45) Date of Patent: Dec. 30, 2025

(54) IMPLANT SYSTEMS, PLATES, BONE FUSION SYSTEMS, AND METHODS EMPLOYING SAME

(71) Applicant: TRIQUEUE HOLDINGS, LLC, Winona Lake, IN (US)

(72) Inventors: Jeffrey Nycz, Warsaw, IN (US); Jon C. Serbousek, Winona Lake, IN (US); Richard G. Fessler, Lake Forest, IL (US)

(73) Assignee: TRIQUEUE HOLDINGS, LLC, Winona Lake, IN (US)

( * ) Notice: Subject to any disclaimer, the term of this patent is extended or adjusted under 35 U.S.C. 154(b) by 626 days.

(21) Appl. No.: 17/214,036

(22) Filed: Mar. 26, 2021

(65) Prior Publication Data

US 2021/0212737 A1 Jul. 15, 2021

Related U.S. Application Data

(63) Continuation of application No. PCT/US2019/053220, filed on Sep. 26, 2019.

(60) Provisional application No. 62/737,169, filed on Sep. 27, 2018.

(51) Int. Cl.
*A61B 17/80* (2006.01)
*A61B 17/70* (2006.01)

(52) U.S. Cl.
CPC ........ *A61B 17/808* (2013.01); *A61B 17/7059* (2013.01)

(58) Field of Classification Search
CPC . A61B 17/808; A61B 17/809; A61B 17/7059; A61B 17/7062; A61B 17/7067; A61B 17/707; A61F 2/4455
See application file for complete search history.

(56) References Cited

U.S. PATENT DOCUMENTS

| 4,987,892 A | 1/1991 | Krag et al. |
| 5,027,793 A | 7/1991 | Englehardt et al. |
| 5,057,109 A | 10/1991 | Olerud |

(Continued)

FOREIGN PATENT DOCUMENTS

| WO | 9629947 A1 | 10/1996 |
| WO | 2004008949 A2 | 1/2004 |

(Continued)

OTHER PUBLICATIONS

Extended European Search Report issued in European Patent Application No. 19864253.0, Jun. 9, 2022, 9 pages.

(Continued)

*Primary Examiner* — Eduardo C Robert
*Assistant Examiner* — Holly Joanna Lane
(74) *Attorney, Agent, or Firm* — Heslin Rothenberg Farley & Mesiti P.C.; Jacquelyn A. Graff, Esq.

(57) ABSTRACT

Implant systems in some embodiments such as midline incision implant systems may generally include an insertion guide assembly and a plate, which define fixation trajectories. In other embodiments such as a percutaneous implant system may generally include a first a plate, an insertion guide, and a separate second insertion guide, which define fixation trajectories. Surgical methods include use of the implant systems with the plates, and use of plates alone, for installing bone fusion systems.

13 Claims, 64 Drawing Sheets

(56) References Cited

U.S. PATENT DOCUMENTS

| | | | |
|---|---|---|---|
| 5,364,399 A * | 11/1994 | Lowery | A61B 17/1728 606/295 |
| 5,540,688 A | 7/1996 | Navas | |
| 5,562,737 A | 10/1996 | Graf | |
| 5,766,252 A | 6/1998 | Henry et al. | |
| 6,017,345 A | 1/2000 | Richelsoph | |
| 6,331,179 B1 | 12/2001 | Freid et al. | |
| 6,514,253 B1 | 2/2003 | Yao | |
| 6,613,090 B2 | 9/2003 | Fuss et al. | |
| 7,537,596 B2 | 5/2009 | Jensen | |
| 7,628,816 B2 | 12/2009 | Magerl | |
| 7,635,380 B2 | 12/2009 | Zucherman et al. | |
| 7,766,943 B1 | 8/2010 | Fallin et al. | |
| 7,951,178 B2 * | 5/2011 | Jensen | A61B 17/8057 606/291 |
| 7,967,851 B2 | 6/2011 | Bickley et al. | |
| 8,025,681 B2 | 9/2011 | Colleran et al. | |
| 8,231,627 B2 | 7/2012 | Huebner et al. | |
| 8,377,099 B1 | 2/2013 | Stauber | |
| 8,480,716 B2 | 7/2013 | Perrow et al. | |
| 8,591,513 B2 | 11/2013 | Overes et al. | |
| 9,044,272 B2 | 6/2015 | Shaffrey et al. | |
| 9,060,808 B2 | 6/2015 | Overes et al. | |
| 9,084,618 B2 | 7/2015 | Serbousek et al. | |
| 9,149,316 B2 | 10/2015 | Appenzeller et al. | |
| 9,198,696 B1 | 12/2015 | Bannigan et al. | |
| 9,204,911 B2 | 12/2015 | Overes et al. | |
| 9,289,220 B2 | 3/2016 | Wolfe et al. | |
| 9,480,507 B2 | 11/2016 | Overes et al. | |
| 9,636,154 B2 | 5/2017 | Overes et al. | |
| 9,987,024 B2 | 6/2018 | Frey et al. | |
| 2003/0100904 A1 | 5/2003 | Biedermann | |
| 2004/0176852 A1 * | 9/2004 | Zubok | A61F 2/4611 623/17.11 |
| 2004/0204711 A1 | 10/2004 | Jackson | |
| 2004/0230304 A1 | 11/2004 | Yuan et al. | |
| 2005/0015093 A1 | 1/2005 | Suh | |
| 2005/0197700 A1 | 9/2005 | Boehm, Jr. et al. | |
| 2005/0228376 A1 | 10/2005 | Boomer et al. | |
| 2006/0058796 A1 * | 3/2006 | Hartdegen | A61B 17/7059 606/291 |
| 2006/0189996 A1 | 8/2006 | Orbay et al. | |
| 2006/0189997 A1 | 8/2006 | Guenther et al. | |
| 2006/0241600 A1 | 10/2006 | Ensign et al. | |
| 2006/0241646 A1 | 10/2006 | Stihl | |
| 2006/0264941 A1 | 11/2006 | Lins | |
| 2007/0043355 A1 | 2/2007 | Bette et al. | |
| 2007/0055249 A1 | 3/2007 | Jensen et al. | |
| 2007/0198014 A1 | 8/2007 | Graf et al. | |
| 2007/0233094 A1 | 10/2007 | Colleran et al. | |
| 2008/0177306 A1 | 7/2008 | Lanx | |
| 2008/0183214 A1 | 7/2008 | Copp et al. | |
| 2008/0255618 A1 | 10/2008 | Fisher et al. | |
| 2009/0012529 A1 | 1/2009 | Blain | |
| 2009/0088799 A1 | 4/2009 | Yeh | |
| 2009/0088800 A1 | 4/2009 | Blain et al. | |
| 2009/0149861 A1 | 6/2009 | Brodsky et al. | |
| 2009/0234455 A1 | 9/2009 | Moskowitz | |
| 2009/0312798 A1 | 12/2009 | Varela | |
| 2010/0004691 A1 * | 1/2010 | Amato | A61B 17/808 606/280 |
| 2010/0069972 A1 | 3/2010 | Jones et al. | |
| 2010/0094345 A1 | 4/2010 | Saidha et al. | |
| 2010/0145397 A1 | 6/2010 | Overes et al. | |
| 2010/0152745 A1 | 6/2010 | Dudasik et al. | |
| 2010/0211074 A1 | 8/2010 | Hansson | |
| 2010/0228292 A1 | 9/2010 | Arnold et al. | |
| 2010/0274248 A1 * | 10/2010 | Overes | A61B 17/8023 606/71 |
| 2011/0034957 A1 | 2/2011 | Biedermann | |
| 2011/0184470 A1 | 7/2011 | Gorek et al. | |
| 2011/0264225 A1 | 10/2011 | Michelson | |
| 2011/0282387 A1 | 11/2011 | Suh et al. | |
| 2011/0282397 A1 | 11/2011 | Richter et al. | |
| 2012/0059425 A1 | 3/2012 | Biedermann | |
| 2012/0089191 A1 | 4/2012 | Altarac et al. | |
| 2012/0184993 A1 | 7/2012 | Arambula et al. | |
| 2012/0197401 A1 | 8/2012 | Duncan | |
| 2012/0226319 A1 * | 9/2012 | Armstrong | A61B 17/808 606/279 |
| 2012/0271312 A1 | 10/2012 | Jansen | |
| 2013/0041375 A1 | 2/2013 | Fierlbeck et al. | |
| 2013/0211462 A1 | 8/2013 | Walker | |
| 2013/0261673 A1 * | 10/2013 | Hawkins | A61B 17/8057 606/286 |
| 2014/0058450 A1 | 2/2014 | Arlet | |
| 2014/0188223 A1 | 7/2014 | Jensen et al. | |
| 2014/0243898 A1 | 8/2014 | Fessler | |
| 2014/0249591 A1 | 9/2014 | Peultier et al. | |
| 2014/0277145 A1 | 9/2014 | Reitblat et al. | |
| 2016/0199104 A1 | 7/2016 | Ewer et al. | |
| 2016/0278815 A1 | 9/2016 | Fitzpatrick | |
| 2017/0071750 A1 | 3/2017 | Urban et al. | |
| 2017/0135706 A1 * | 5/2017 | Frey | A61B 17/1671 |
| 2017/0238980 A1 | 8/2017 | Lauf et al. | |
| 2017/0325845 A1 | 11/2017 | Donner et al. | |
| 2017/0340358 A1 | 11/2017 | Bullard | |
| 2019/0183532 A1 * | 6/2019 | Serbousek | A61B 17/1757 |
| 2021/0113249 A1 | 4/2021 | Shoemaker | |

FOREIGN PATENT DOCUMENTS

| | | |
|---|---|---|
| WO | 2005072631 A1 | 8/2005 |
| WO | 2007149426 A2 | 12/2007 |
| WO | 2008089298 A2 | 7/2008 |
| WO | 2011155931 A1 | 12/2011 |
| WO | 2013169306 A1 | 11/2013 |
| WO | 2016044845 A1 | 3/2016 |
| WO | 2018035175 A1 | 2/2018 |

OTHER PUBLICATIONS

International Search Report and Written Opinion of the International Searching Authority for International Application No. PCT/US2019/053220 mailed on Dec. 11, 2019.

International Preliminary Report on Patentability for International Searching Authority for International Application No. PCT/US2019/053220 completed on Nov. 12, 2020.

Partial Supplementary European Search Report for European Patent Application No. 17842027.9 dated Mar. 6, 2020.

International Search Report and Written Opinion of the International Searching Authority for International Application No. PCT/US2015/051254 mailed on Dec. 28, 2015.

Corrected International Search Report and Written Opinion of the International Searching Authority for International Application No. PCT/US2015/051254 mailed on Feb. 1, 2016.

Extended European Search Report for European Patent Application No. 19179283.7 dated Oct. 23, 2019.

Office Action for Brazilian Patent Application No. BR 11 2017 005408 6 dated Apr. 8, 2020.

Examination Report No. 1 for Australian Patent Application No. 2015317308 dated May 17, 2019.

Examination Report No. 2 for Australian Patent Application No. 2015317308 dated Apr. 30, 2020.

* cited by examiner (incorrect)

(correct)

(incorrect)

(correct)

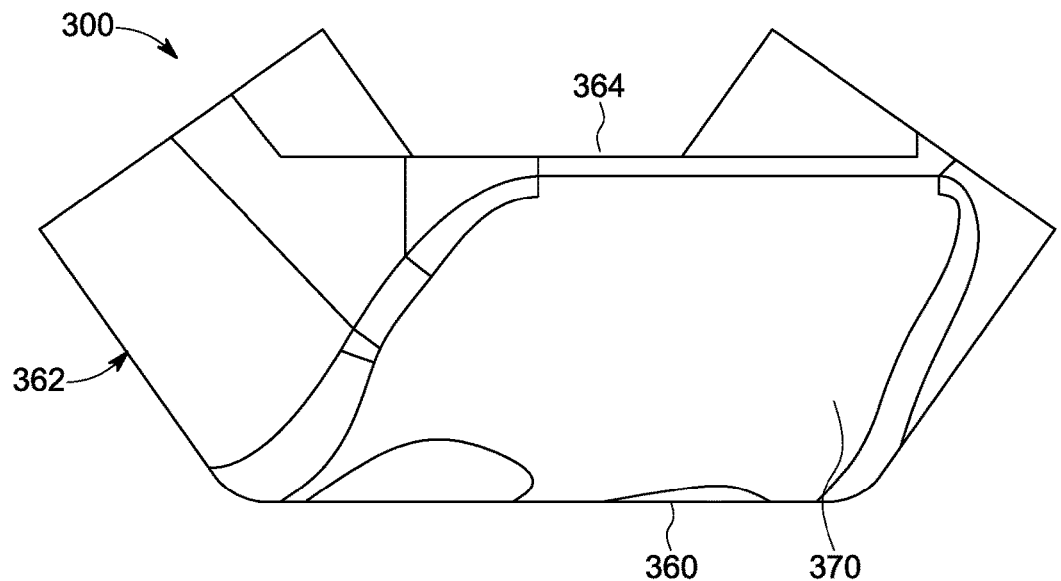
FIG. 72
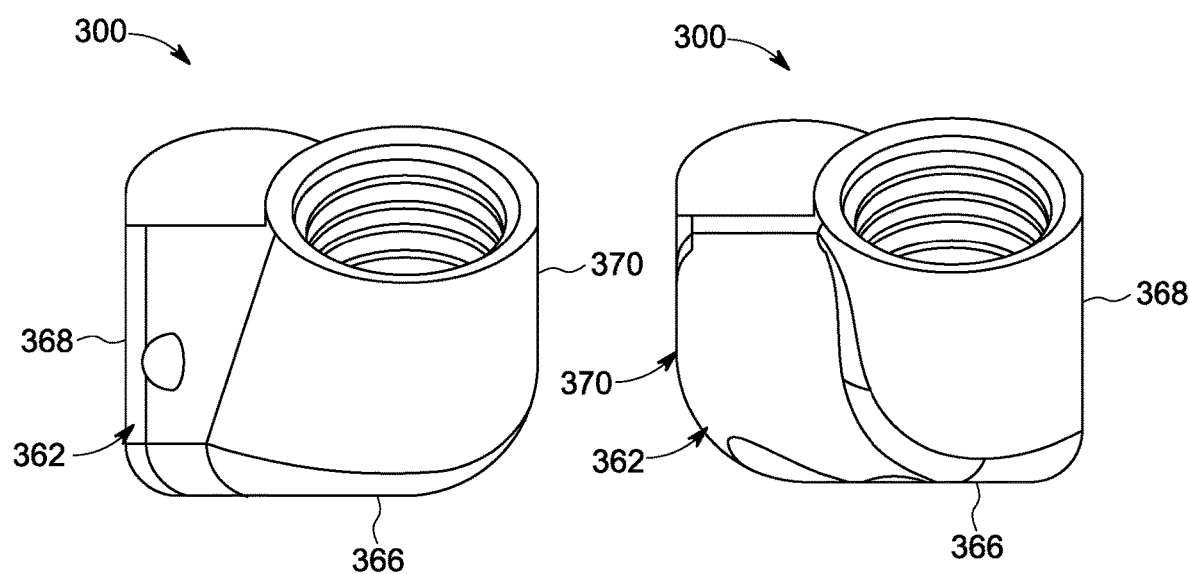
FIG. 73
FIG. 74

IMPLANT SYSTEMS, PLATES, BONE FUSION SYSTEMS, AND METHODS EMPLOYING SAME

CROSS-REFERENCE TO RELATED APPLICATIONS

This application claims priority benefit from International Application No. PCT/US2019/053220 filed on Sep. 26, 2019, entitled "Implant Systems, Plates, Bone Fusion Systems, and Methods Employing Same", which claimed priority from U.S. Provisional Application No. 62/737,169 filed Sep. 27, 2018, entitled "Implant Systems, Plates, Bone Fusion Systems, and Methods Employing Same" each of which is incorporated herein by reference in its entirety.

This application is a continuation-in-part application of U.S. patent application Ser. No. 16/273,567 filed Feb. 12, 2019, entitled "Bone Fusion Device, System And Methods", which application is a continuation of International Application No. PCT/US2017/047035 filed on Aug. 15, 2017, entitled "Bone Fusion Device, System And Methods" and published under the PCT Articles in English as WO 2018/035175 on Feb. 22, 2018, which application claimed priority from U.S. provisional application No. 62/375,114 filed Aug. 15, 2016, entitled "Bone Fusion Device, System And Methods", each of which applications is incorporated herein by reference in its entirety.

FIELD OF THE INVENTION

The present disclosure relates generally to general surgery, orthopaedic and neurosurgical implants used for insertion within a patient's vertebrae. More specifically, but not exclusively, the present disclosure related to implant systems having a plate or an implant operable with insertion guides for establishing screw trajectories in a patient's spine. The plate or implant may also be operable in a bone fusion system with fixations elements and devices such as screws to maintain or re-establish proper spacing and alignment of a patient's spine. As used herein the term plate, implant, body, member may be used interchangeably and are not to be limiting.

BACKGROUND OF THE INVENTION

Spinal deformities may result from disease, age, or trauma causing destabilization of the spine. To correct destabilization of a patient's spine, fusion devices and systems may be used. Posterior lumbar spinal fusion with pedicle screws is the most common way to fuse a patient's spine. However, the pedicle screw fusion and surgical technique used for these fusions has not changed in the last 30 to 40 years. Moreover, the large number of necessary parts and pieces involved to complete these fusions increases risk, surgical time, potential for construct failure, and cost.

When a patient presents with a spondylolisthesis or a displacement of a spinal vertebra in relation to the vertebra below, which needs to be fixed prior to inserting stabilization devices, for example, screws. Thus, improved fusion and/or fixation devices, systems and instrumentation are needed.

SUMMARY OF THE INVENTION

Aspects of the present disclosure provide bone fusion devices, systems, instruments and methods of using the same.

Shortcomings of the prior art are overcome and additional advantages are provided through the provision in one embodiment of an insertion guide assembly for use in implanting a plate in an anatomical structure. The insertion guide assembly includes, for example, an insertion guide having a body with a first portion and a second portion. The second portion has a plate engaging portion. A passageway extends through the first portion, the second portion, and opens onto the plate engaging portion with the passageway defining a longitudinal axis. The body defining a first guide passageway with a first guide trajectory extending from the first portion to the second portion and opening onto the plate engaging portion. The body defines a second guide passageway with a second guide trajectory extending from the first portion to the second portion and opening onto the plate engaging portion. A plate holder is extendable through the passageway of the body from the first portion to the second portion. The plate holder has a distal end engageable with the plate to secure the plate to the plate engaging portion of the second portion of the body. The plate holder has a passageway aligned with the passageway of the body. A docking pin is extendable through the passageway of the plate holder and extendable through the plate.

In another embodiment, a plate includes, for example, a body having a first surface and a second surface, a first opening at a first end of the body extending from the first surface to the second surface, a second opening at a first end of the body extending from the first surface to the second surface, a third opening positioned between the first opening and the second opening and extending from the first surface to the second surface, and the first surface defines a first boss extending around at least a portion of the first opening, and the first surface defines a second boss extending around at least a portion of the second opening.

In another embodiment, a surgical method includes, for example, providing an implant assembly having a plate secured to an insertion guide; positioning the plate adjacent to an anatomical structure; inserting a pin through the insertion guide and the plate, and into the anatomical structure; inserting a first guide wire through the insertion guide and the plate along a first trajectory into the anatomical structure; inserting a second guide wire through the insertion guide and the plate along a second trajectory into the anatomical structure; removing the insertion guide from the plate and the inserted guide wires; inserting a first fixation element over the first guide wire, through the plate, and into the anatomical structure; inserting a second fixation element over the second guide wire, through the plate, and into the anatomical structure; and removing the first guide wire and the second guide wire from the anatomical structure so that the plate and the first and second fixation element form a bone fusion system in the anatomical structure.

In another embodiment, provided herein is an implant system having a plate, a first insertion guide, and a second insertion guide. The plate includes a first channel extending therethrough having a first axis defining first trajectory, and a second channel extending therethrough having a second axis defining a second trajectory. The first trajectory extends at an angle opposite the direction of the second trajectory. The first insertion guide includes a first passageway therethrough, and the second insertion guide includes a second passageway therethrough. A lower end of the first insertion guide is releasably attachable to the plate so that the first passageway is alignable with the first trajectory, and a lower end of the second insertion guide is releasably attachable to the plate so that the second passageway is alignable with the second trajectory.

In another embodiment, the lower end of the first insertion guide is releasably receivable in the first channel of the plate, and the lower end of the second insertion guide is releasably receivable in the second channel of the plate.

In another embodiment, the first channel includes an internal threaded upper portion, a seat, and a lower cylindrical portion, the second channel includes a threaded upper portion, a seat, and a lower cylindrical portion, the first insertion guide includes a lower portion having a stop, an external threaded portion, and a lower cylindrical portion, and the second insertion guide includes a lower portion having a stop, an external threaded portion, and a lower cylindrical portion.

In another embodiment, provided herein is a surgical method for using the implant system.

In another embodiment, provided herein is a method includes, for example, attaching a lower portion of a first insertion guide having a first passageway therethrough to an plate having a first channel extending therethrough having a first axis defining a first trajectory, inserting the plate and the lower portion of the first insertion guide into a patient adjacent the vertebrae, attaching a lower portion of a second insertion guide having a second passageway therethrough to the plate having a second channel extending therethrough having a second axis defining a second trajectory.

In another embodiment, provided herein is a surgical method, which includes, for example, providing the above-described plate; positioning the plate adjacent to an anatomical structure; inserting a first elongated member through the first opening of the plate and into the anatomical structure; inserting a second elongated member through the second opening of the plate and into the anatomical structure; verifying the placement of the plate, the first elongated member, and second elongated relative to the anatomical structure; inserting a first fixation element through the plate and into the anatomical structure; inserting a second fixation element through the plate and into the anatomical structure; and removing the elongated member and the second elongated member from the anatomical structure so that the plate and the first and second fixation element form a bone fusion system in the anatomical structure.

In another embodiment, provided herein is a surgical method, which includes, for example, providing a plate having a first surface and a second surface, a first opening at a first end of the body extending from the first surface to the second surface and the first opening defining a first trajectory, a second opening at a first end of the body extending from the first surface to the second surface and the second opening defining a second trajectory, and the first trajectory extends at an angle opposite a direction of the second trajectory; positioning the plate adjacent to an anatomical structure; inserting a first cannula through the first opening of the plate and into the anatomical structure, and inserting a second cannula through the second opening of the plate and into the anatomical structure; verifying the placement of the plate, the first cannula, and the second cannula relative to the anatomical structure; inserting a first guide wire through the first cannula and into the anatomical structure, and inserting a second guide wire through the second cannula and into the anatomical structure; removing the first cannula from the first guide wire, and removing the second cannula from the second guide wire; inserting a first fixation element over the first guide wire, through the plate, and into the anatomical structure, and inserting a second fixation element over the second guide wire, through the plate, and into the anatomical structure; and removing the first guide wire and the second guide wire from the anatomical structure so that the plate and the first and second fixation element form a bone fusion system in the anatomical structure.

These, and other objects, features and advantages of this disclosure will become apparent from the following detailed description of the various aspects of the disclosure taken in conjunction with the accompanying drawings.

BRIEF DESCRIPTION OF THE DRAWINGS

The accompanying drawings, which are incorporated in and constitute a part of the specification, illustrate embodiments of the present disclosure and together with the detailed description herein, serve to explain the principles of the disclosure. The drawings are only for purposes of illustrating preferred embodiments and are not to be construed as limiting the present disclosure. It is emphasized that, in accordance with the standard practice in the industry, various features are not drawn to scale. In fact, the dimensions of the various features may be arbitrarily increased or reduced for clarity of discussion.

FIG. 72 is a rear elevational view of the plate of FIG. 69, according to an embodiment of the present disclosure;

FIG. 73 is a right side elevational view of the plate of FIG. 69, according to an embodiment of the present disclosure;

FIG. 74 is a left side elevational view of the plate of FIG. 69, according to an embodiment of the present disclosure;

DETAILED DESCRIPTION FOR CARRYING OUT THE INVENTION

Generally stated, disclosed herein are implant systems and bone fusion systems. Further, surgical methods employing the systems are also discussed. As will be appreciated, the present disclosure may provide a trivergent spinal fixation. For example, the trivergent stabilization may result in divergence in three dimension, which may contribute to increased stability 1) Cephalad-Caudal, 2) Medial-Lateral, and 3) Lateral right and lateral left. As will be further appreciated, the cephalad directed screw engages two cortices and the pedicle, similar to pedicle cortical trajectory. The caudal directed screw engages four cortical surfaces, similar to transfacet trajectory.

In this detailed description and the following claims, the words proximal, distal, anterior, posterior, medial, lateral, superior, inferior, cephalad and caudally are defined by their standard usage for indicating a particular part of a bone or implant according to the relative disposition of the natural bone or directional terms of reference. For example, "proximal" means the portion of an implant nearest the insertion instrument, while "distal" indicates the portion of the implant farthest from the insertion instrument. As for directional terms, "anterior" is a direction towards the front side of the body, "posterior" means a direction towards the back side of the body, "medial" means towards the midline of the body, "lateral" is a direction towards the sides or away from the midline of the body, "superior" means a direction above and "inferior" means a direction below another object or structure, "cephalad" means a direction toward the head and "caudally" means a direction toward the inferior part of the body.

Similarly, positions or directions may be used herein with reference to anatomical structures or surfaces. For example, as the current devices and methods are described herein with reference to use with the bones of the spine, the bones of the spine may be used to describe the surfaces, positions, directions or orientations of the devices, instrumentation and methods. Further, the devices and methods, and the aspects, components, features and the like thereof, disclosed herein are described with respect to one side of the body for brevity purposes. However, as the human body is relatively symmetrical or mirrored about a line of symmetry (midline), it is hereby expressly contemplated that the device and methods, and the aspects, components, features and the like thereof, described and/or illustrated herein may be changed, varied, modified, reconfigured or otherwise altered for use or association with another side of the body for a same or similar purpose without departing from the spirit and scope of the present disclosure. For example, the devices and methods, and the aspects, components, features and the like thereof, described herein with respect to a right side of the spine may be mirrored so that they likewise function with a left side of the spine and vice versa.

Figure 1:
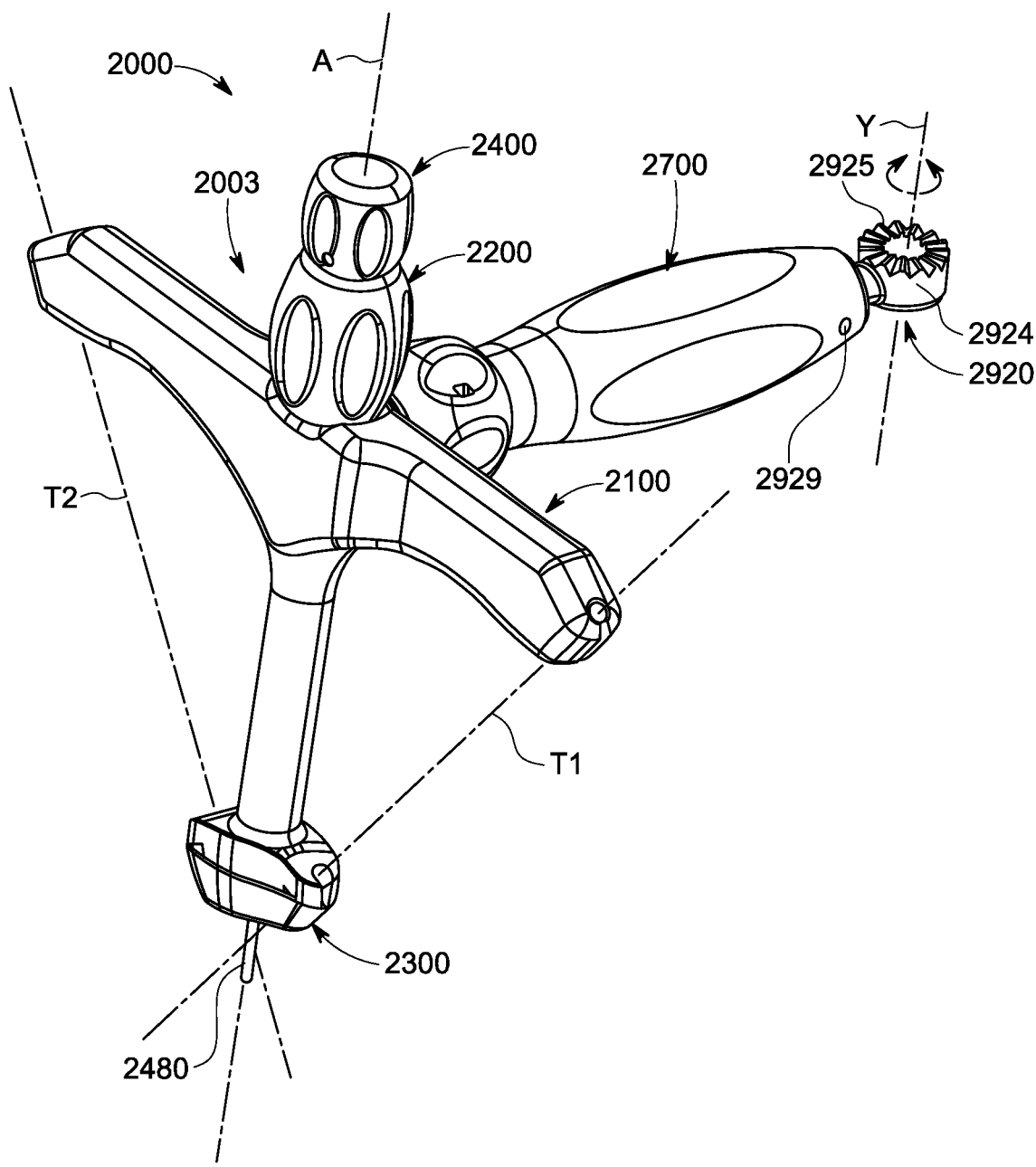
FIG. 1 is a front perspective view of a midline incision implant system, according to an embodiment of the present disclosure.
Figure 2:
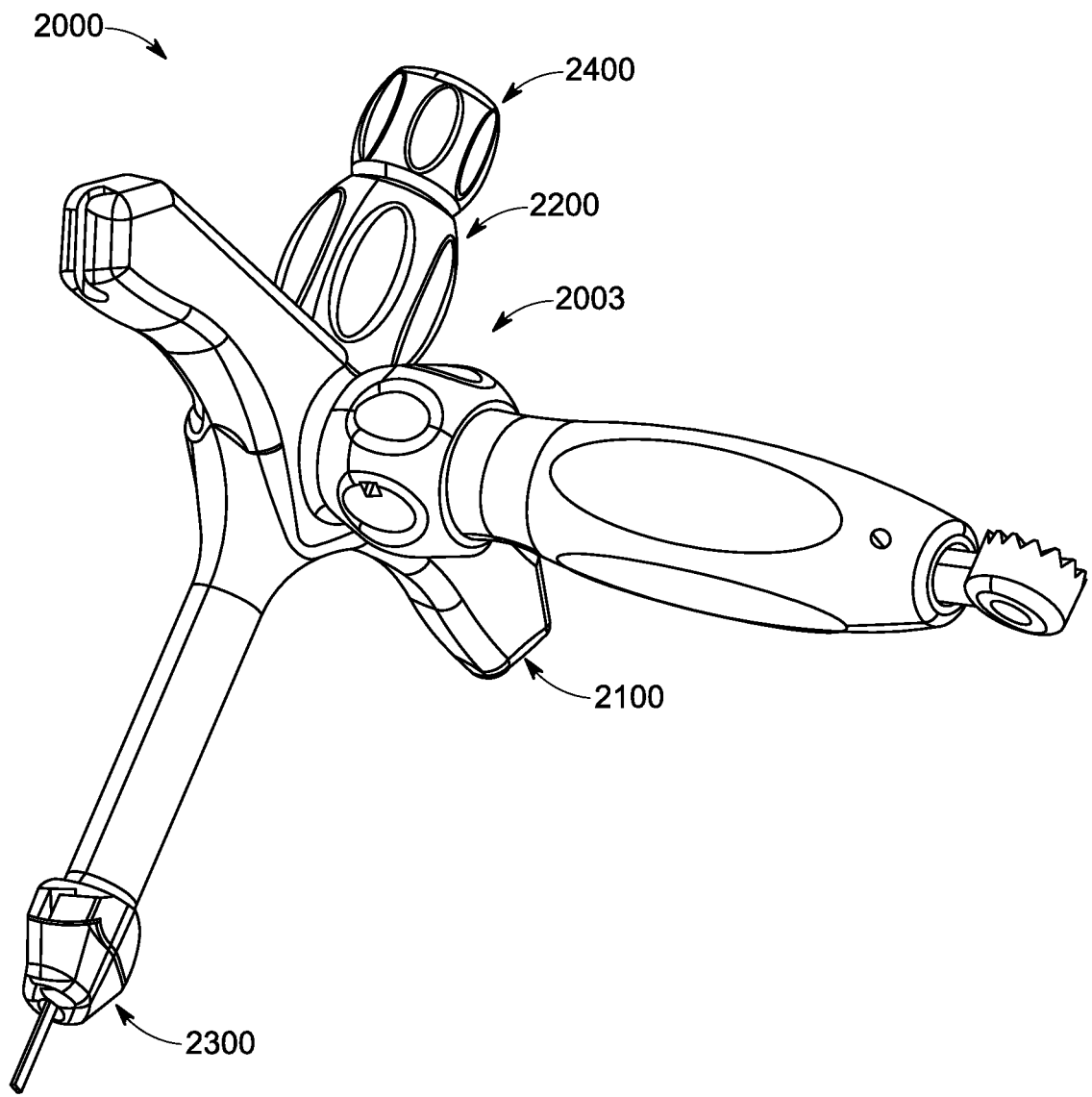
FIG. 2 is a rear perspective view of the implant system of FIG. 1, according to an embodiment of the present disclosure.

Referring to the drawings, wherein like reference numerals are used to indicate like or analogous components throughout the several views, and with particular reference to FIGS. 1-64 and 91-95 therein illustrated are exemplary midline incision implant systems, for example, a midline incision implant system 2000 (FIG. 1), a midline incision implant system 4000 (FIG. 63), a midline incision implant system 5000 (FIG. 64), a midline incision implant system 7000 (FIG. 94), and surgical methods (FIGS. 50-62 and FIG. 95), according to embodiments of the present disclosure. For example, as shown in FIG. 1, the midline incision implant system 2000 may generally include an insertion guide assembly 2003 and a plate 2300, according to an embodiment of the present disclosure.

Figure 65:
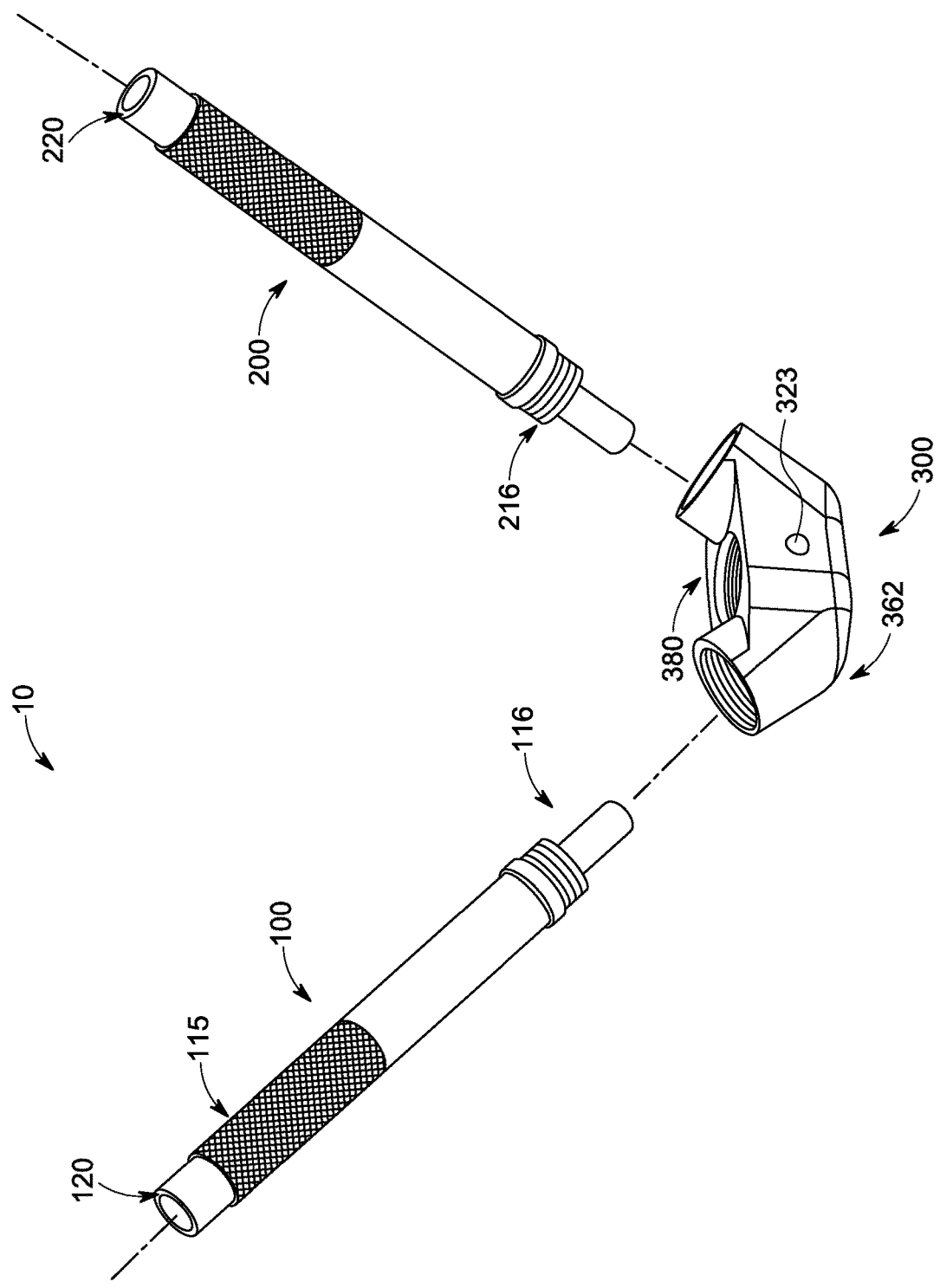
FIG. 65 is an exploded perspective view of a percutaneous implant system, according to an embodiment of the present disclosure.
Figure 66:
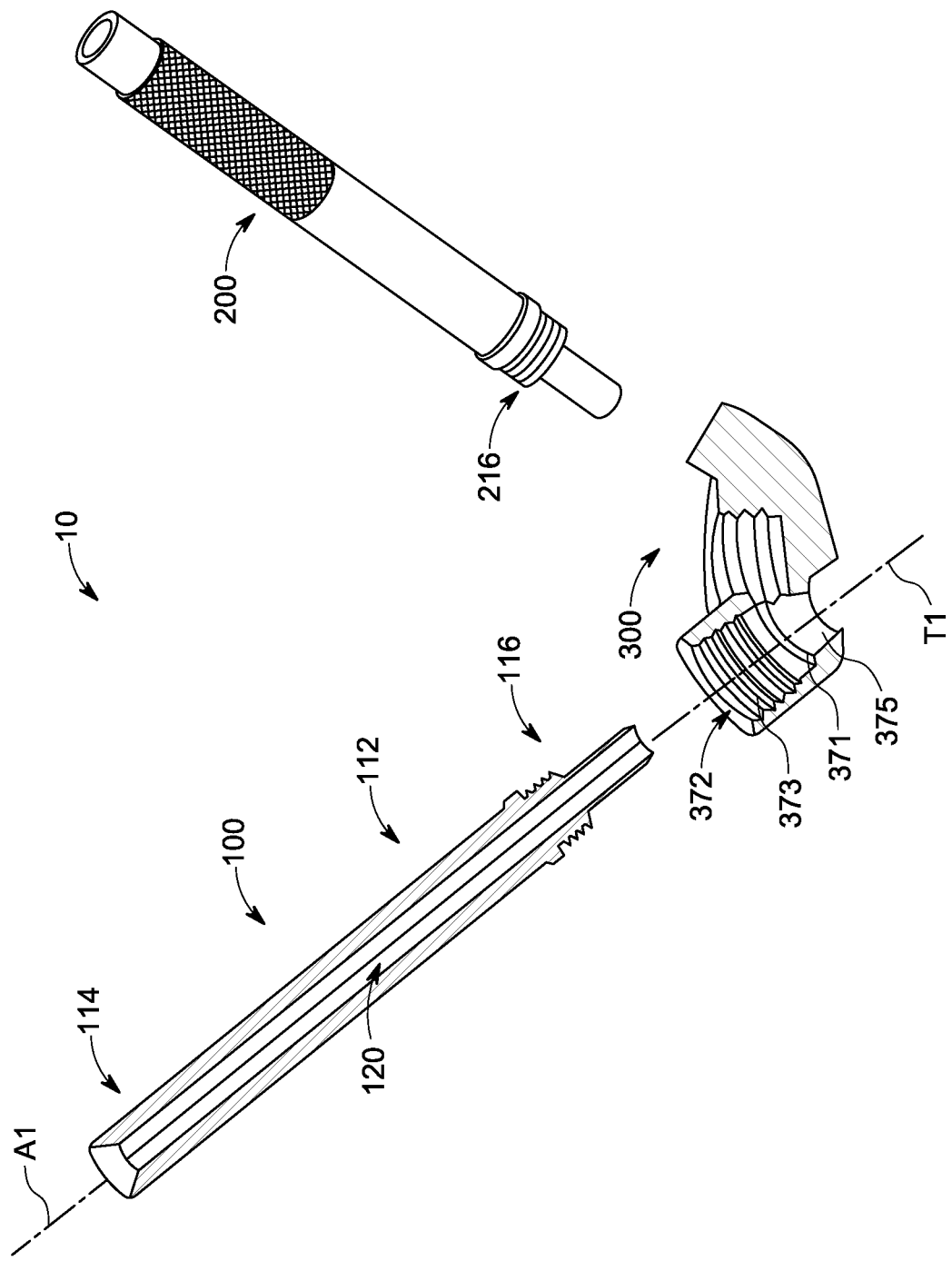
FIG. 66 is another exploded perspective view, in part cross-section, of the implant system of FIG. 65, according to an embodiment of the present disclosure.

With particular reference to FIGS. 65-90, therein illustrated are exemplary embodiments of a percutaneous implant system 10 and surgical methods. For example, as shown in FIGS. 65-66, the percutaneous implant system 10 may generally include a first insertion guide 100, a separate second insertion guide 200, and a plate 300, according to an embodiment of the present disclosure.

In some of the illustrated embodiments of the present disclosure, the implant systems may be secured to a plate during a surgical procedure to aid a surgeon in establishing fixation element trajectories relative to a surgical incision. The plate, in addition to aiding guidance for providing fixation element trajectories, may also be operable in a bone fusion system for use in connection with a first plate fixation element such as a screw and second plate fixation element such as a screw in an anatomical structure such as to maintain or re-establish proper spacing and alignment within a patient's spine. In some embodiments, the plate itself may be used for providing the trajectories along with elongated members such as cannulas and/or guide wires (e.g., without insertion guides) for locating, aligning, and/or orientating the plate and subsequently installing the fixation elements.

With reference to FIGS. 1-6, the midline incision implant system 2000 (FIGS. 1-3) may be operably attachable to a table mount 2900 (FIG. 3), according to an embodiment of the present disclosure. In this illustrated embodiment, the midline incision implant system 2000 (FIGS. 1-3) may generally include the insertion guide assembly 2003 having, for example, an insertion guide 2100, a plate holder 2200, a docking pin 2400, and a handle 2700, according to an embodiment of the present disclosure.

As described in greater detail below, for example, shown in FIGS. 1 and 6, the plate holder 2200, extends through the insertion guide 2100 with a distal end 2280 (FIG. 6) attachable to the plate 2300 (FIG. 1) to secure the plate 2300 (FIG. 1) in a fixed relationship relative to the insertion guide assembly 2003. The docking pin 2400 extends through the plate holder 2200. During a surgical procedure a distal end 2480 of the docking pin 2400 is secured into the facet/lamina of a patient's spine, which distal end 2480 of the docking pin 2400 along with the table mount 2900 (FIG. 3), stabilize the insertion guide assembly 2003 and the plate 2300 (FIG. 1) relative the spine of the patient. During a surgical procedure, the insertion guide assembly 2003 and the plate 2300 (FIG. 1) establish fixation element trajectories T1 and T2 (FIG. 1) relative to a surgical incision. The plate 2300 and a first plate fixation element such as a screw and a second plate fixation element 600 such as a screw are operable in a bone fusion system for maintaining or re-establishing proper spacing and alignment within a patient's spine.

With reference to FIGS. 7-15, the insertion guide 2100 may include, for example, a body 2101 having an upper portion 2110, a lower portion 2120, and a connecting member 2130 extending between the upper portion 2110 and the lower portion 2120. For example, the connecting member 2130 may include a first end 2132 attached to the upper portion 2110 and a second end 2134 attached to the lower portion 2120. In some embodiments, the insertion guide may have a generally T-shaped configuration. It will be appreciated that the body may have other suitable configurations.

Figure 7:
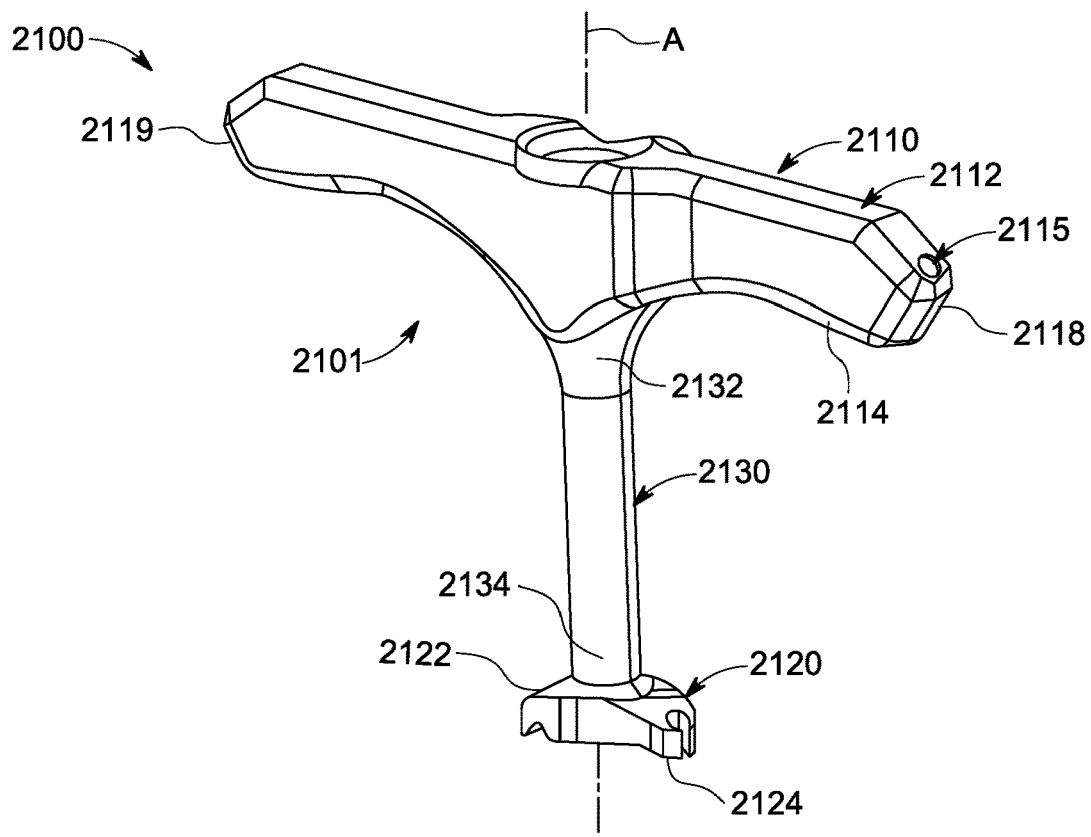
FIG. 7 is a front perspective view of the insertion guide of FIG. 6, according to an embodiment of the present disclosure.
Figure 8:
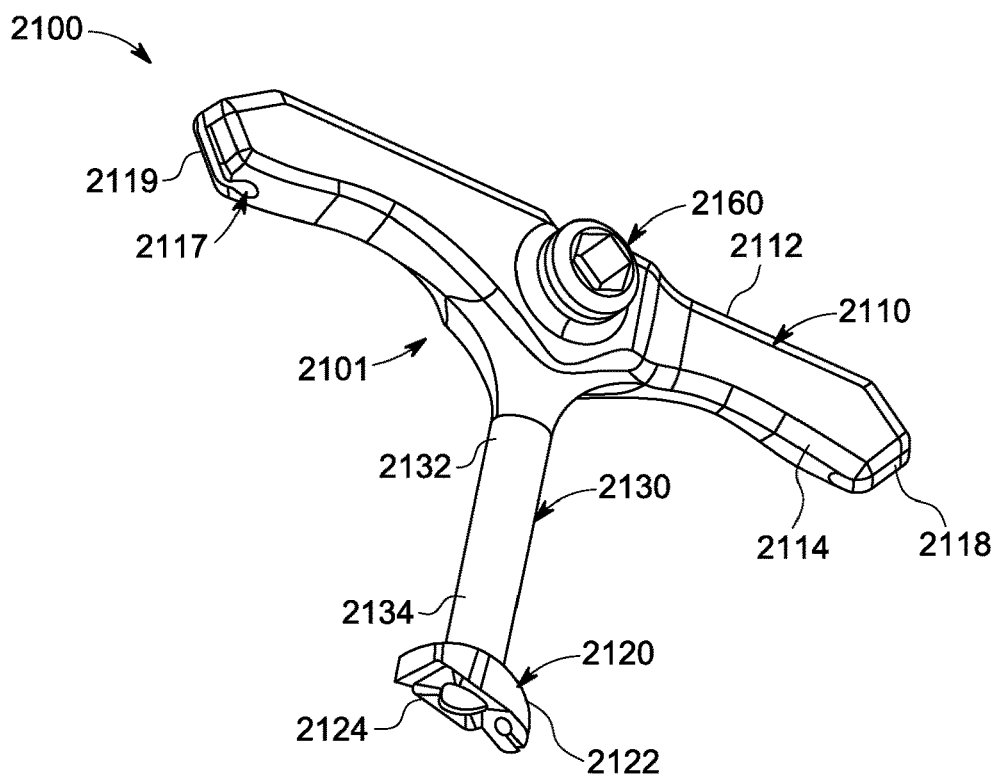
FIG. 8 is a bottom rear perspective view of the insertion guide of FIG. 6, according to an embodiment of the present disclosure.
Figure 9:
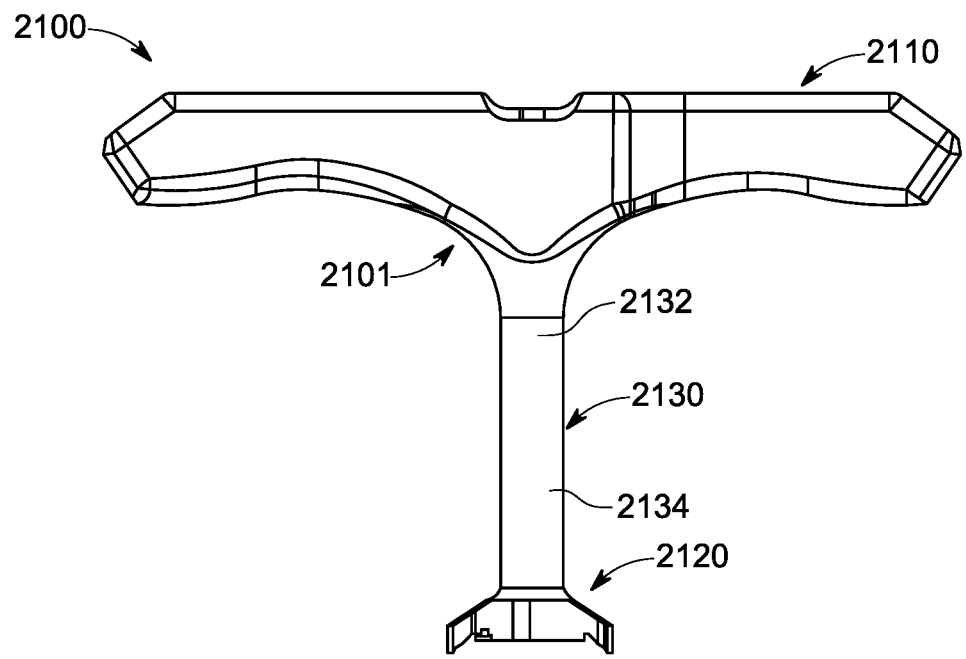
FIG. 9 is a front elevational view of the insertion guide of FIG. 6, according to an embodiment of the present disclosure.
Figure 10:
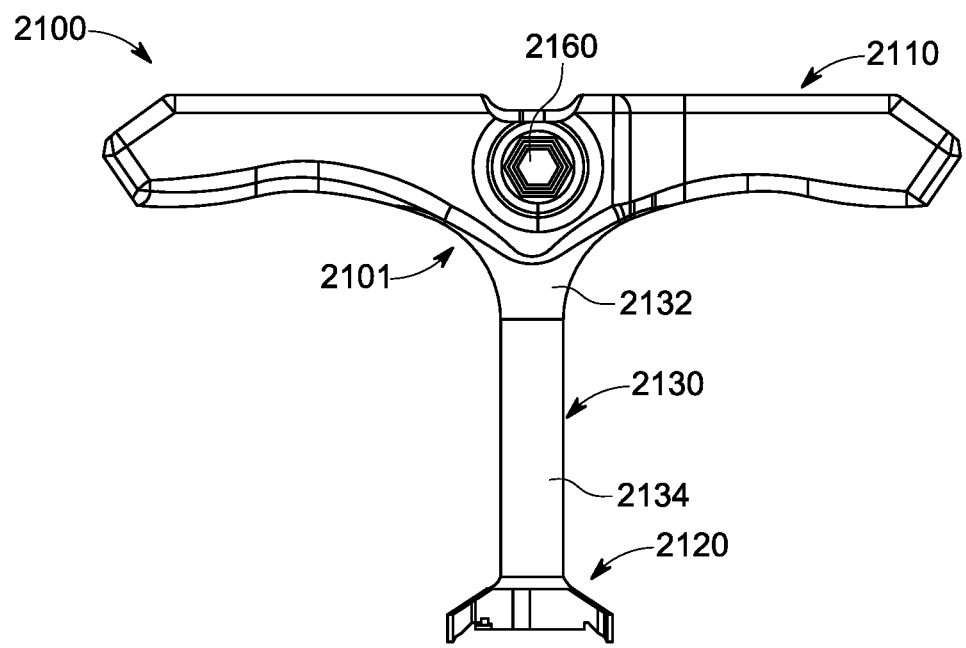
FIG. 10 is a rear elevational view of the insertion guide of FIG. 6, according to an embodiment of the present disclosure.
Figure 15:
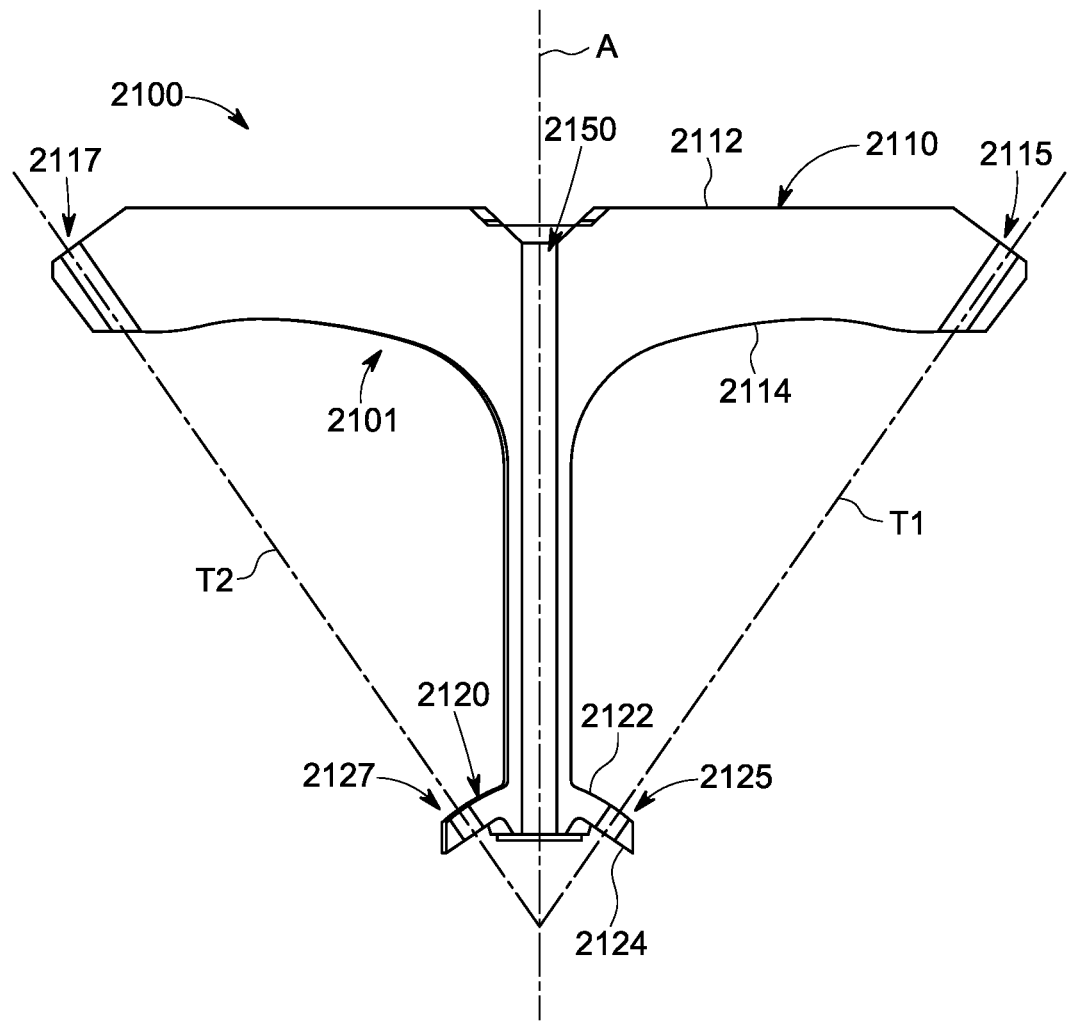
FIG. 15 is a cross-sectional view of the insertion guide taken along line 15-15 of FIG. 14, according to an embodiment of the present disclosure.
Figure 16:
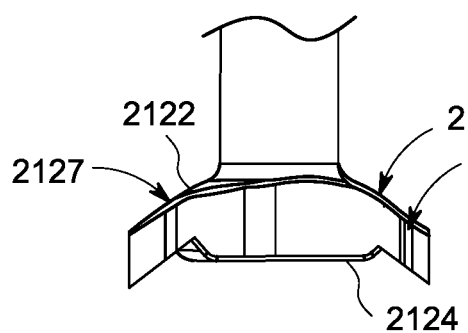
FIG. 16 is an enlarged front elevational view of the lower portion of the insertion guide of FIG. 6, according to an embodiment of the present disclosure.
Figure 17:
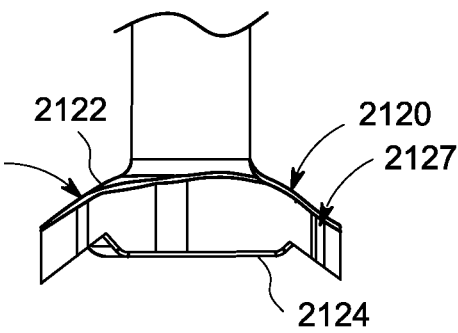
FIG. 17 is a rear elevational view of the lower portion of the insertion guide of FIG. 16, according to an embodiment of the present disclosure.
Figure 18:
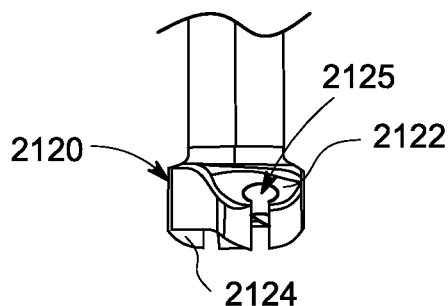
FIG. 18 is a right elevational side view of the lower portion of the insertion guide of FIG. 16, according to an embodiment of the present disclosure.
Figure 19:
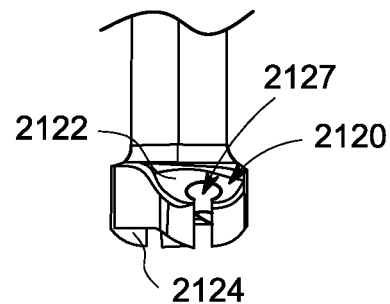
FIG. 19 is a left elevational side view of the lower portion of the insertion guide of FIG. 16, according to an embodiment of the present disclosure.
Figure 20:
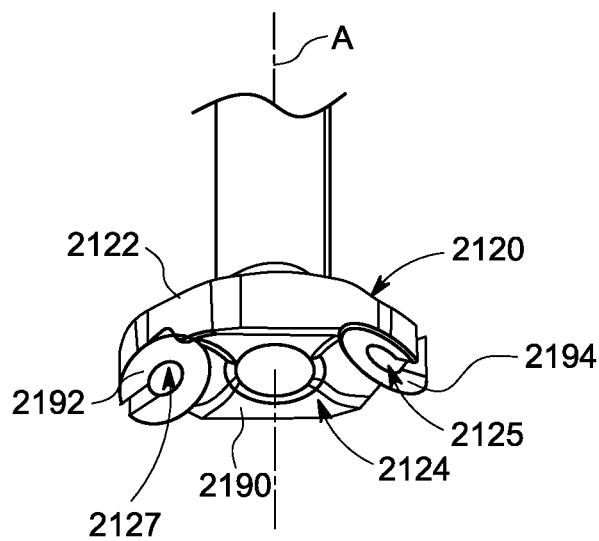
FIG. 20 is an enlarged bottom perspective view of the lower portion of the insertion guide of FIG. 16, according to an embodiment of the present disclosure.

As shown in FIGS. 7, 8, and 15, the upper portion 2110 may be a generally elongated member with a top surface 2112 opposite a bottom surface 2114. The lower portion 2120 may be a generally elongated member with a top surface 2122 opposite a plate engaging portion 2124.

As shown in FIG. 15, a passageway 2150 extends through the upper portion 2110, the connecting member 2130, and the lower member 2120 of body 2101. The passageway 2150 defines an axis A (also shown in FIGS. 1 and 7). The passageway 2150 may be used to aid in alignment of the insertion guide assembly 2103 (FIG. 1) and the plate 2300 (FIG. 1) as described below.

With reference again to FIGS. 7, 8 and 15, the upper portion 2110 at a first distal end may include a first opening 2115, and at a second distal end a second opening 2117. The first opening 2115 may extend through the upper portion 2110 from the top surface 2112 to the bottom surface 2114 of the upper portion 2110. The second opening 2117 may extend through the upper portion 2110 from the top surface 2112 to the bottom surface 2114 of the upper portion 2110.

With reference to FIGS. 16-20, the lower portion 2120 may be a generally elongated member with the top surface 2122 opposite the plate engaging portion 2124. The lower portion 2120 at a first distal end may include a first opening 2125, and at a second distal end a second opening 2127. The first opening 2125 may extend through the lower portion 2120 from the top surface 2122 to the plate engaging portion 2124 of the lower portion 2120. The second opening 2127 may extend through the lower portion 2120 from the top surface 2122 to the plate engaging portion 2124 of the lower portion 2120.

Figure 14:
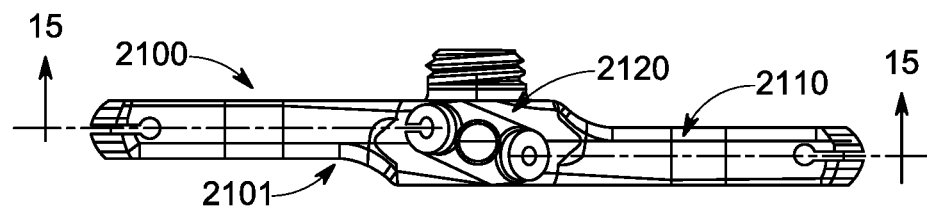
FIG. 14 is a bottom view of the insertion guide of FIG. 6, according to an embodiment of the present disclosure.

With reference again to FIG. 15 (the section being taken as shown in FIG. 14), the first opening 2115 of the upper portion 2110 and the first opening 2125 of the lower portion 2120 have aligned axes, which axes define the first trajectory T1, which may be angled in a first direction. The second opening 2117 of the upper portion 2110 and the second opening 2127 of the lower portion 2120 have aligned axes, which axes define the second trajectory T2, which may be angled in a second direction. The second direction may be opposite the first direction. The first and second trajectories may be selected, for example, to correspond to the desired placement in a patient's facet and/or pedicle. In an embodiment, the openings 2115 and 2117 may be, for example, angled approximately 65-85 degrees from the top surface 2112 of the upper portion 2110 of body 2100, however, other angles are also contemplated to correspond to variations in patient anatomy.

As shown in FIG. 1, the first and second trajectories T1 and T2 may be positioned and offset to extend past each other on opposite sides of distal end 2480 of docking pin 240 to allow for, as described below, the insertion of fixation fasteners or screws (not shown) in a crossed or X-shaped arrangement. With reference again to FIGS. 7 and 8, portions 2118 and 2119 of the distal ends of the upper portion 2110 of the body 2101 may be angled parallel to the first opening 2115 and the second opening 2117, respectively.

Figure 11:
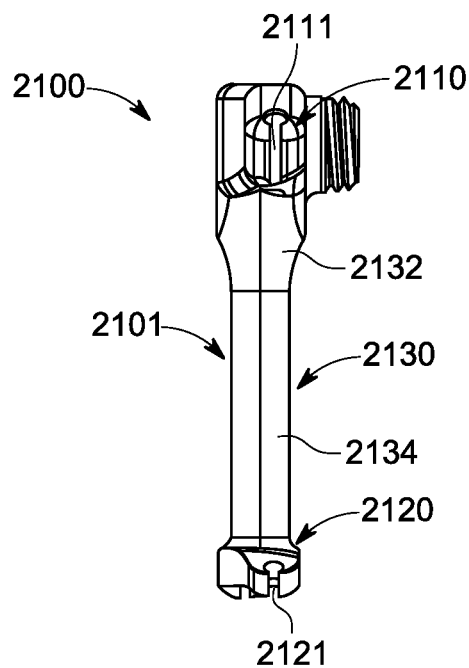
FIG. 11 is a right elevational side view of the insertion guide of FIG. 6, according to an embodiment of the present disclosure.
Figure 12:
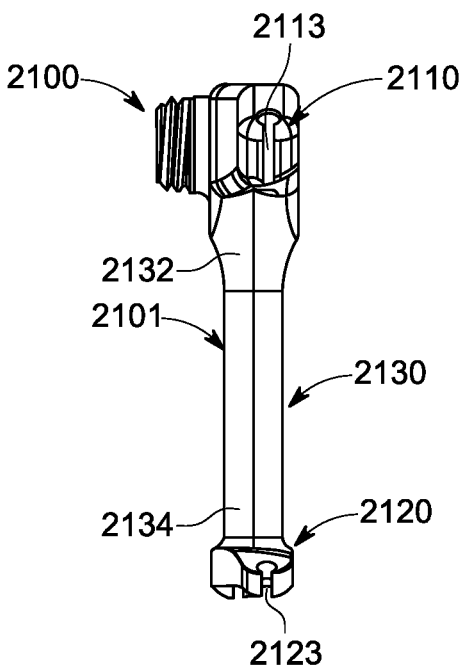
FIG. 12 is a left elevational side view of the insertion guide of FIG. 6, according to an embodiment of the present disclosure.
Figure 13:
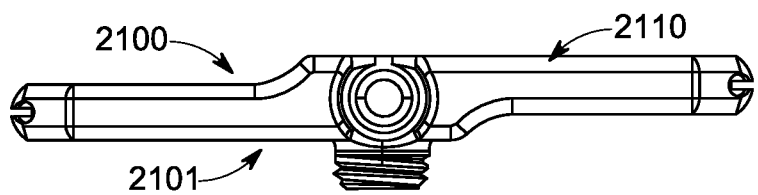
FIG. 13 is a top view of the insertion guide of FIG. 6, according to an embodiment of the present disclosure.

As best shown in FIGS. 11 and 12, the upper portion 2110 may include slots or slot features 2111 and 2113 in the insertion guide 2100. The bottom portion 2120 may include slots or slot features 2121 and 2123. The slots or slot features allow for the insertion guide 110 to be separated from guide wires (not shown) inserted in the openings of the insertion guide and plate as described further below.

Figure 26:
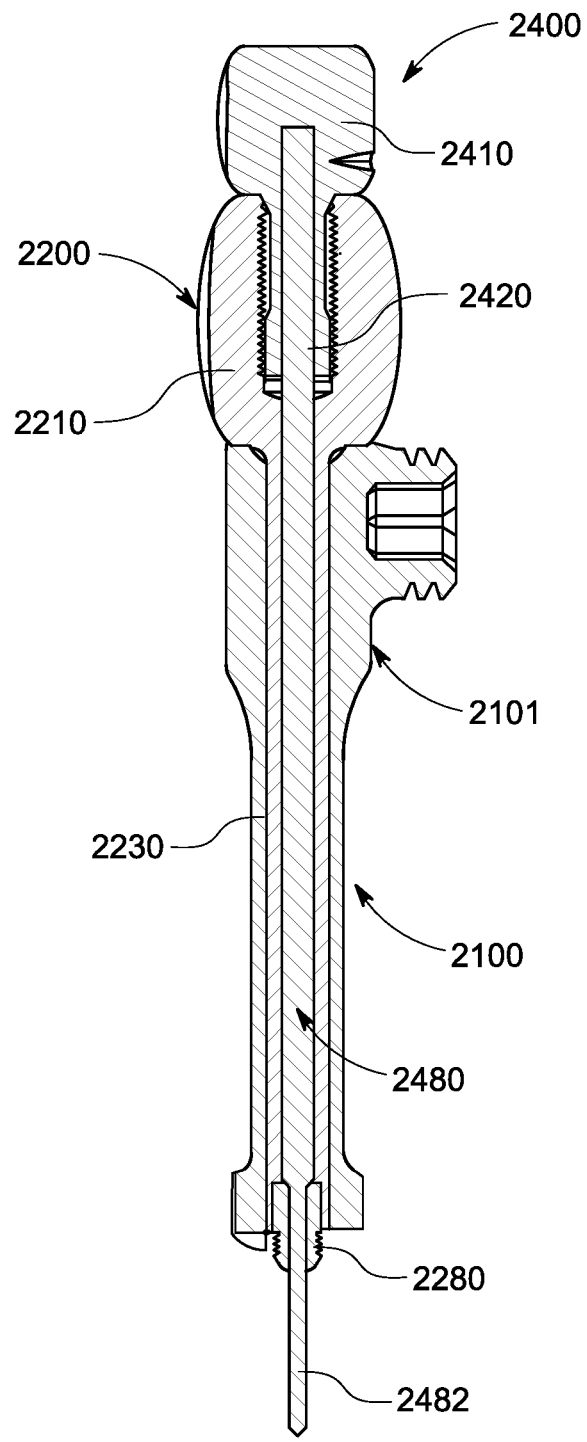
FIG. 26 is an enlarged cross-sectional view of the insertion guide assembly of FIG. 21, according to an embodiment of the present disclosure.
Figure 27:
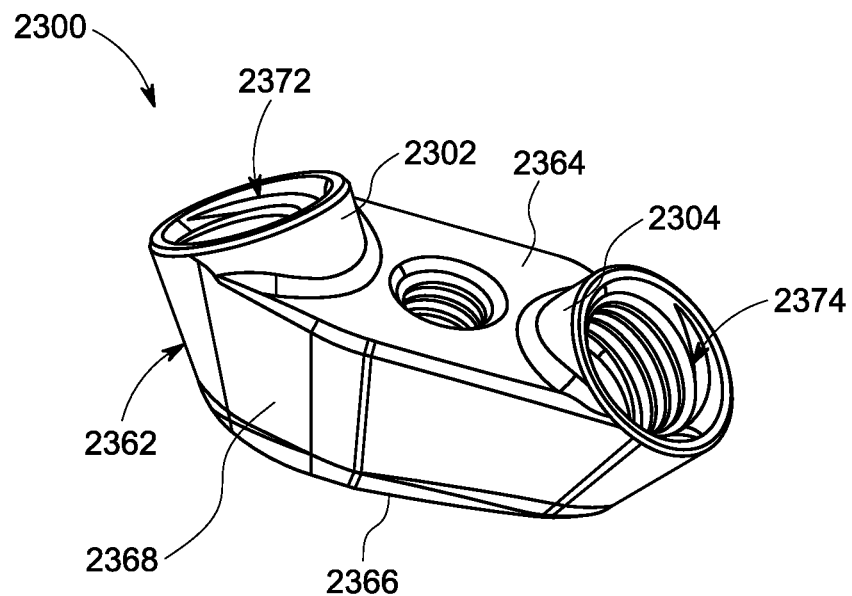
FIG. 27 is an enlarged top perspective view of the plate of FIG. 1, according to an embodiment of the present disclosure.
Figure 28:
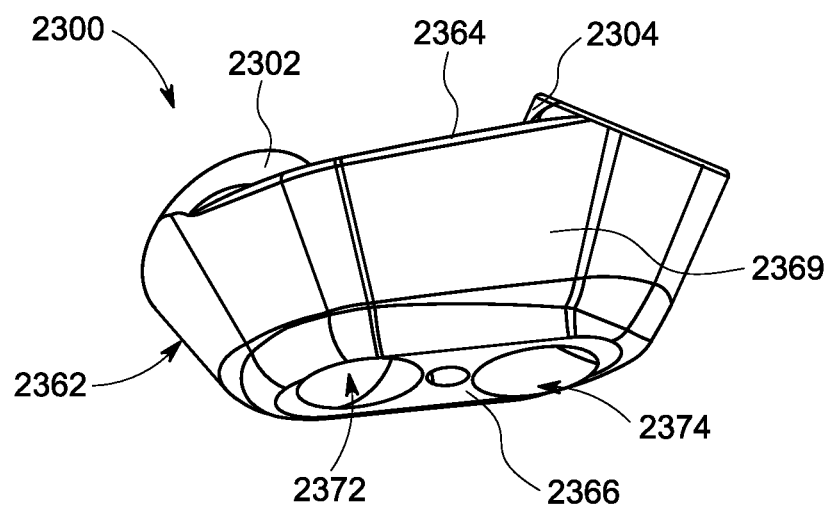
FIG. 28 is a bottom perspective view of the plate of FIG. 27, according to an embodiment of the present disclosure.
Figure 29:
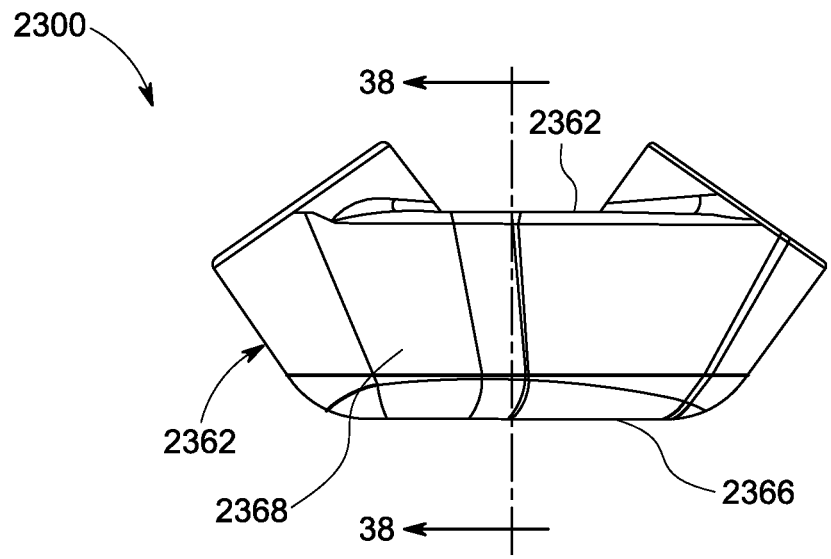
FIG. 29 is a front elevational view of the plate of FIG. 27, according to an embodiment of the present disclosure.
Figure 30:
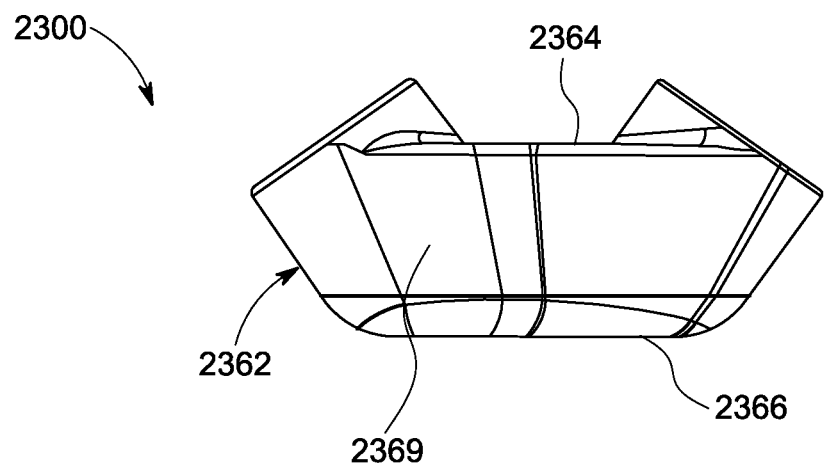
FIG. 30 is a rear elevational view of the plate of FIG. 27, according to an embodiment of the present disclosure.
Figure 31:
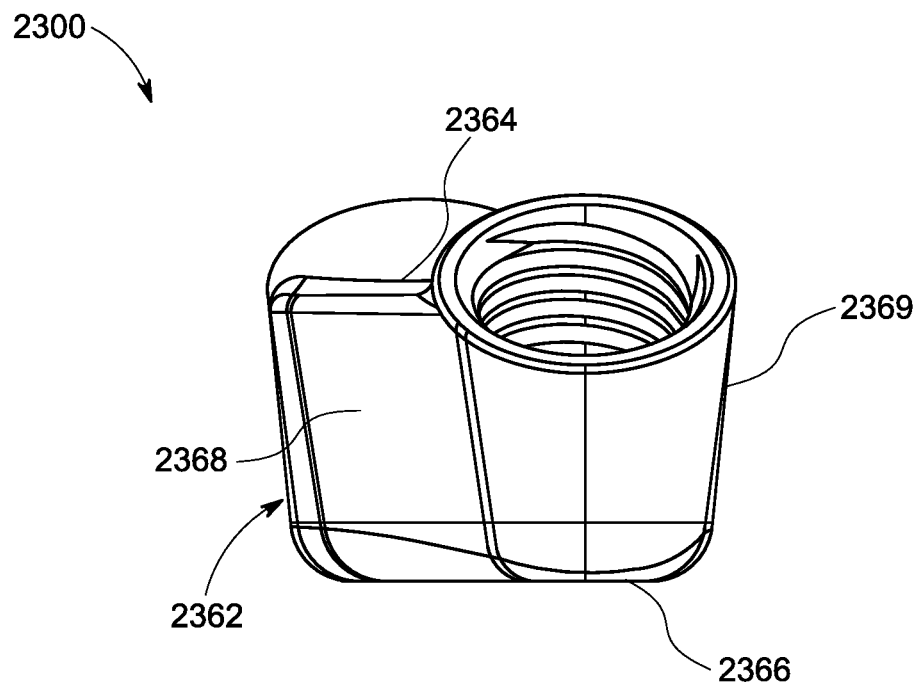
FIG. 31 is a right side elevational view of the plate of FIG. 27, according to an embodiment of the present disclosure.
Figure 32:
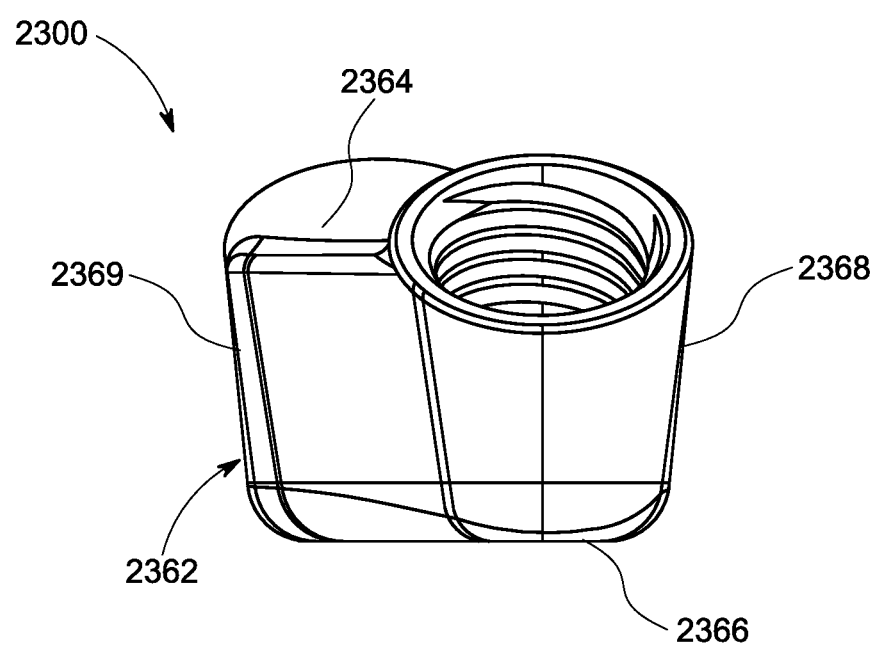
FIG. 32 is a left side elevational view of the plate of FIG. 27, according to an embodiment of the present disclosure.

With reference again to FIGS. 16-20, the lower portion 2120 of insertion guide assembly 2100 (FIG. 7) may include the top surface 2122 opposite the plate engaging portion 2124. The plate engaging surface 2124 may be configured to register and properly align the plate 2300 (FIG. 1) in position relative to insertion guide assembly 2100. For example, the plate engaging portion 2124 may have a center portion 2190, a first angled recess 2192 and a second angled recess 2194 relative to axis A (FIG. 20), which as described below correspond to the shape of bosses 2302 and 2304 (FIG. 26) on the plate 2300 (FIG. 26).

Figure 3:
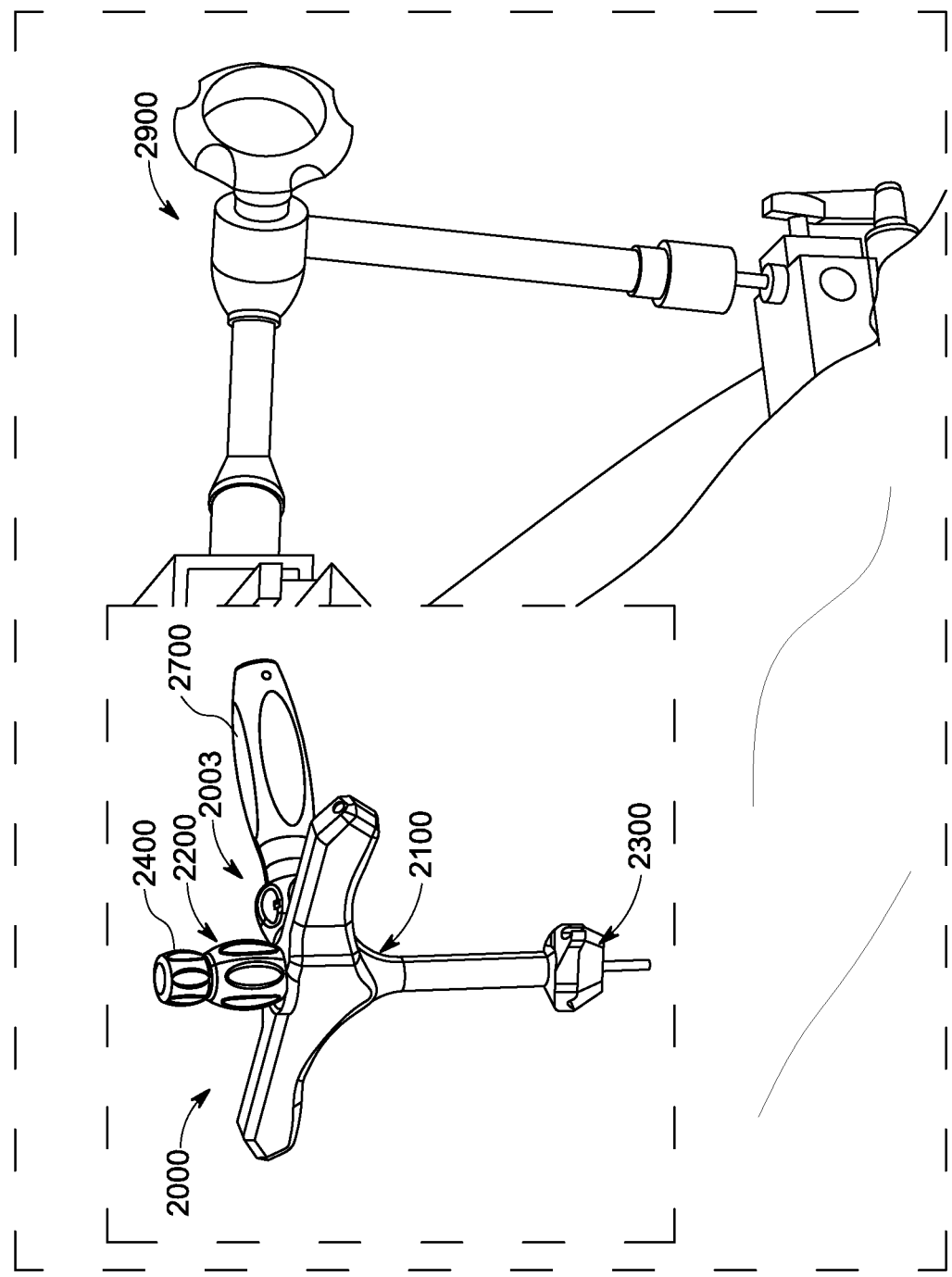
FIG. 3 is a front perspective view of the implant system of FIG. 1 attached to a table mount, according to an embodiment of the present disclosure.
Figure 4:
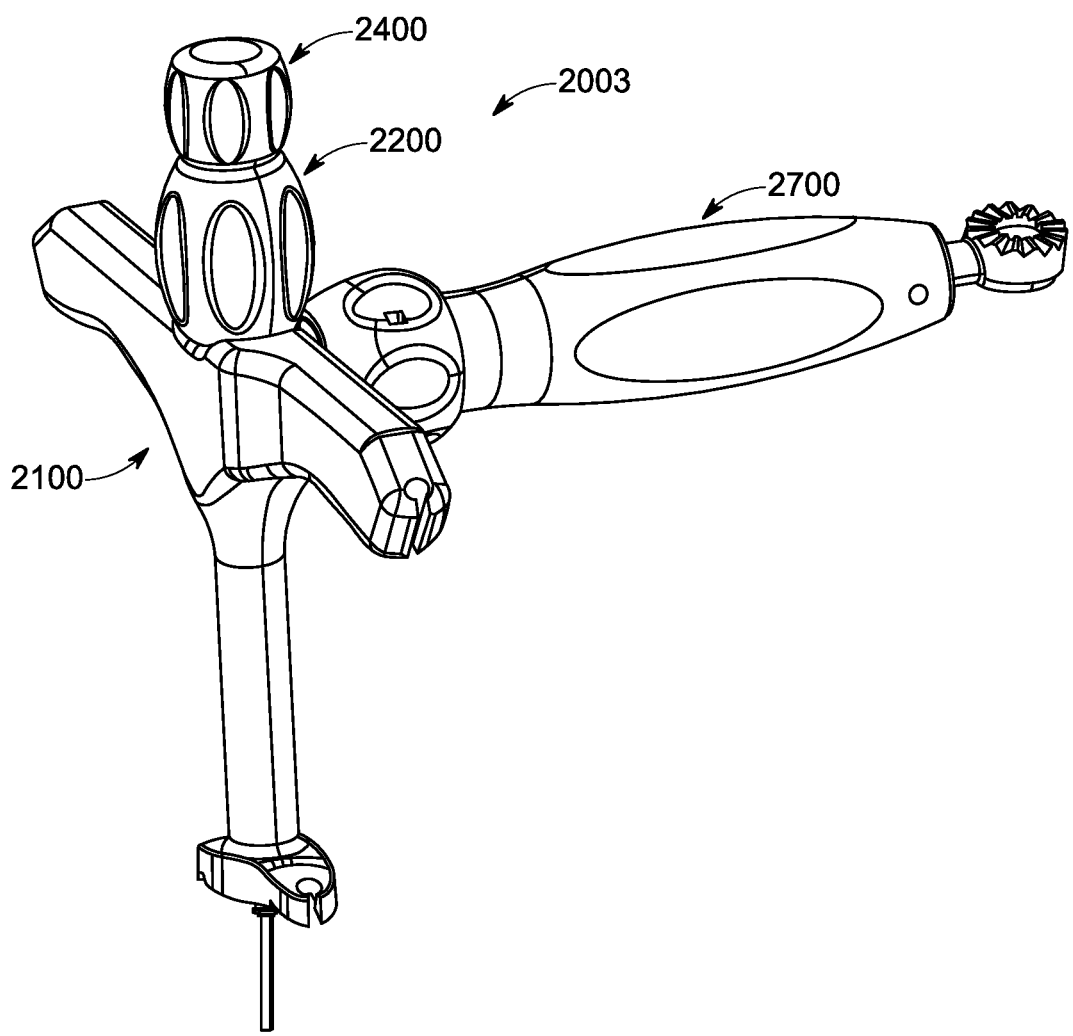
FIG. 4 is a top front perspective view of the insertion guide assembly of FIG. 1, according to an embodiment of the present disclosure.
Figure 5:
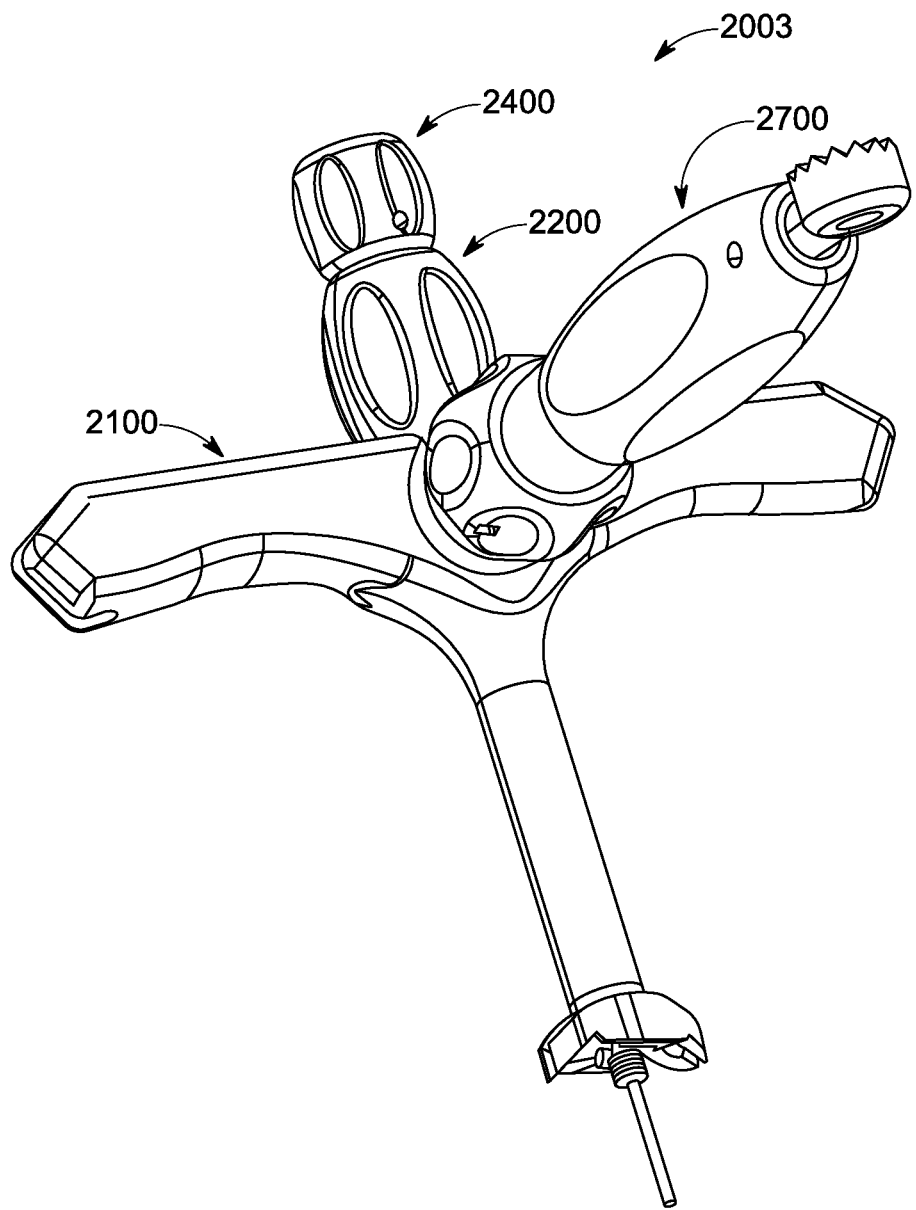
FIG. 5 is a bottom rear perspective view of the insertion guide assembly of FIG. 1, according to an embodiment of the present disclosure.
Figure 21:
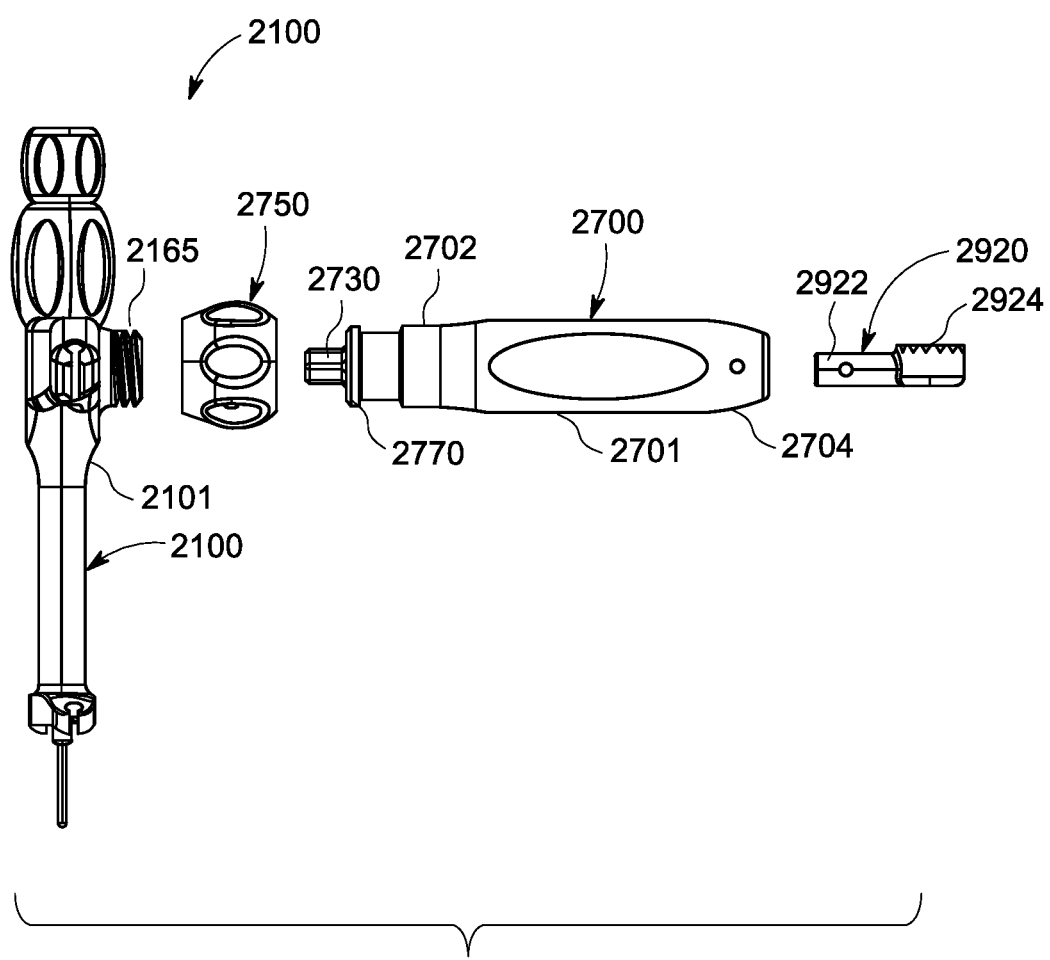
FIG. 21 is an exploded side elevational view of the insertion guide assembly of FIG. 1, according to an embodiment of the present disclosure.
Figure 22:
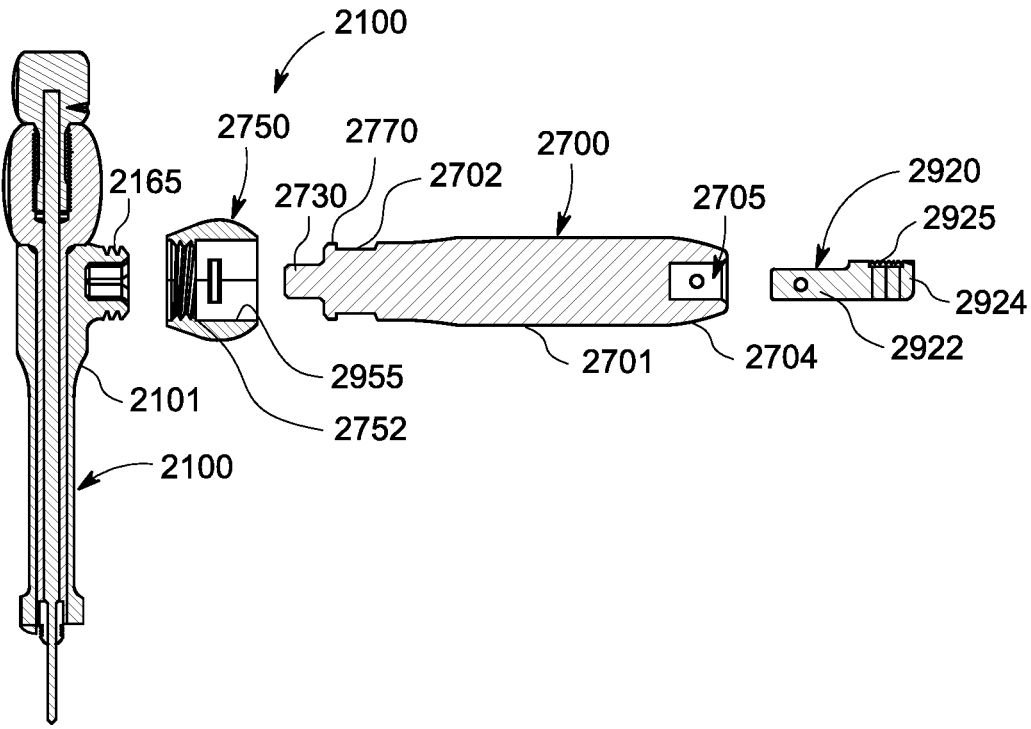
FIG. 22 is an exploded, cross-sectional view of the insertion guide assembly of FIG. 21, according to an embodiment of the present disclosure.
Figure 23:
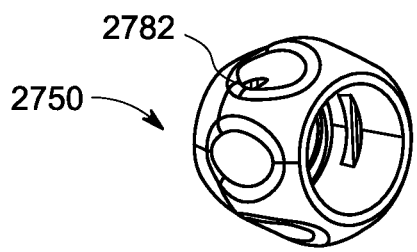
FIG. 23 is an enlarged perspective view of the connector of FIG. 21, according to an embodiment of the present disclosure.

With reference to FIGS. 21 and 22, the handle 2700 may be operably attachable to body 2110 of insertion guide 2100 and to the table mount 2900 (FIG. 3). The handle 2700 may include an elongated body 2701 having a first end portion 2702 and a second end portion 2704. The second end portion 2704 may have a cavity 2705 (FIG. 22) configured or sized and shaped to receive a first end 2922 of a table mount connector 2920, and attached together with a pin 2929 (FIG. 1) extending through aligned openings. A second end of the table mount connector 2920 may include a circular portion 2924 having spaced apart teeth 2925 as shown in FIG. 1, to allow insertion guide assembly 2000 to be rotatable about an axis Y.

With reference again to FIGS. 21 and 22, the first end 2702 of handle 2700 may have a post 2730 having six sides, which post is receivable in a corresponding shaped cavity 2160 (FIG. 8) having a hexagon cross-section.

Figure 24:
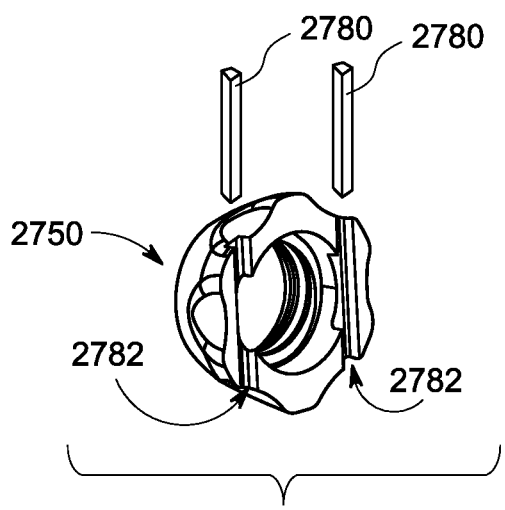
FIG. 24 is an exploded, in part cross-sectional, view of the connector of FIG. 23, according to an embodiment of the present disclosure.

As shown in FIGS. 21 and 22, a connector 2750 may include an internally threaded first end 2752 for threadably attaching to external threads 2165 of body 2101, and a counter bore 2955 (FIG. 22) for receiving end portion 2702 of handle 2700. The end portion 2702 includes an outwardly-extending ridge 2770. The handle 2700 is rotatably attached to connector 2750 by inserting end 2702 into the connector 2750, and as shown in FIG. 24, installing square pins 2780 into opening 2782 in connector 2750. Thereafter, the connector 2750 is threadably attached to the threaded end 2165 of body 2010. For example, post 2730 is inserted and received into cavity 2160 as the connector 2750 is rotated.

Figure 6:
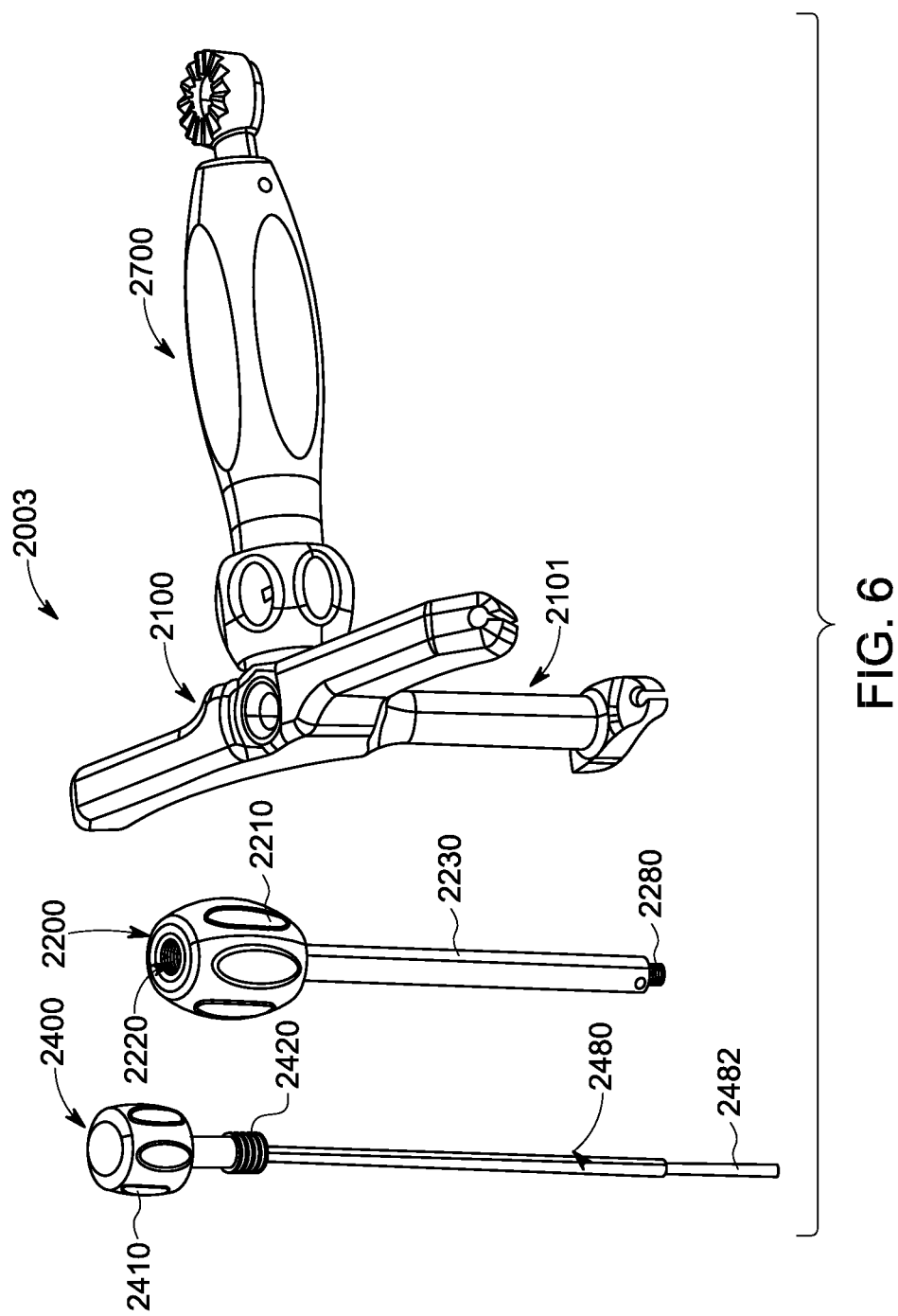
FIG. 6 is an exploded, perspective view of the insertion guide assembly of FIG. 1, according to an embodiment of the present disclosure.
Figure 25:
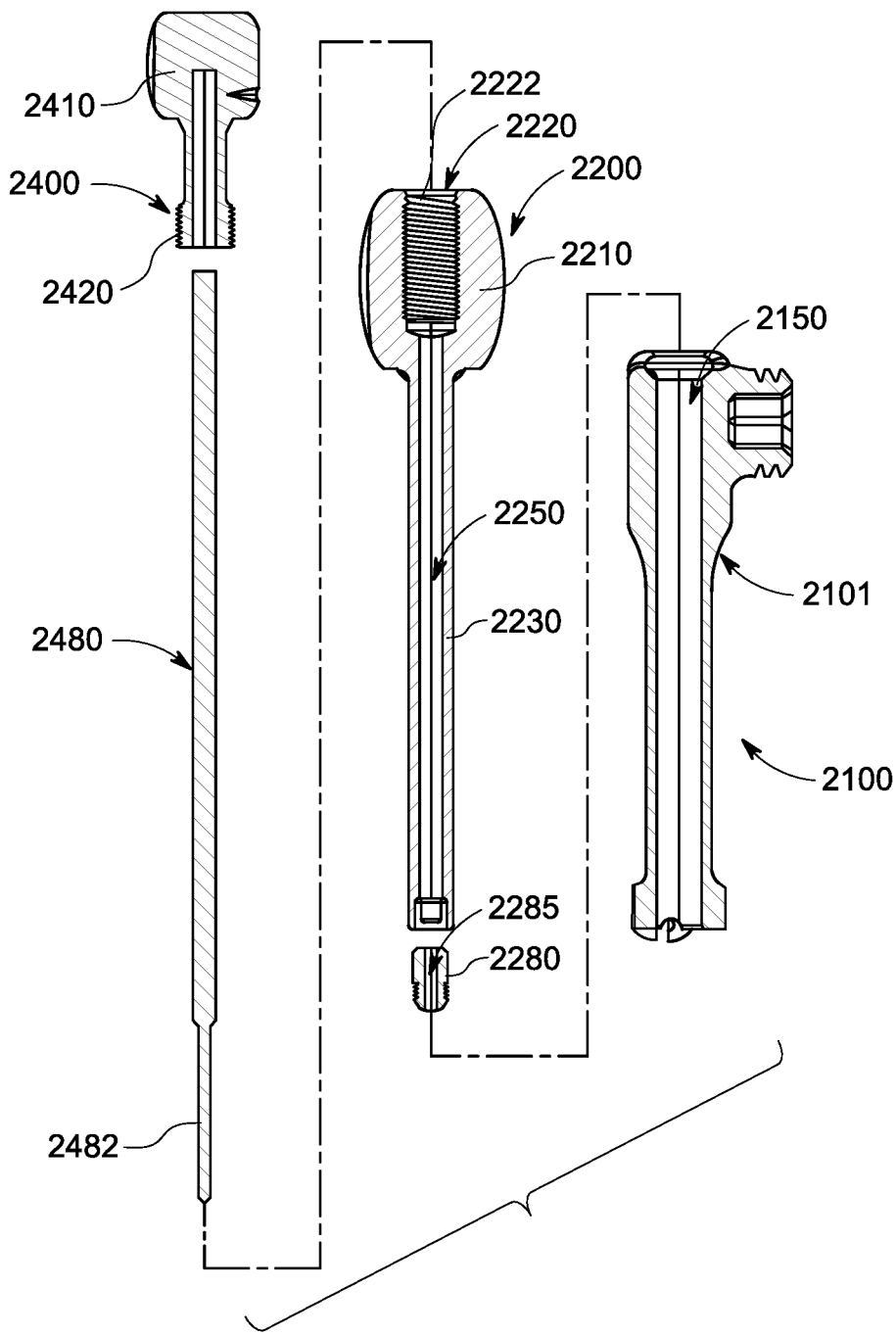
FIG. 25 is an enlarged, exploded cross-sectional view of the insertion guide assembly of FIG. 21, according to an embodiment of the present disclosure.

With reference now to FIGS. 6, 25, and 26, the plate holder 2200 includes a knob 2210 having a cavity 2220 (FIG. 25) with internal threads 2222 (FIG. 25), and an elongated hollow shaft 2230. The elongated shaft 2230 is receivable in the passageway 2150 (FIG. 2125) of body 2101 of the insertion guide 2100. The elongated shaft 2230 also include a passageway 2250 (FIG. 25). The threaded distal end 2280 of the elongated hollow shaft 2230 includes a passageway 2285 (FIG. 25). As described below, the threaded distal end 2280 is attachable to the plate 2300 (FIG. 1).

The docking pin 2400 includes a knob 2410 having an externally threaded end 2420, and an elongated pin 2480. The elongated pin 2480 is receivable in the passageway 2250 (FIG. 25) of the plate holder 2200. A distal end 2482 of the elongated pin 2480 may include a reduced diameter that is received and passes through passageway 2285 (FIG. 25) of threaded connector 2280 of plate connector 2200.

Referring now to FIGS. 27-34, the plate 2300 includes a body 2362 with a top surface 2364 opposite a bottom surface 2366, and a first side 2368 opposite a second side 2369. The plate 2300 may be, for example, a three-dimensional misshapen parallelogram which may be rounded on the ends, bottom surface and at least one side. The length of the top surface 2364 may be, for example, longer than the length of the bottom surface 2366 forming tapered ends. The plate 2300 may have a radius on the outer diameter of the first or medial side 2368 to accommodate the spinal anatomy.

Figure 33:
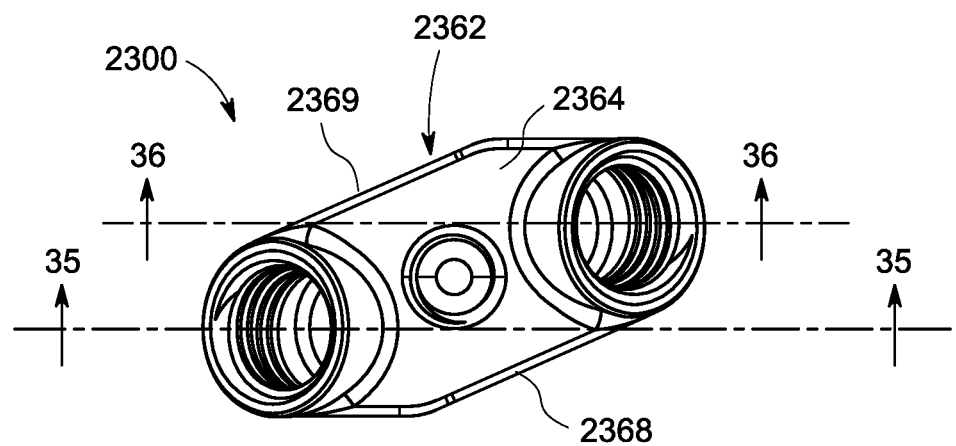
FIG. 33 is a top view of the plate of FIG. 27, according to an embodiment of the present disclosure.
Figure 34:
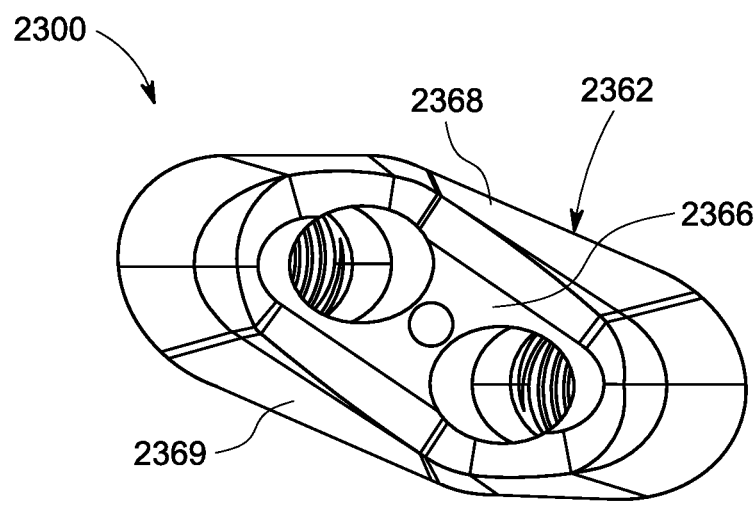
FIG. 34 is a bottom view of the plate of FIG. 27, according to an embodiment of the present disclosure.

In one embodiment, for example, the first side 2368 of the plate 2300 may have approximately a 15 degree angle transitioning into a 10 mm radius, although other angles and radius dimensions are contemplated. The plate 2300 may also be, for example, shaped to have a low profile to avoid bone and tissue impingement. In addition, the plate 2300 may be, for example, generally symmetric, for example, when viewed from above as shown in FIG. 33. The body 2362 of the plate 2300 may also have, for example, additional smoothing or rounded edges to accommodate a feature of a patient's anatomy while maintaining the necessary wall thickness in critical areas of the body 2362 to maintain strength while reducing the incident of bone or tissue impingement.

As shown in FIGS. 27, 28, 35, and 36, the plate 2300 may also contain a first channel 2372 and a second channel 2374. The first channel 2372 may extend through the body 2362 from the top surface 2364 to the bottom surface 2366. The second channel 2374 may extend through the body 2362 from the top surface 2364 to the bottom surface 2366.

Figure 35:
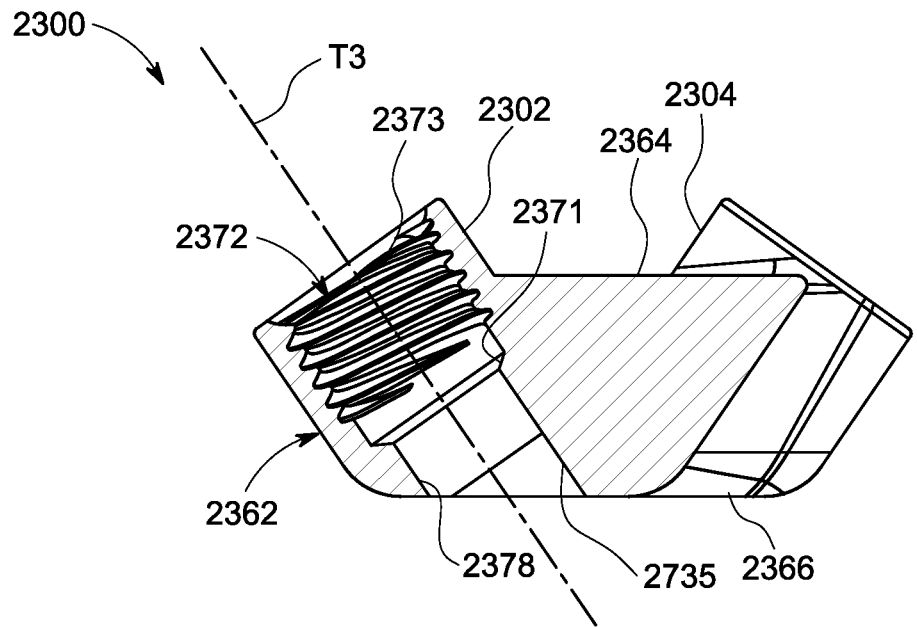
FIG. 35 is a cross-sectional view taken along line 35-35 in FIG. 33, according to an embodiment of the present disclosure.

As shown in FIG. 35, the first channel 2372 may define a first axis or first trajectory T3, which when the plate 2300 is attached to the lower portion of the insertion guide assembly 2003 (FIG. 1), the first trajectory T3 aligns with and is coaxial with the first trajectory T1 (FIG. 1). The first channel 2372 may include upper internal threads 2373, a conical seat 2371, a Morse tapered section 2378, and a lower cylindrical guide 2375.

Figure 36:
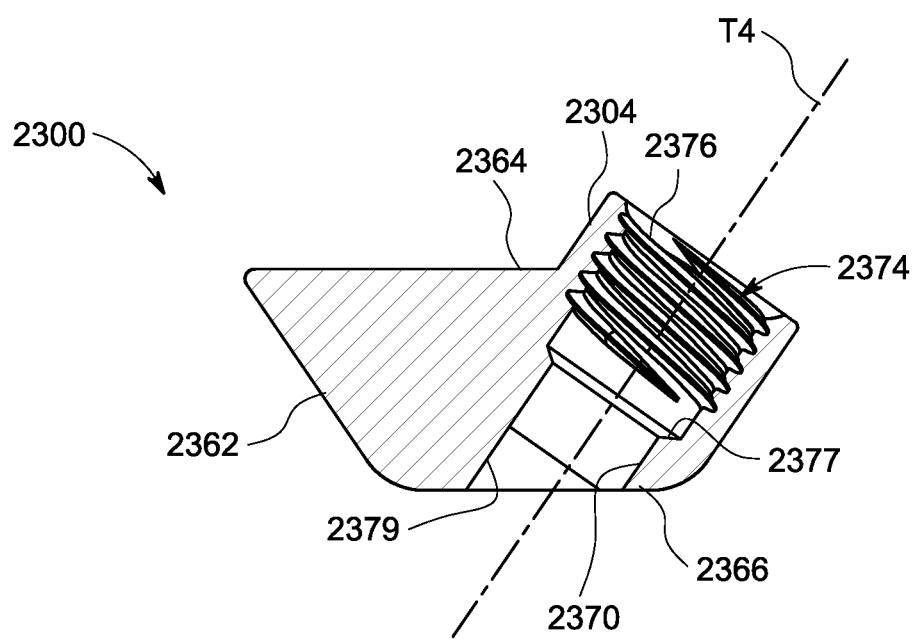
FIG. 36 is a cross-sectional view taken along line 36-36 in FIG. 33, according to an embodiment of the present disclosure.

As shown in FIG. 36, the second channel 2374 may define a second axis or second trajectory T4, which when the plate 2300 is attached to the lower portion of the insertion guide assembly 2003 (FIG. 1), the first trajectory T4 aligns with and is coaxial the second trajectory T2 (FIG. 1). The second channel 2374 may include upper internal threads 2376, a conical seat 2377, a Morse tapered section 2370 and a lower cylindrical guide 2379.

With reference again to FIG. 27, the plate 2300 may include the top surface 2364 defining a partial raised boss 2302 disposed around the first channel 2372. The plate 2300 may include the top surface 2364 defining a partial raised boss 2304 disposed around the second channel 2374.

Figure 37:
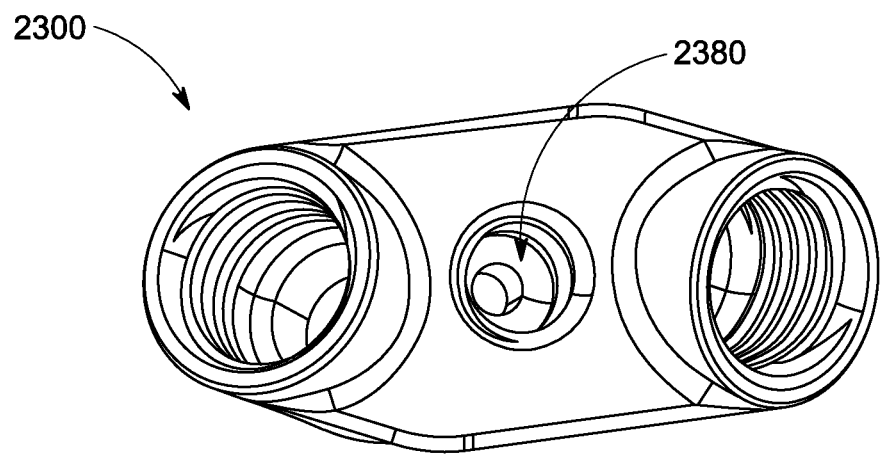
FIG. 37 is a top perspective view of the plate of FIG. 27, according to an embodiment of the present disclosure.
Figure 38:
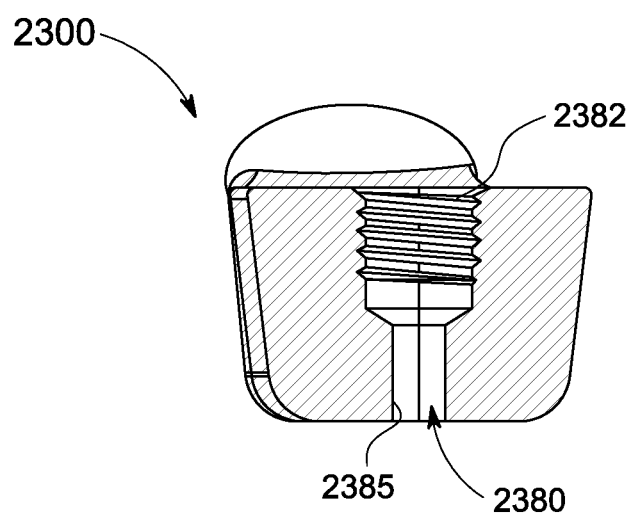
FIG. 38 is a cross-sectional view taken along line 38-38 in FIG. 29, according to an embodiment of the present disclosure.

With reference to FIGS. 37 and 38, the plate 2300 may include a center through-hole 2380 such as counter sunk hole having an upper internally threaded portion 2382 (FIG. 37) and a lower smaller sized through-hole 2385 (FIG. 37). The threaded portion is sized to attach to the threaded distal end 2280 (FIG. 26) of the plate holder 2200 (FIG. 26). The smaller through-hole 2385 is sized to receive the distal end 2482 (FIG. 26) of the docking pin 2400 (FIG. 26).

Figure 39:
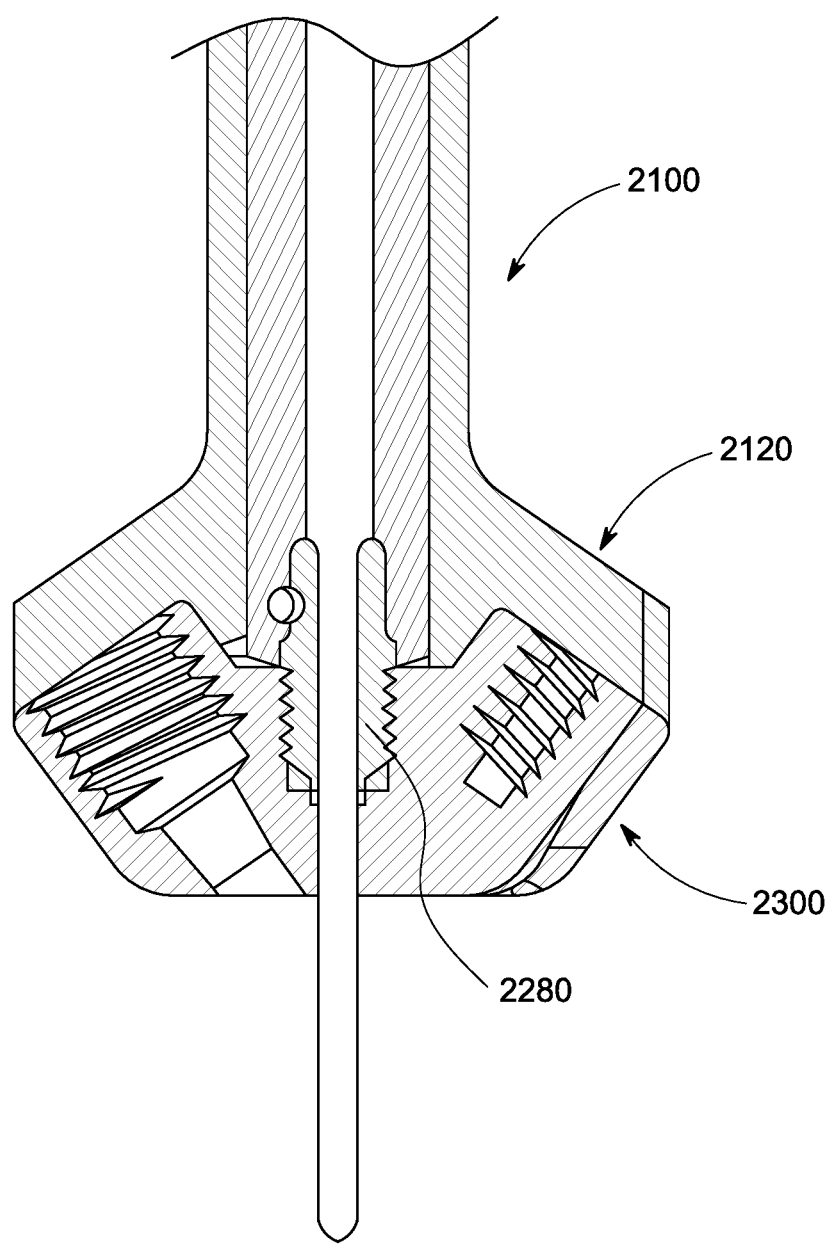
FIG. 39 is an enlarged cross-sectional view of the lower end of the insertion guide assembly of FIG. 1, according to an embodiment of the present disclosure.
Figure 40:
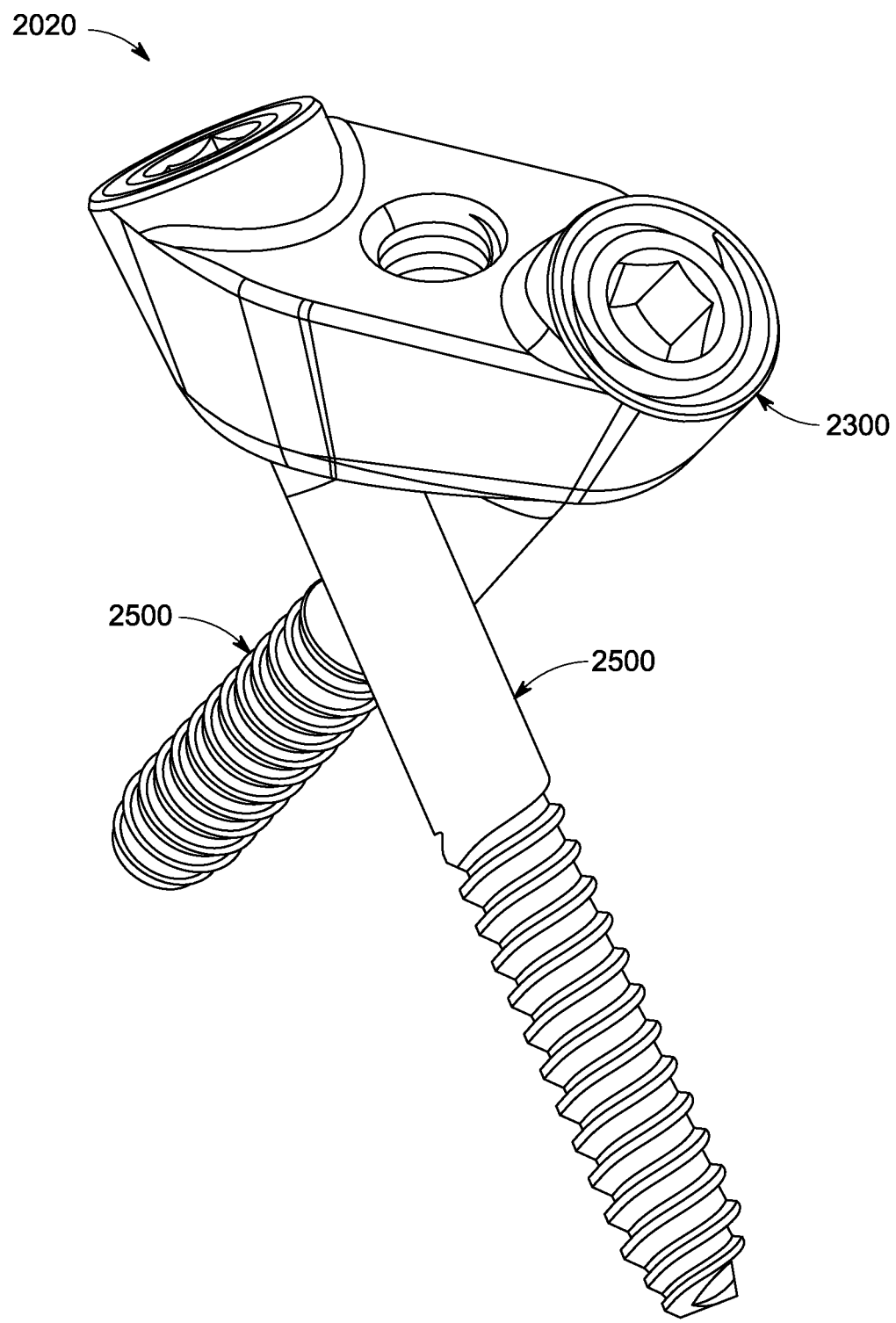
FIG. 40 is a perspective view of a bone fusion system, according to an embodiment of the present disclosure.
Figure 41:
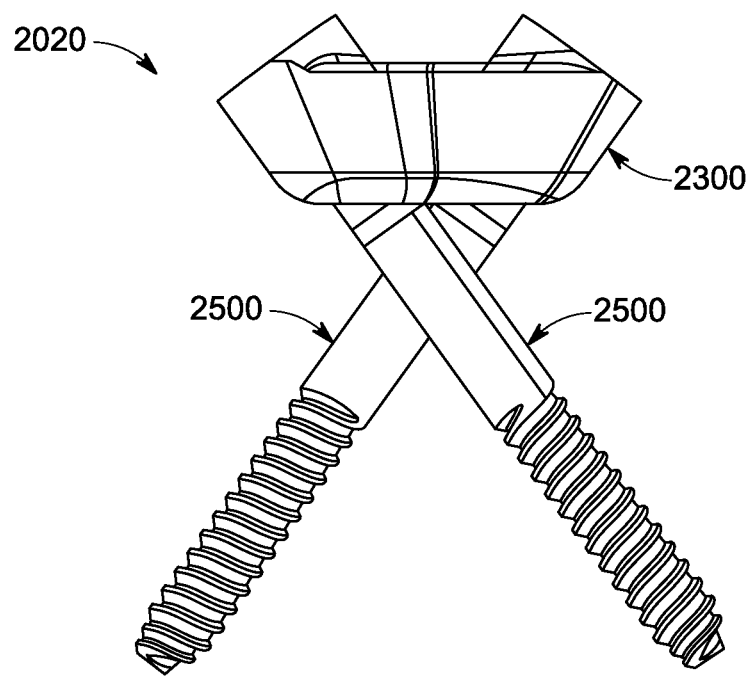
FIG. 41 is a front elevational view of the bone fusion system of FIG. 40, according to an embodiment of the present disclosure.
Figure 42:
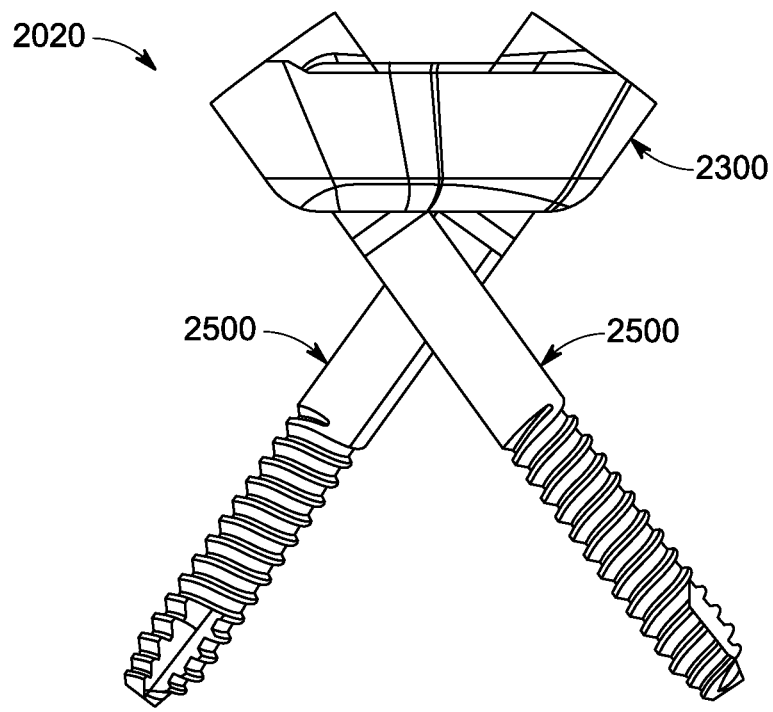
FIG. 42 is a rear elevational view of the bone fusion system of FIG. 40, according to an embodiment of the present disclosure.
Figures 43, 44:
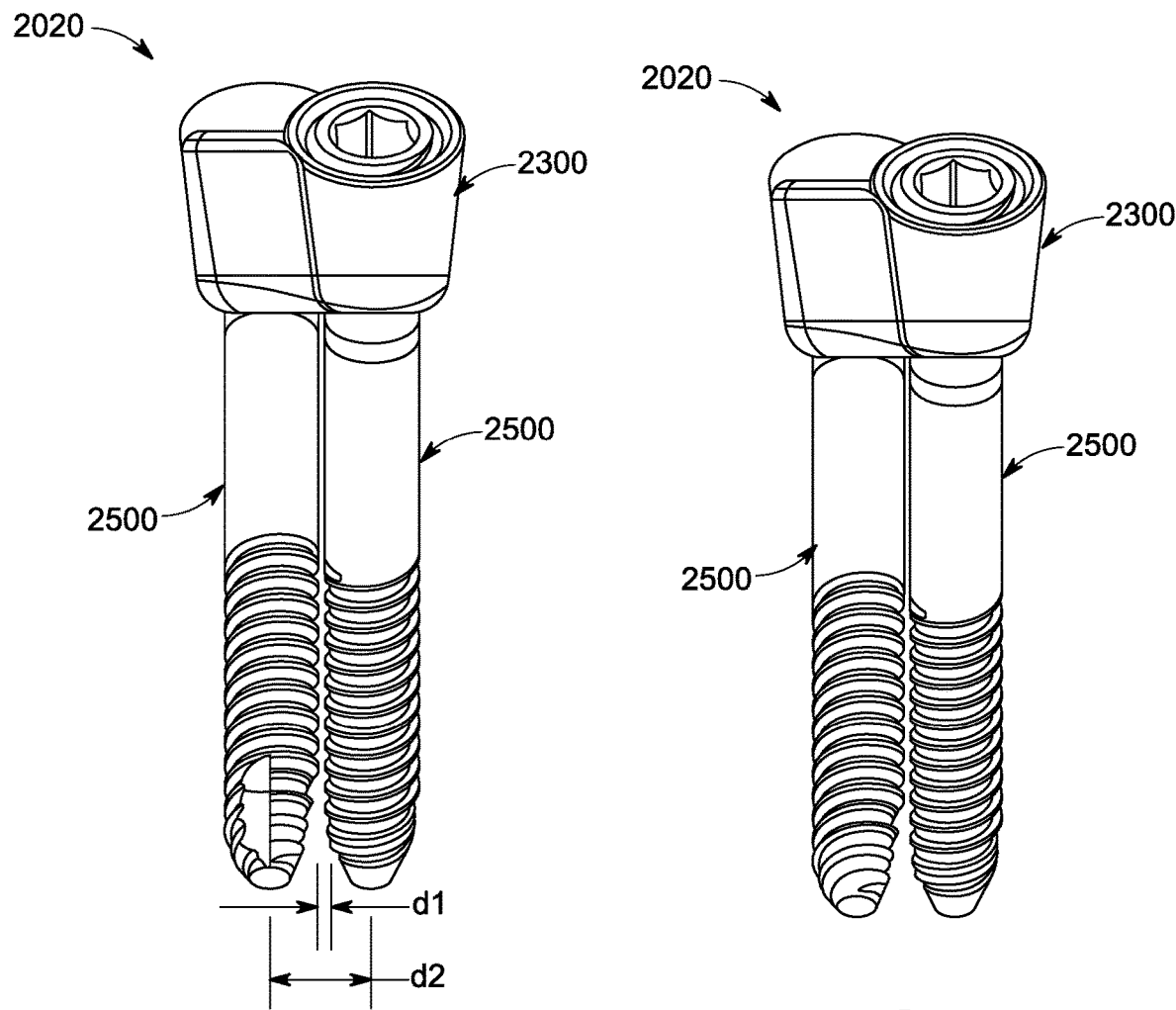
FIG. 43 is a left side elevational view of the bone fusion system of FIG. 40, according to an embodiment of the present disclosure.
FIG. 44 is a right side elevational view of bone the fusion system of FIG. 40, according to an embodiment of the present disclosure.

FIG. 39 illustrates the nesting of the upper portion and bosses of the plate 2300 to lower portion 2120 of insertion guide 2100 with the distal end 2280 threadably received in the threaded central opening 2380 to secure the plate 2300 to the insertion guide 2100. From the present disclosure, it will be appreciated that other plate and insertion guide configurations and/or securing mechanisms may be employed. In addition, the plate 2300 and/or the insertion guide assembly 2003 (FIG. 1) may include markings or other indicia to aid a surgeon orienting the implant system 2000 (FIG. 1) visually or using fluoroscopy.

With reference to FIGS. 40-46, a bone fusion system 2020 may be, for example, a three piece construct including the plate 2300, a first fixation element 2500, and a second fixation element 2500. The fixation elements may be cannulated fasteners, fixation screws, bone screws, fixation members, fasteners, screws, pegs, pins, and the like as known by one of ordinary skill in the art. The fixation elements may be, for example smooth or threaded. The two fixation elements are configured or sized and shaped to provide a non-co-planar screw trajectory while allow for or achieving fusion. The plate 2300 is sized and shaped or configured to assist or aid with the positioning of the two insertion guides as described above, and also with aiding and guiding the two fixation elements into a patient's vertebrae. For example, the plate 2300 may be used to aid the guiding of the fixation elements into divergent aspects of the vertebrae and to lock the two divergent fixation elements into place. Specifically, the plate 2300 may be used to aid in the guiding of a first fixation element into a patient's pedicle and a second fixation element into the patient's facet/pedicle of a vertebrae, or vice versa. In other embodiment, a bone fusion system for use with guide assembly 2100 may be a five piece construct including a first set screw and a second set screw as described in greater detail below.

As described below, the fixation elements 2500 may be guided by guide wires (not shown in FIGS. 40-46) and guided by the channels in the plate 2300 and into the bone. The second fixation element 2500 is implanted at the opposite angle from the first fixation element 2500 and may be offset by a distance d1 such as to allow the screws to pass to their desired final position. The compound angle of the fixation elements generally forms a "V" shape, where the fixation elements are at opposing angles and where one fixation element may be medial or lateral to the opposite fixation element by a distance d2 between the centers of the fixation elements. The compound angle may be, for example, approximately 50-85 degrees. The two fixation elements that form the "V" shape are then securely locked into place in the plate 230, thus locking the fixation elements to prevent rotation and axial displacement to secure the entire rigid construct.

Figure 45:
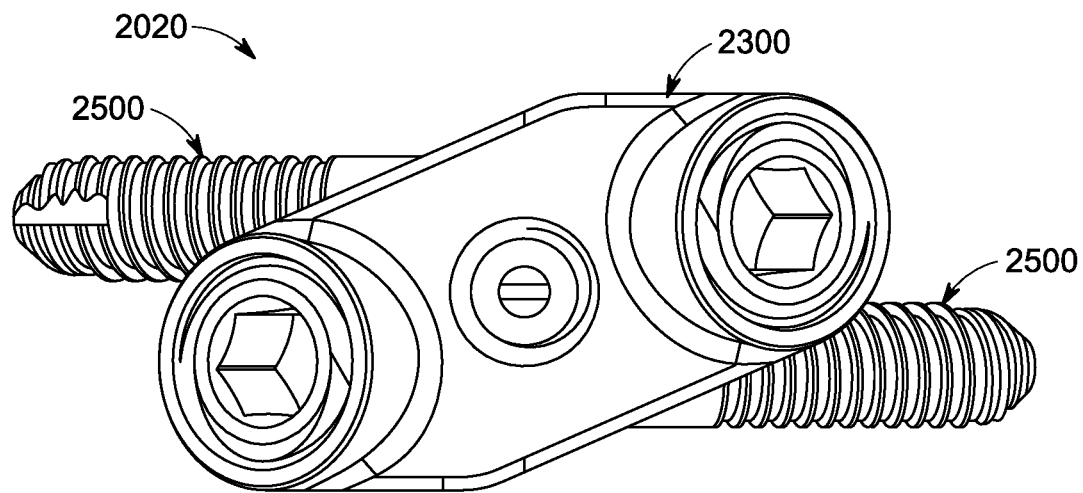
FIG. 45 is a top perspective view of the bone fusion system of FIG. 40, according to an embodiment of the present disclosure.
Figure 46:
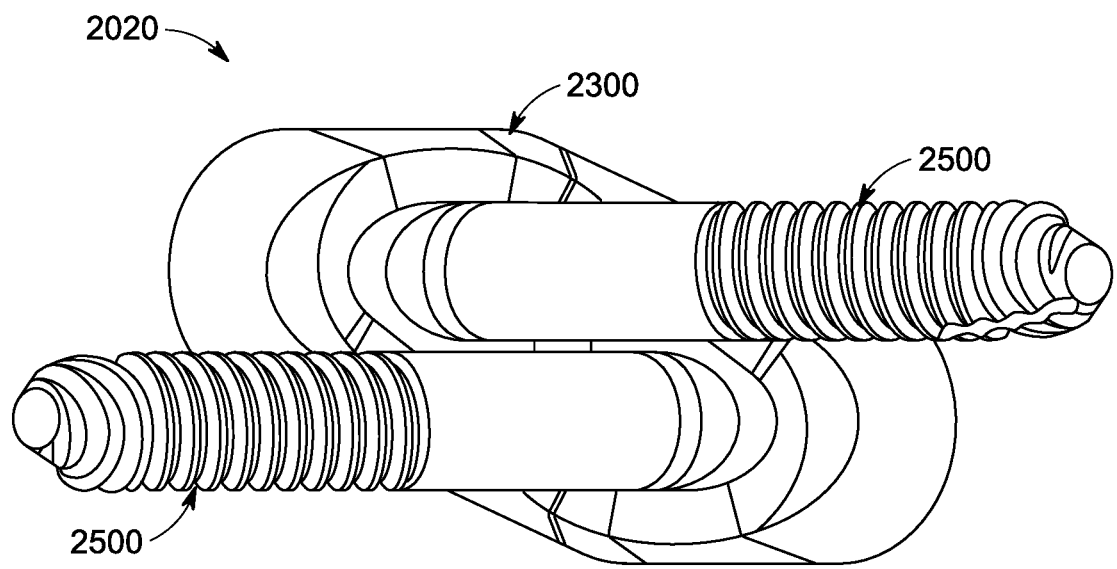
FIG. 46 is a bottom perspective view of the bone fusion system of FIG. 40, according to an embodiment of the present disclosure.
Figure 47:
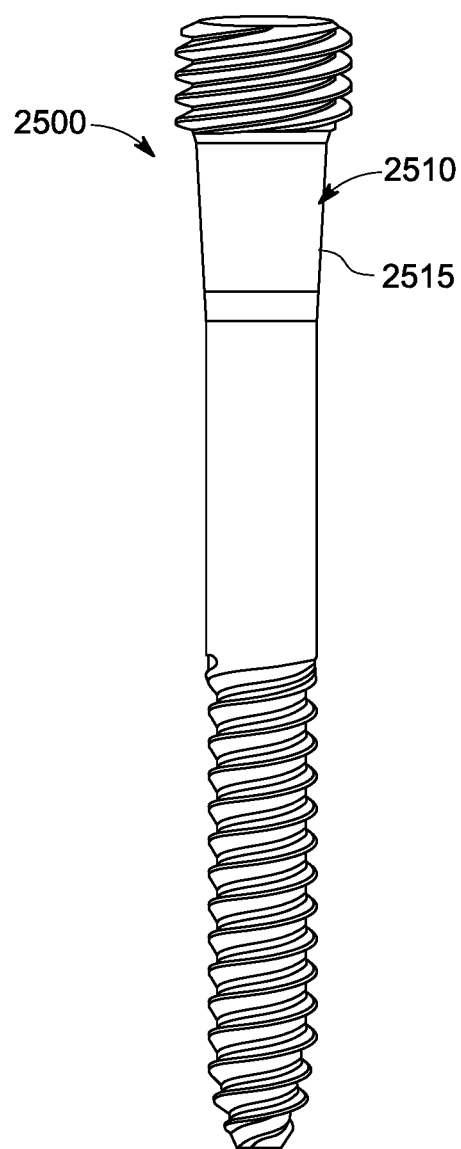
FIG. 47 is an enlarged front elevational view of the fixation element of the bone fusion system of FIG. 40, according to an embodiment of the present disclosure.
Figure 48:
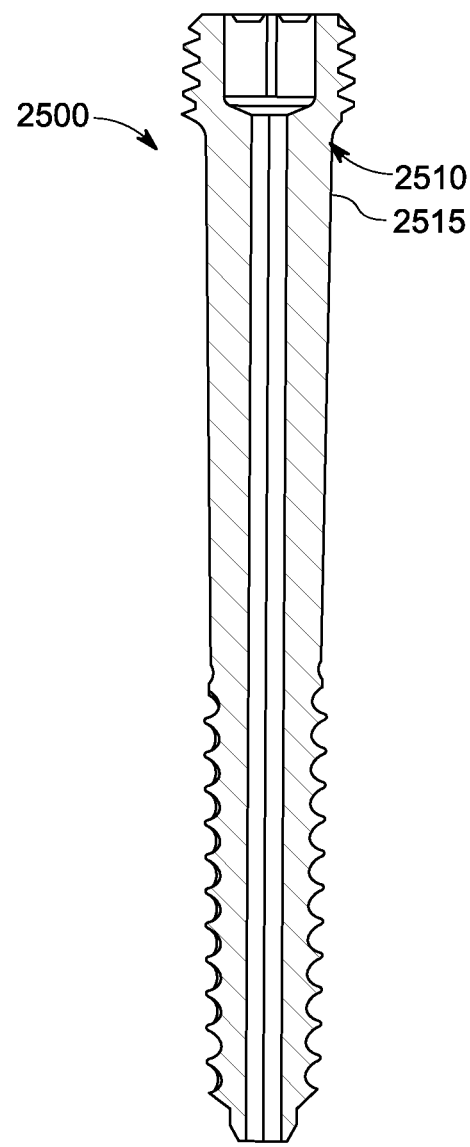
FIG. 48 is a cross-sectional view of the fixation element of FIG. 47, according to an embodiment of the present disclosure.
Figure 49:
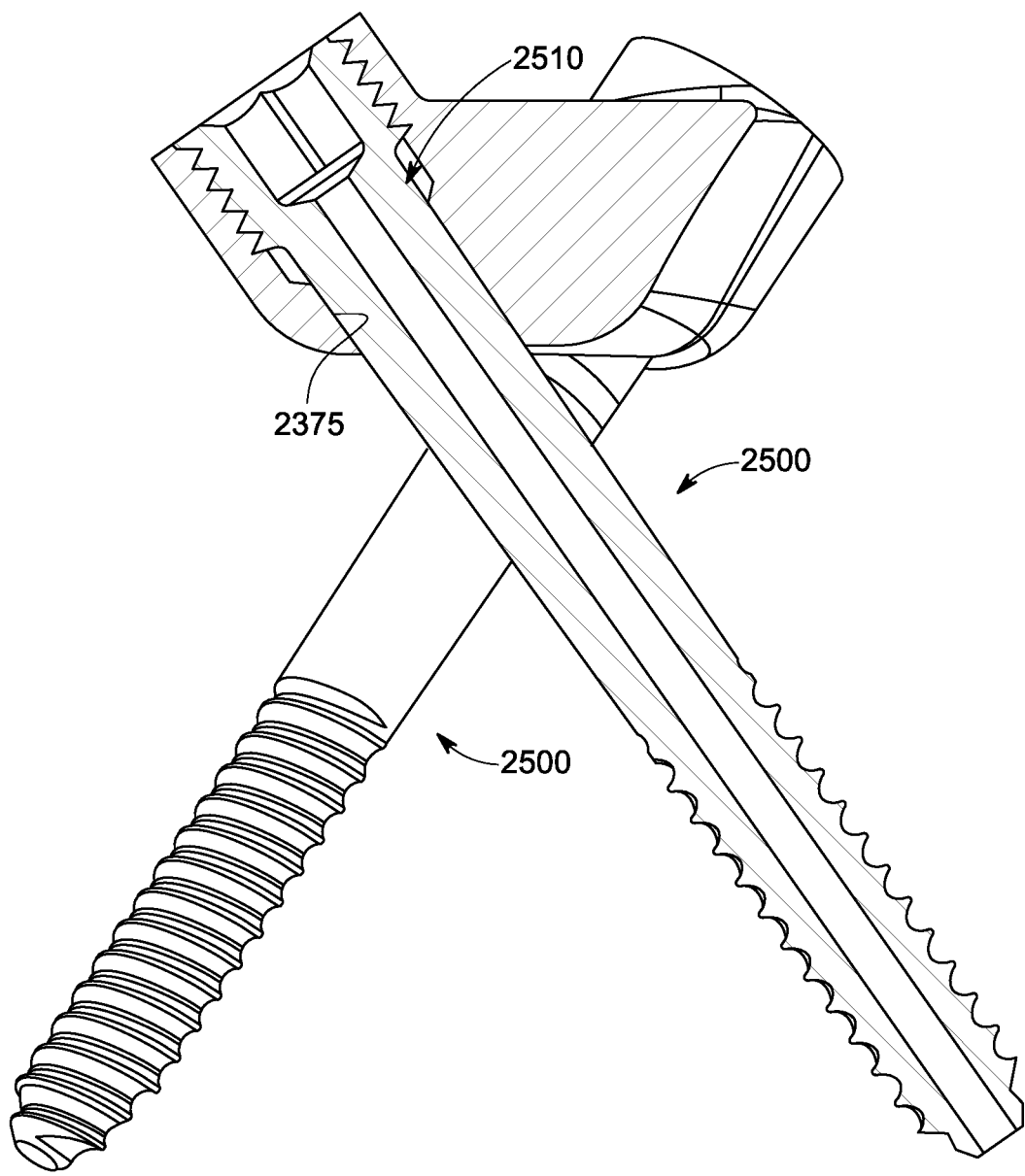
FIG. 49 is an enlarged cross-sectional view of the bone fusion system of FIG. 40, according to an embodiment of the present disclosure.

As shown in FIGS. 47-49, the fixation element 2500 may include an upper potion 2510 having a taper 2515 that matches the taper of the lower cylindrical guide 2375 (FIG. 49) of the first channel in the plate 2300. Once the fixation element 2500 is implanted in a bone and the taper on the upper portion 2510 of the fixation element 2500 makes contact with the taper of the lower portion of the channel 2375 (FIG. 49) of the plate 2300, the taper of the fixation element 2500 will lock to the plate. The taper may be between 1 degree and 8 degrees, or any suitable taper and form a Morse taper connection. Other connections such as snap fit connections (whether using snap rings or not), and the like may be suitably employed. The fixation element 2500 may include a drive opening at an upper end for use in installation in plate 2300 as shown in FIG. 45. The second fixation element 2500 (FIG. 49) may be similarly attached to the implant 2300. The fixation elements may be curved at the distal ends.

FIGS. 50-61 illustrate method steps for using implant system 2000 (FIG. 1) and a plate 2300, according to an embodiment of the present disclosure. Initially, the method may include operably assembling and attaching the plate 2300 (FIG. 1) to the insertion guide 2100 (FIG. 1) with the plate holder 2200 (FIG. 1) without the docking pin 2400 (FIG. 1). The table mount 2900 (FIG. 3) is mounted to the table and assembled insertion guide, plate holder, and plate may then be attached to the table mount 2900 (FIG. 3).

After determining an initial incision for the patient, for example, using lateral fluoroscopy, a midline skin incision is marked and made, the ipsilateral fascia is cut, and the paraspinal muscles are dissected from the spinous processes.

Figure 50:
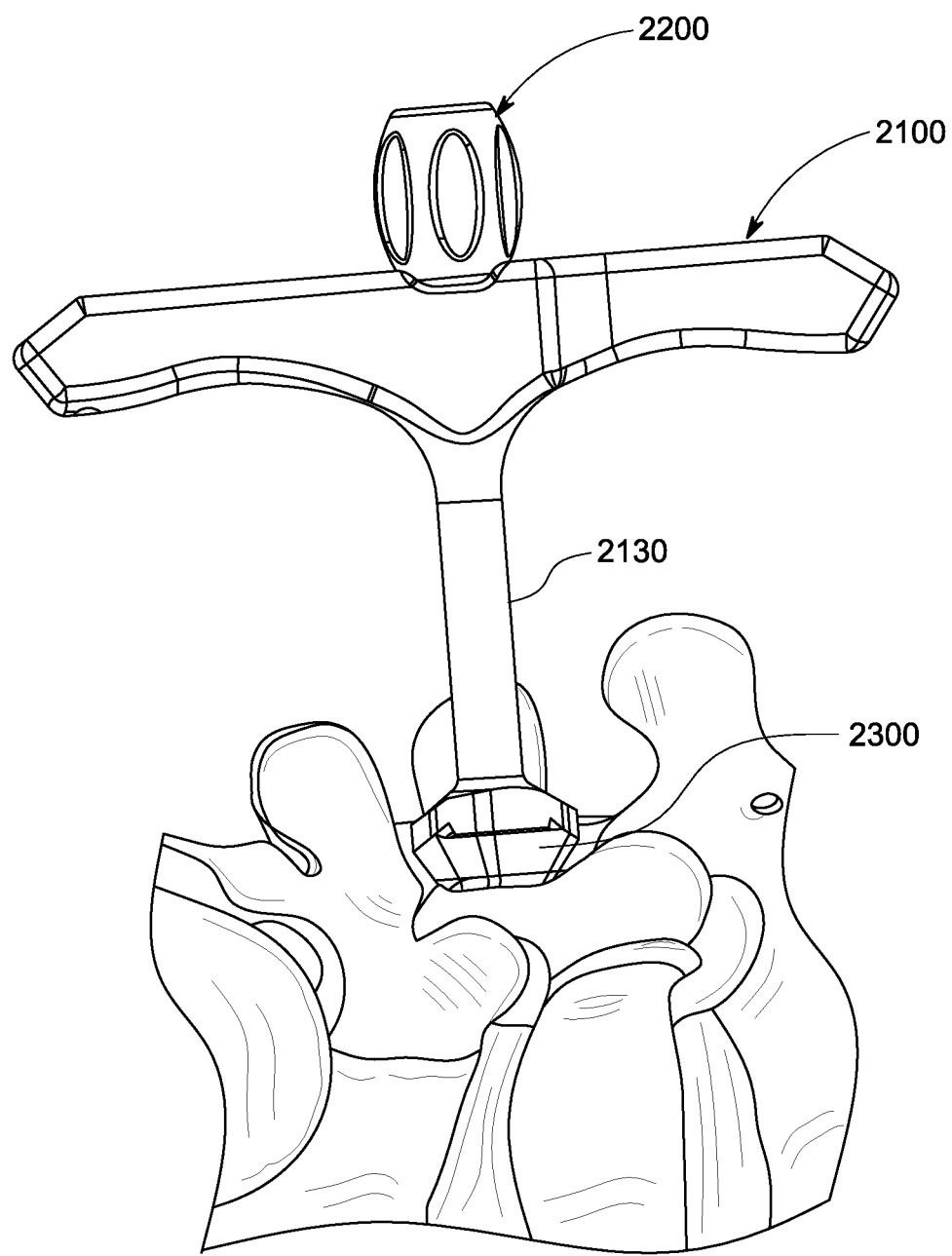
FIGS. 50-61 are side views and fluoroscopy images of a process of positioning the implant system of FIG. 1 on a vertebrae, according to an embodiment of the present disclosure.

As shown in FIG. 50, the assembled insertion guide 2100, plate holder 2200, and plate 2300 is placed directly over the vertebrae or disc space intended to be stabilized. For example, the center portion 2130 of the insertion guide 2100 may be lined up over and placed into the incision or over the inferior endplate depending on the level and the patient's anatomy.

Figure 51:
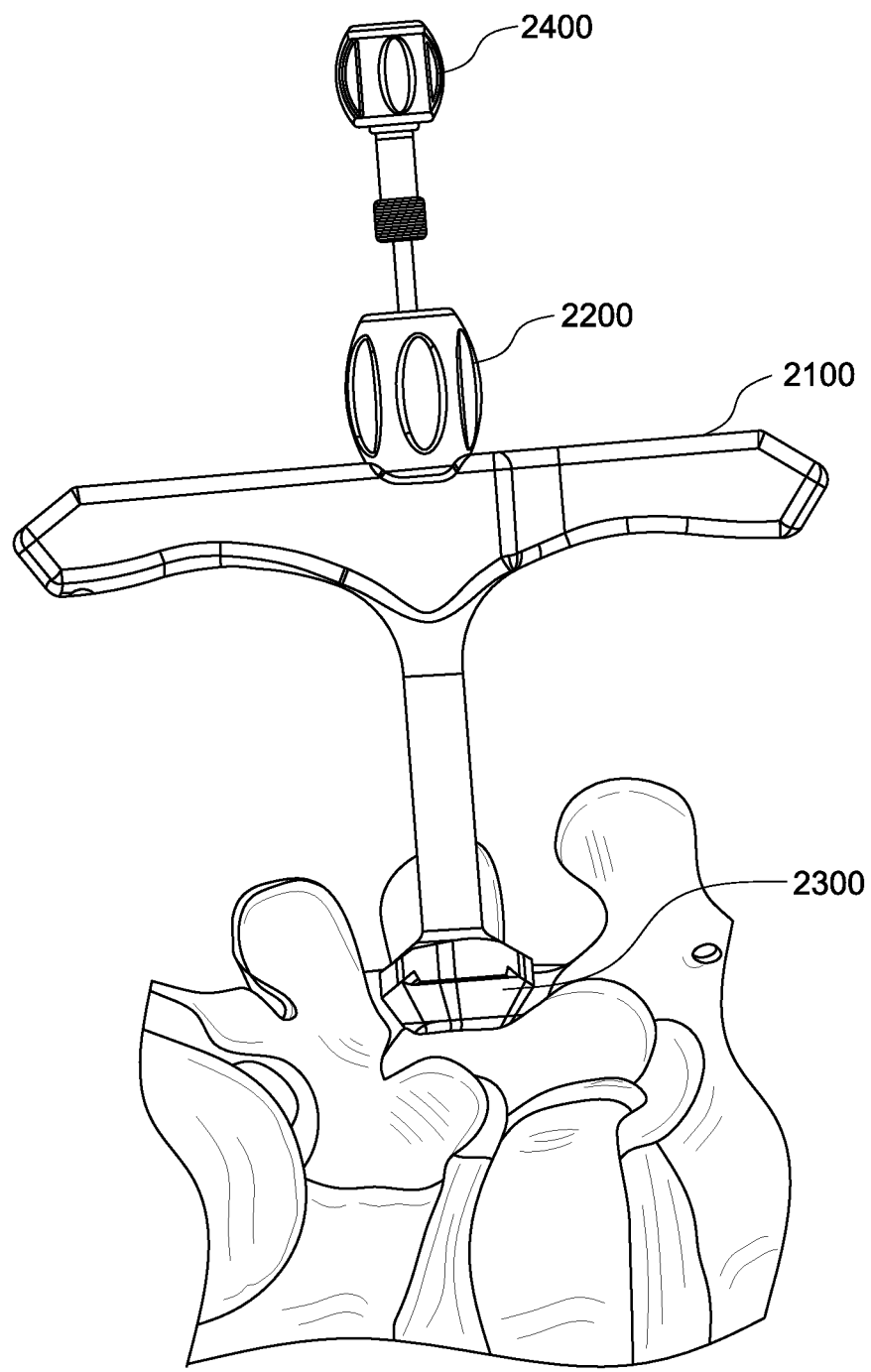
Figure 52:
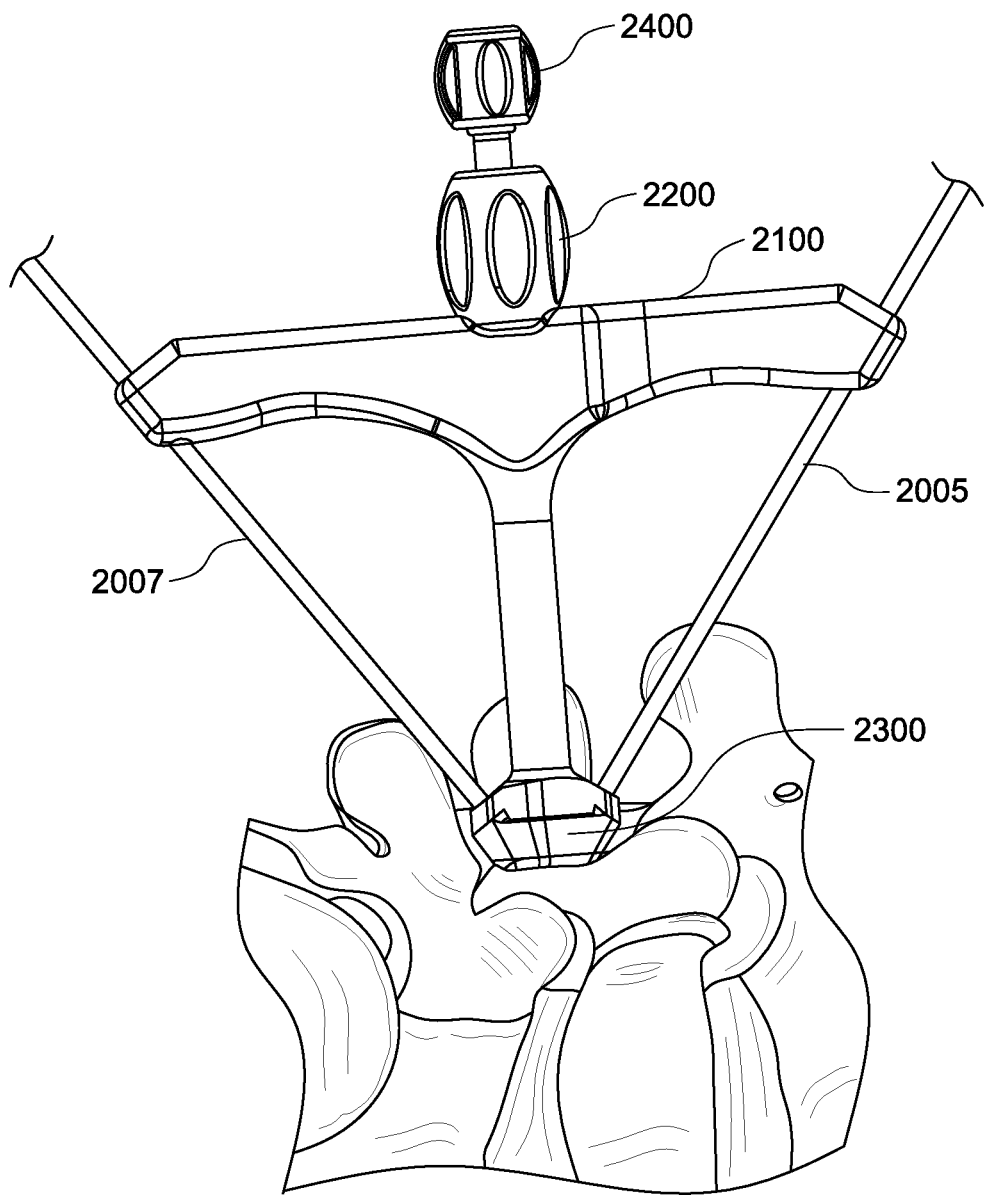
Figure 53:
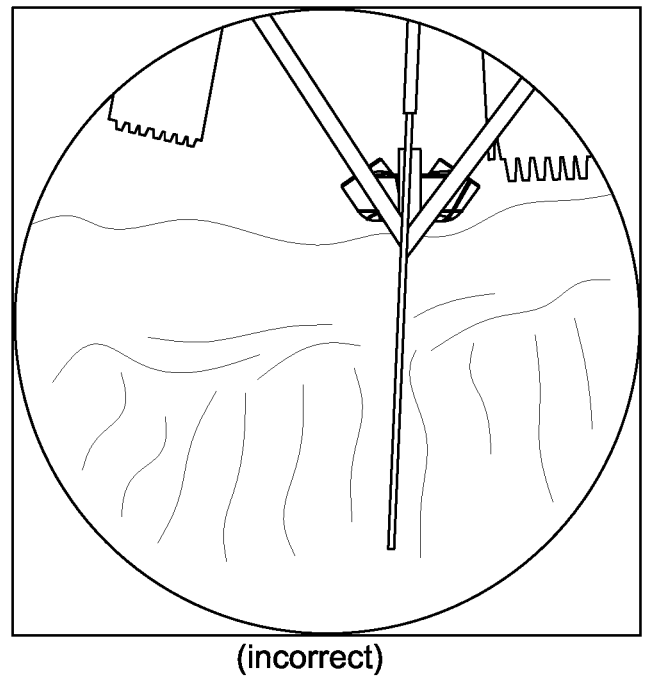
Figure 54:
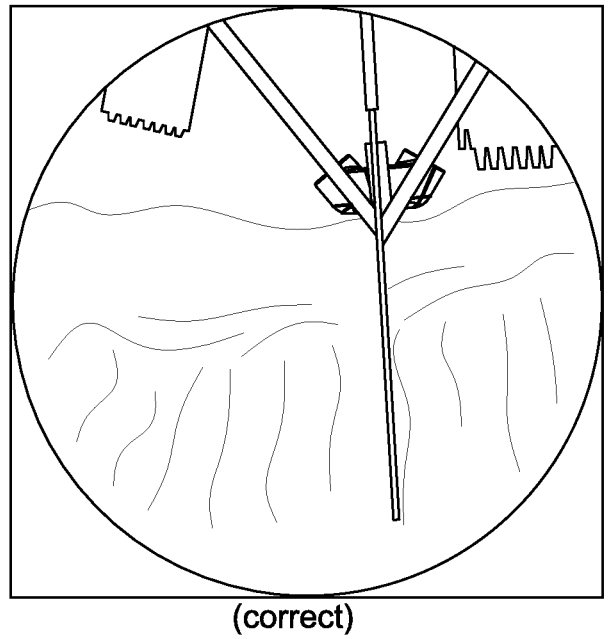
Figure 55:
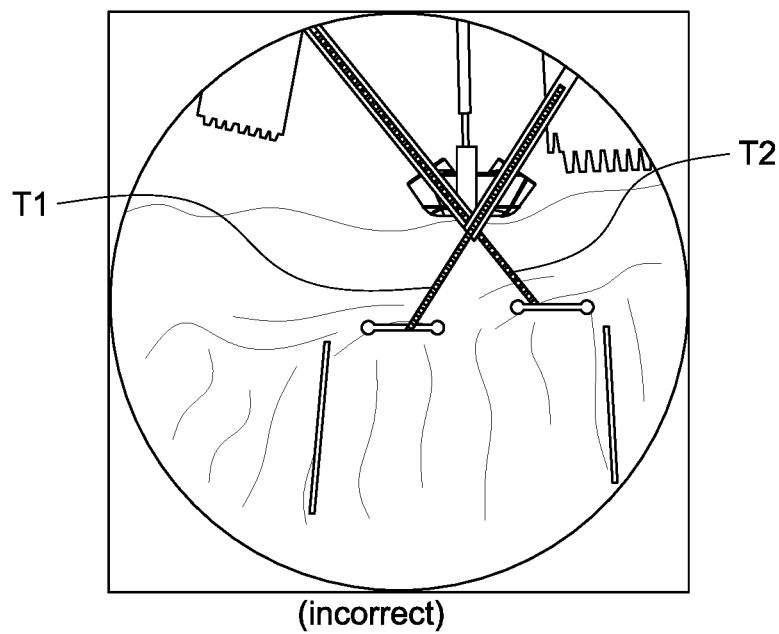
Figure 56:
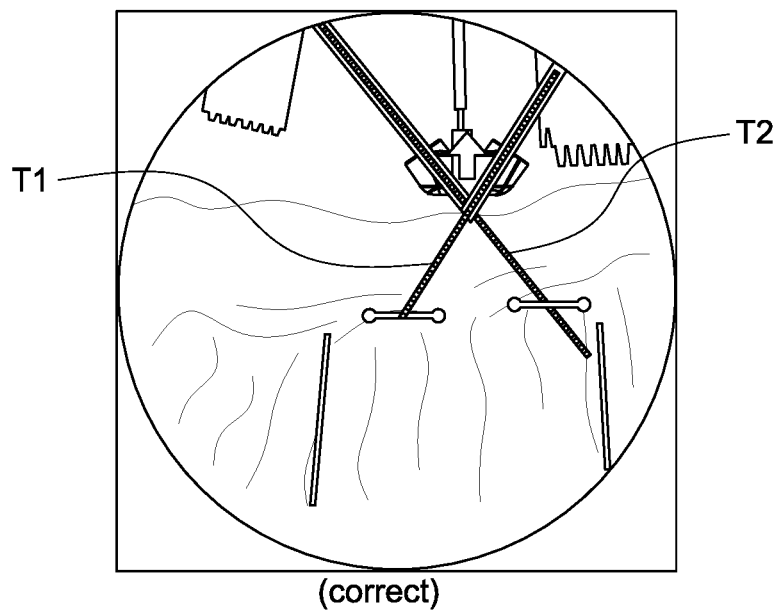
Figure 57:
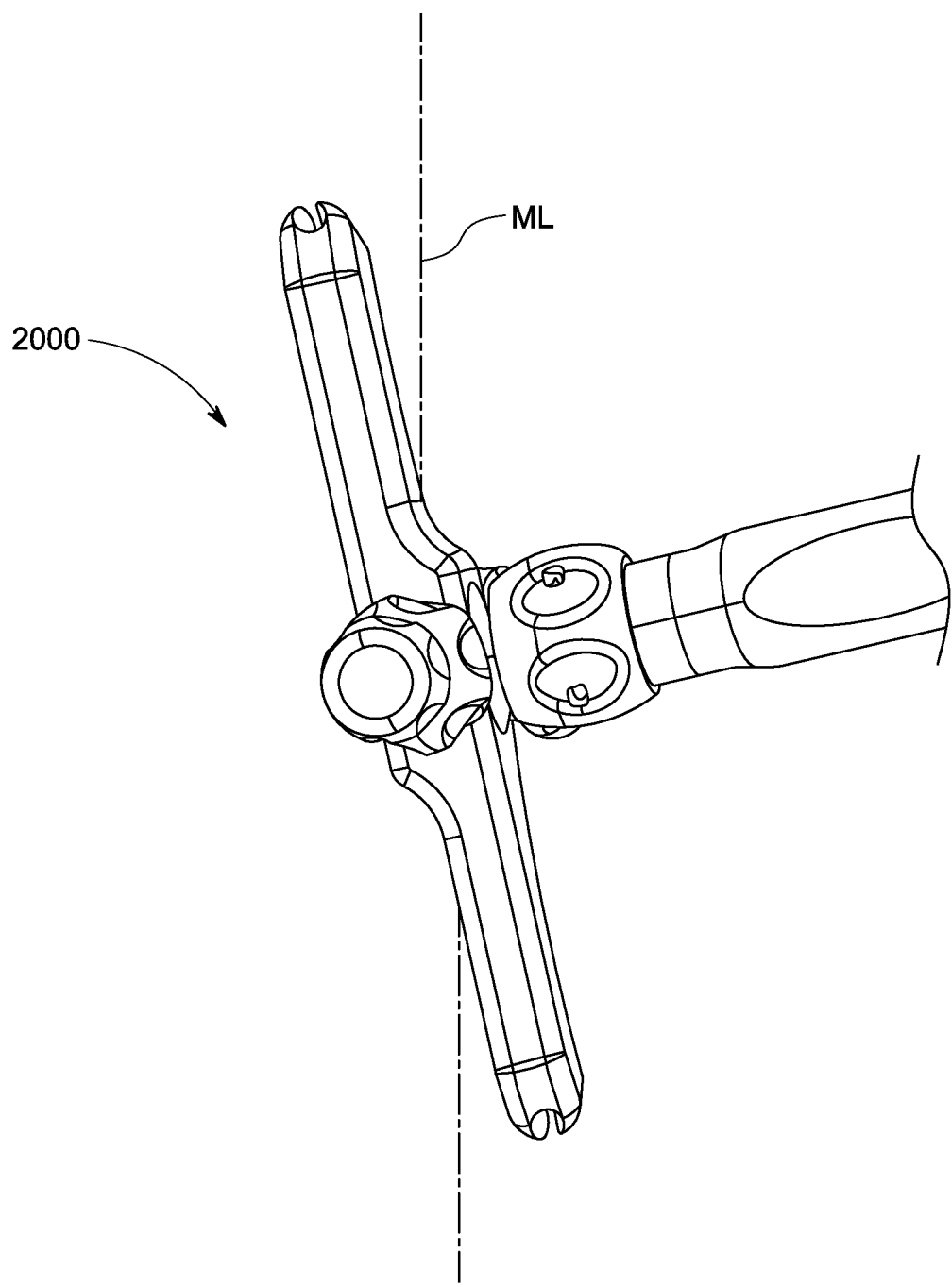

As shown in FIG. 51, the docking pin 2400 is inserted into the passageway in the plate holder 2200, and rotated so that the distal end of the docking pin 2400 extends below the bottom of the plate 2300 and is inserted into the lamina/facet for about 1 to about 2 millimeters (mm) as shown in FIG. 52. For example, the docking pin 2400 is rotated so that the distal end extends from the bottom of the plate 2300 into the facet/lamina. Once the docking pin 2400 is installed into the facet/lamina, using fluoroscopy the docking pin 2400 is tilted and pointed, e.g., parallel to the inferior endplates. Incisions for cannulas 2005 and 2007 (e.g., Jamshidi-type needles) are made, and the cannulas 2005 and 2007 or drills may be inserted. Using fluoroscopy, the assembled insertion guide plate holder, and docking pin tilt is checked and re-pointed if necessary. e.g., parallel to inferior endplate, as shown in FIGS. 53 and 54. Using fluoroscopy, the height above the lamina/facet is adjusted, to optimize the trajectories T1 and T2 to match the patient anatomy, for example, by rotating pin device 2400 or moving the insertion guide assembly, as shown in FIGS. 55 and 56. With reference to FIG. 57, the table mount 2900 (FIG. 3) may be adjusted to angle or twist the implant system 2000 to twist the caudal-aimed guide arm toward the midline ML and to aim both fixation elements such as screws toward the pedicles. For example, the insertion guide assembly is rotated to that the implant lines are parallel with the midline ML. Using fluoroscopy, the trajectories are verified in the sagittal plane.

Figure 58:
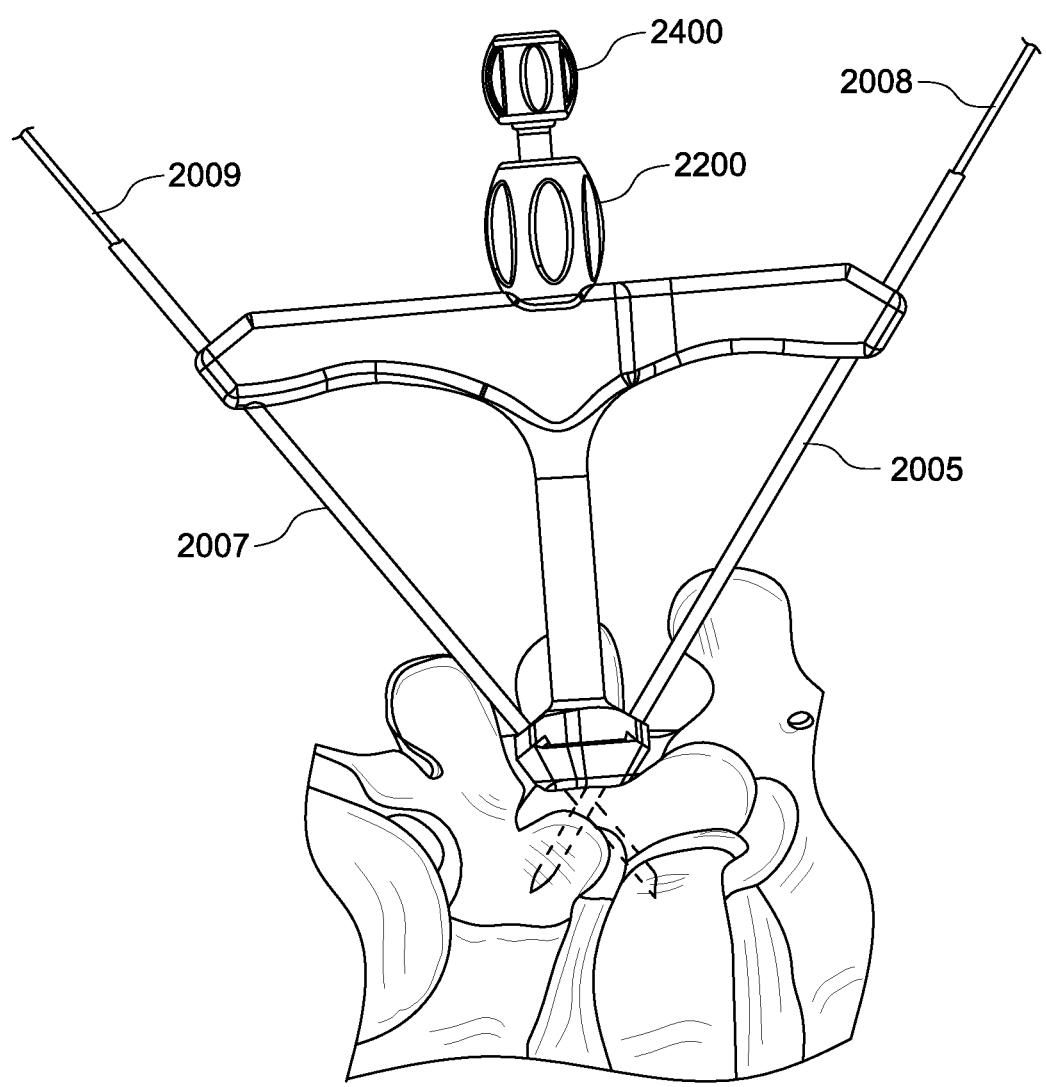

As shown in FIG. 58, a first K-wire 2008 is inserted through the first cannula 2005 and driven into the bone, a second K-wire 2009 is inserted through the second cannula 2007 and driven into the bone, and the trajectories of the K-wires is confirmed on the sagittal and AP view.

Figure 59:
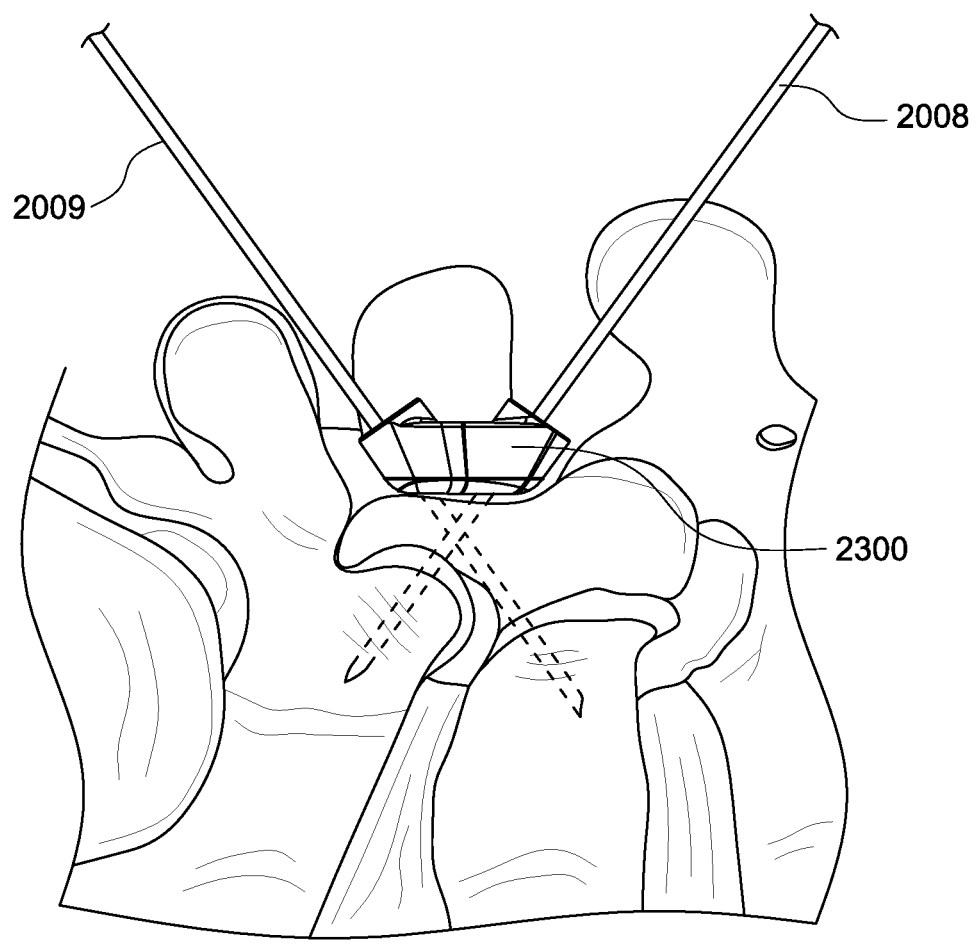

With reference to FIG. 59, the cannulas 2005 and 2008 (FIG. 58) are removed and then the insertion guide system is removed. For example, the docking pin 2400 (FIG. 58) is rotated, e.g., unthreaded, and removed from the plate holder 2200, and the plate holder 2200 is rotated and disconnected from the plate 2300. Alternatively, the plate holder 2200 (FIG. 58) may be rotated, and removed along with the docking pin 2400 (FIG. 58). To remove the insertion guide, the K-wires are bent out of lateral slots in the insertion guide (outside and inside the incision). If bilateral fixation is desired, the process may be repeated to install a second set of guidewires.

Figure 60:
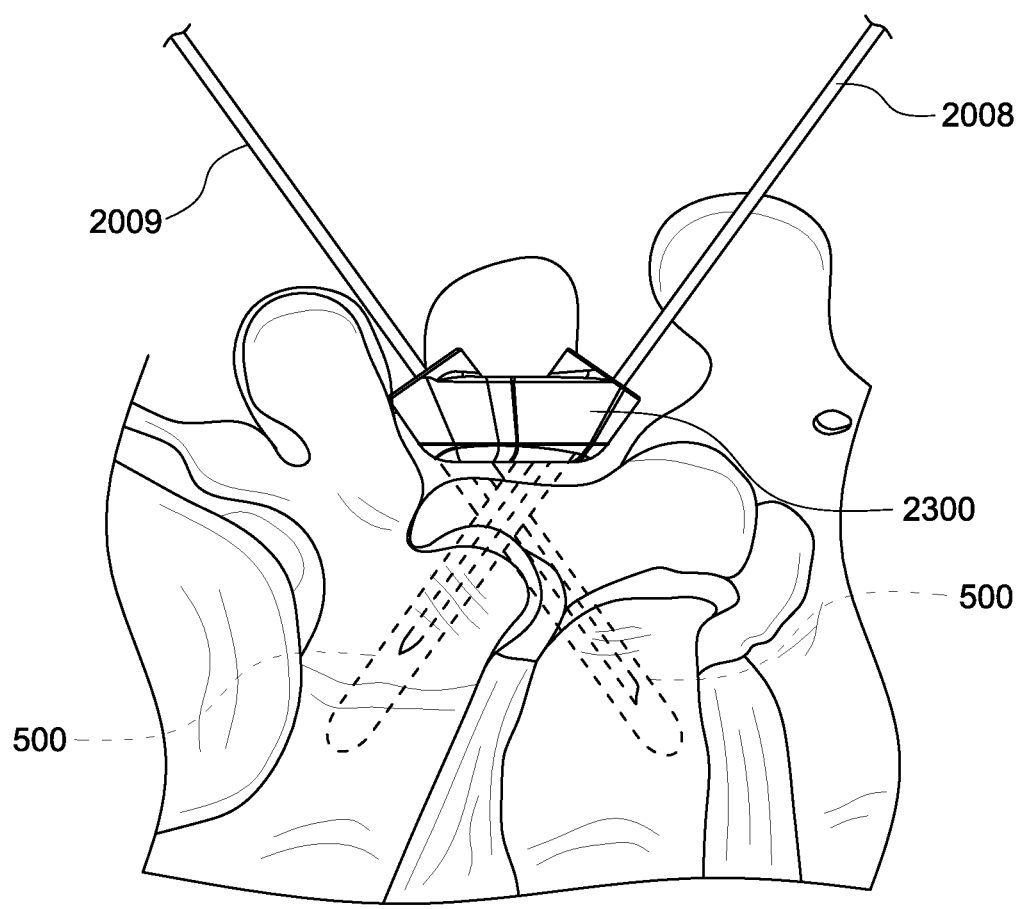

With reference to FIGS. 59 and 60, pilot holes are drilled into the hard bone. A first cannulated facet/pedicle fixation element 500 (FIG. 60) is slid over the first K-wire 2008 and passed through the plate 2300. The first fixation element 500 (FIG. 60) is then and driven into the bone, for example, the facet and pedicle, and confirming the placement with fluoroscopy. A second cannulated facet/pedicle fixation element 500 (FIG. 60) is slide over the second K-wire 2009 and passed through the plate 2300. The second fixation element 500 (FIG. 60) is then and driven into the bone, for example, the facet and pedicle, and confirming the placement with fluoroscopy. For example, to advance the fixation elements to provisionally engage the plate and screw threads, alternate ¼ turns between the first and second fixation elements until the heads of the fixation elements are seated in the plate. For hard bone, the threads of the fixation element may be cut.

Figure 61:
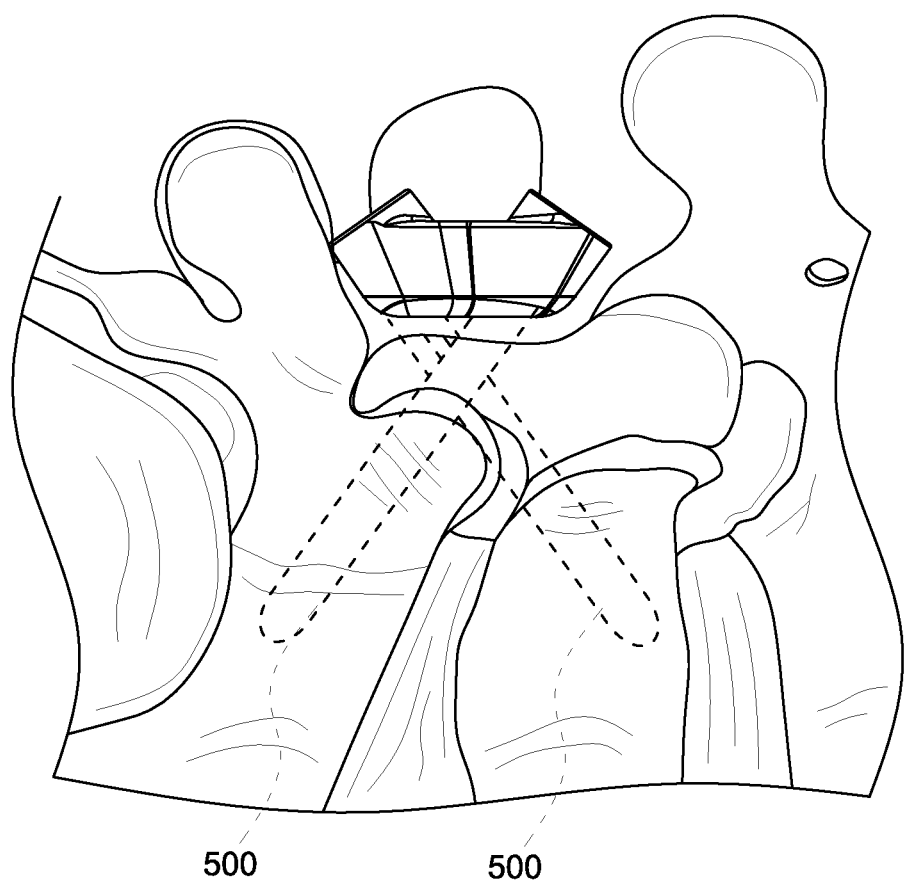

With reference to FIG. 61, the K-wires 2008 and 2009 (FIG. 60) are removed and the fixation elements 500 are tightened with counter-torque. The plate and fixation elements are confirmed using A/P and lateral placement fluoroscopy. If desired, a surgeon can proceed to a contralateral side or an adjacent level with another plate and repeat the above process.

Figure 62:
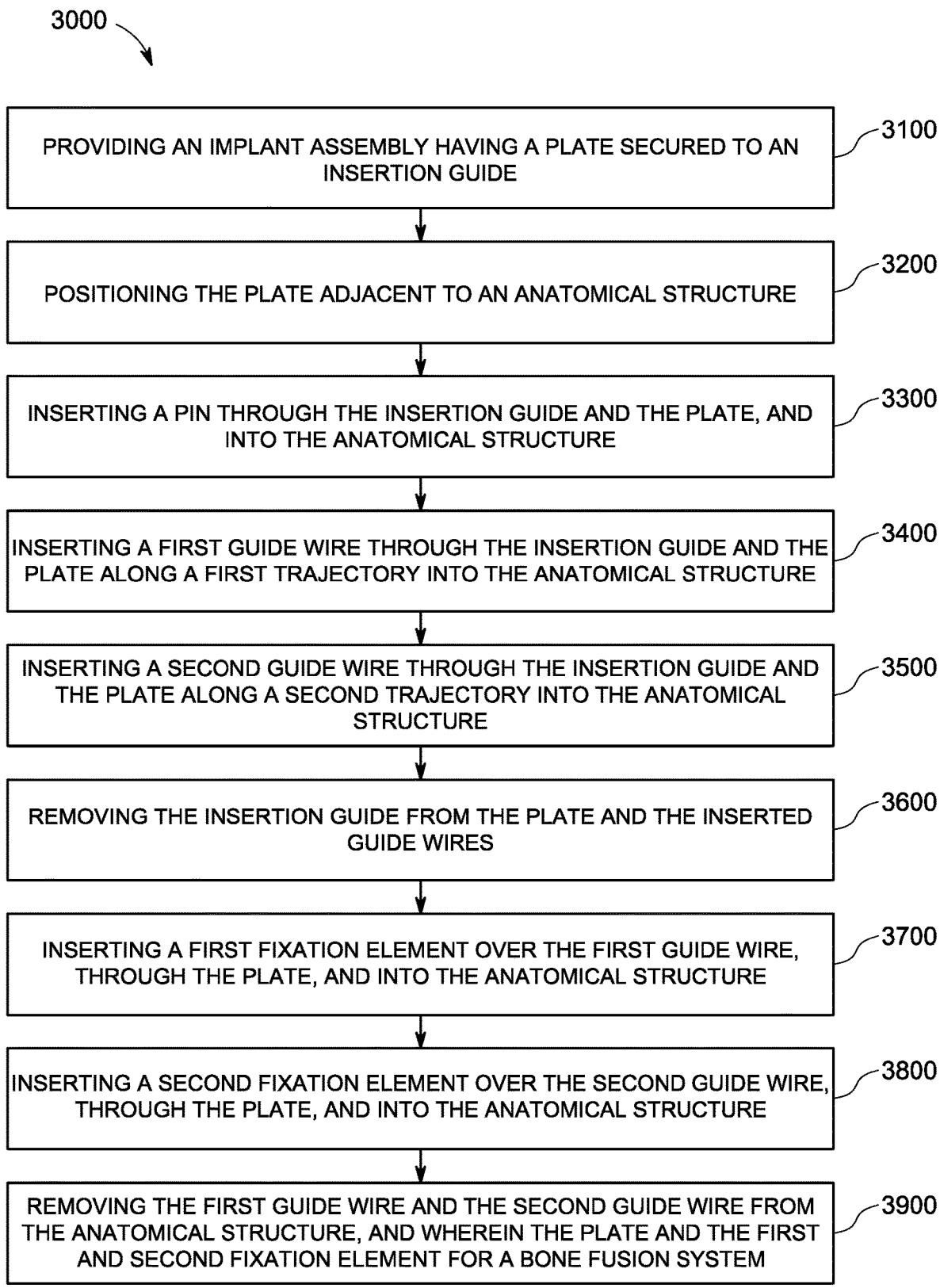
FIG. 62 is a flowchart of surgical method, according to an embodiment of the present disclosure.

With reference to FIG. 62, therein is illustrated a surgical method 3000, according to an embodiment of the present disclosure. Method 3000 may include, for example, at 3100 providing an implant assembly having a plate secured to an insertion guide, at 3200 positioning the plate adjacent to an anatomical structure, and at 3300 inserting a pin through the insertion guide and the plate, and into the anatomical structure. At 3400 a first guide wire is inserted through the insertion guide and the plate along a first trajectory into the anatomical structure, at 3500 a second guide wire is inserted through the insertion guide and the plate along a second trajectory into the anatomical structure. At 3600 the insertion guide is removed from the plate and the inserted guide wires, at 3700 a first fixation element is inserted over the first guide wire, through the plate, and into the anatomical structure, and at 3800 a second fixation element is inserted over the second guide wire, through the plate, and into the anatomical structure. At 3900, the first guide wire and the second guide wire are removed from the anatomical structure so that the plate and the first and second fixation element form a bone fusion system in the anatomical structure. In other embodiments, the method 3000 may include inserting cannulas through the insertion guides, and inserting the guide wires through the cannulas.

Figure 63:
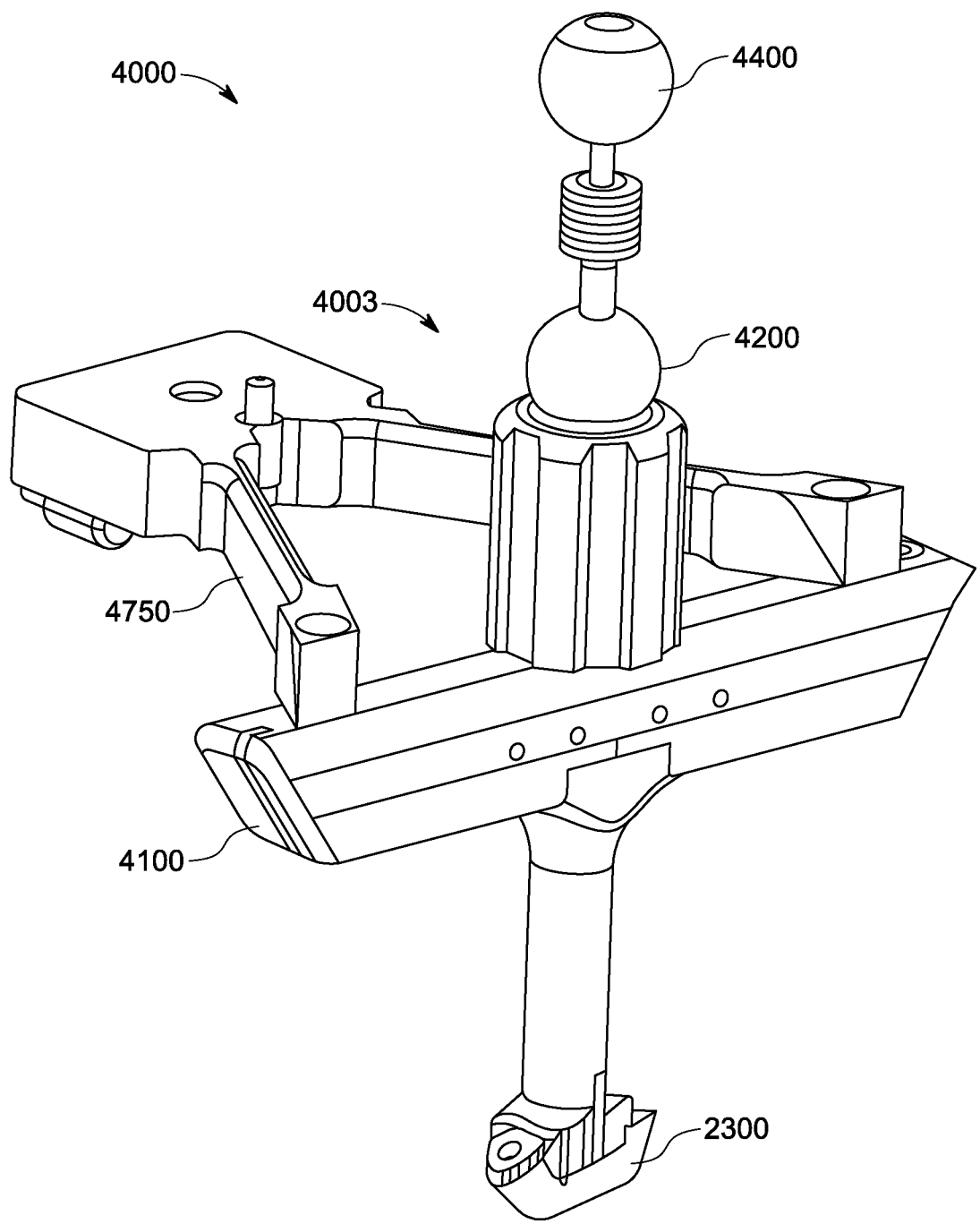
FIG. 63 is a front perspective view of a midline incision implant system, according to an embodiment of the present disclosure.

FIG. 63 illustrates another midline incision implant system 4000, according to an embodiment of the present disclosure. The midline incision implant system 4000 may be operably attachable to a table mount. In this illustrated embodiment, the midline incision implant system 4000 may generally include the insertion guide assembly 4003 having, for example, an insertion guide 4100, a plate holder 4200, a docking pin 4400, and a support 4750. The midline incision implant system 4000 may be used in the surgical method 3000 (FIG. 62) described above to install the plate 2300 along with fixation elements in the patient.

Figure 64:
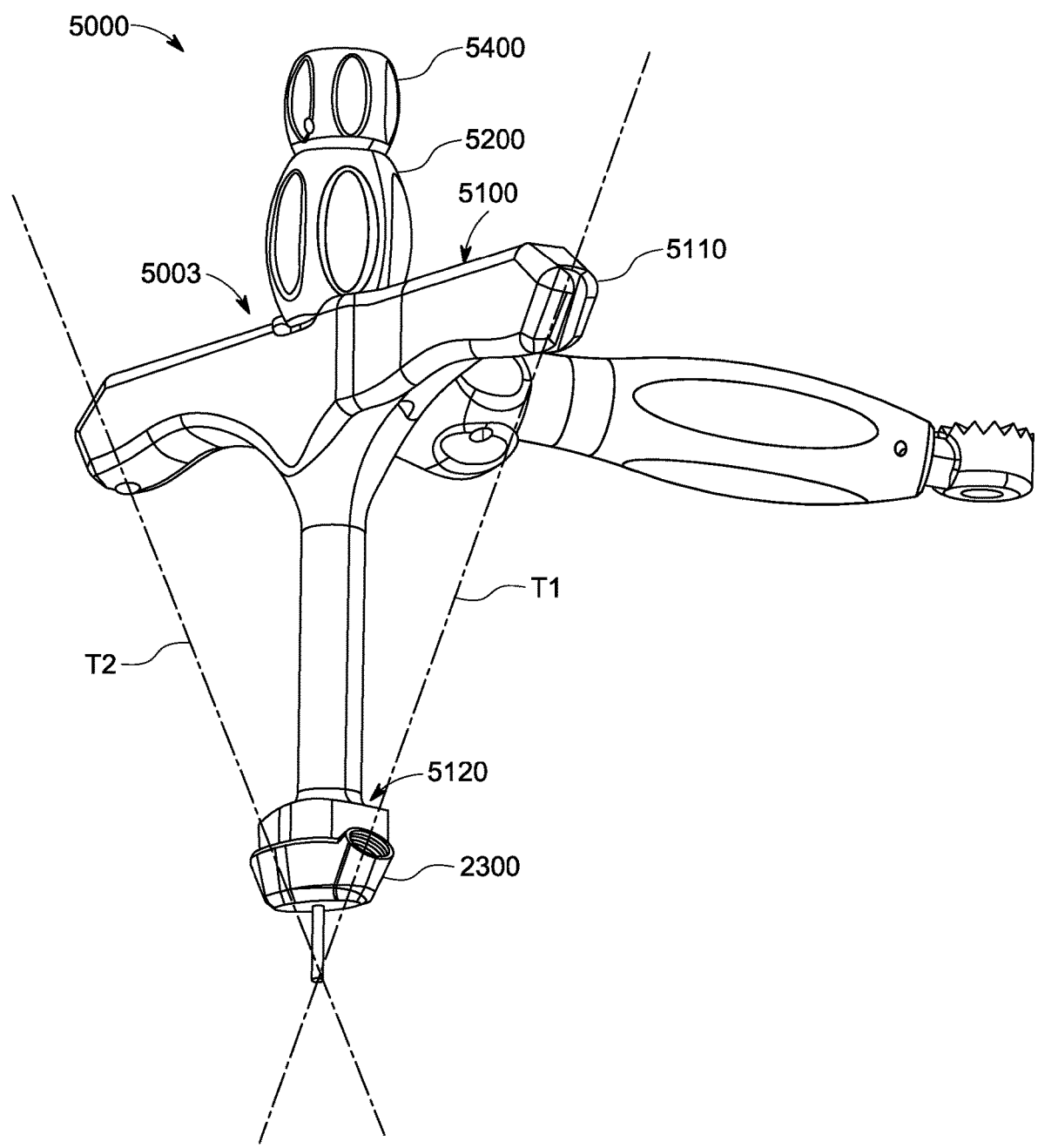
FIG. 64 is a front perspective view of a midline incision implant system, according to an embodiment of the present disclosure.

FIG. 64 illustrates another midline incision implant system 5000, according to an embodiment of the present disclosure. The midline incision implant system 5000 may be operably attachable to a table mount. In this illustrated embodiment, the midline incision implant system 5000 may be essentially the same as midline incision implant system 2000 (FIG. 1). For example, midline incision implant system 5000 may generally include an insertion guide assembly 5003 having, for example, an insertion guide 5100, a plate holder 5200, a docking pin 5400, and a handle 5700.

In this embodiment, the plate 2300 itself provides the guide holes for use in forming the first trajectory T1 and the second trajectory T2. For example, a lower portion may have a plate engaging surface that is operable to align the plate 2300, e.g., recesses for receiving portions of the bosses of the plate 2300, so that the channels in plate 2300 are disposed in proper relation to the guide holes in an upper portion 5110 for forming first trajectory T1 and second trajectory T2. For example, the lower portion 5120 need not include guide holes in this illustrated embodiment. It will be appreciated that other configurations of the lower portion of the alignment guide and the plate may be employed for aligning the plate to the insertion guide, for example, aligned detents, projections, recesses, or other suitable features. The midline incision implant system 5000 may be used in the surgical method 3000 (FIG. 62) described above.

Figure 67:
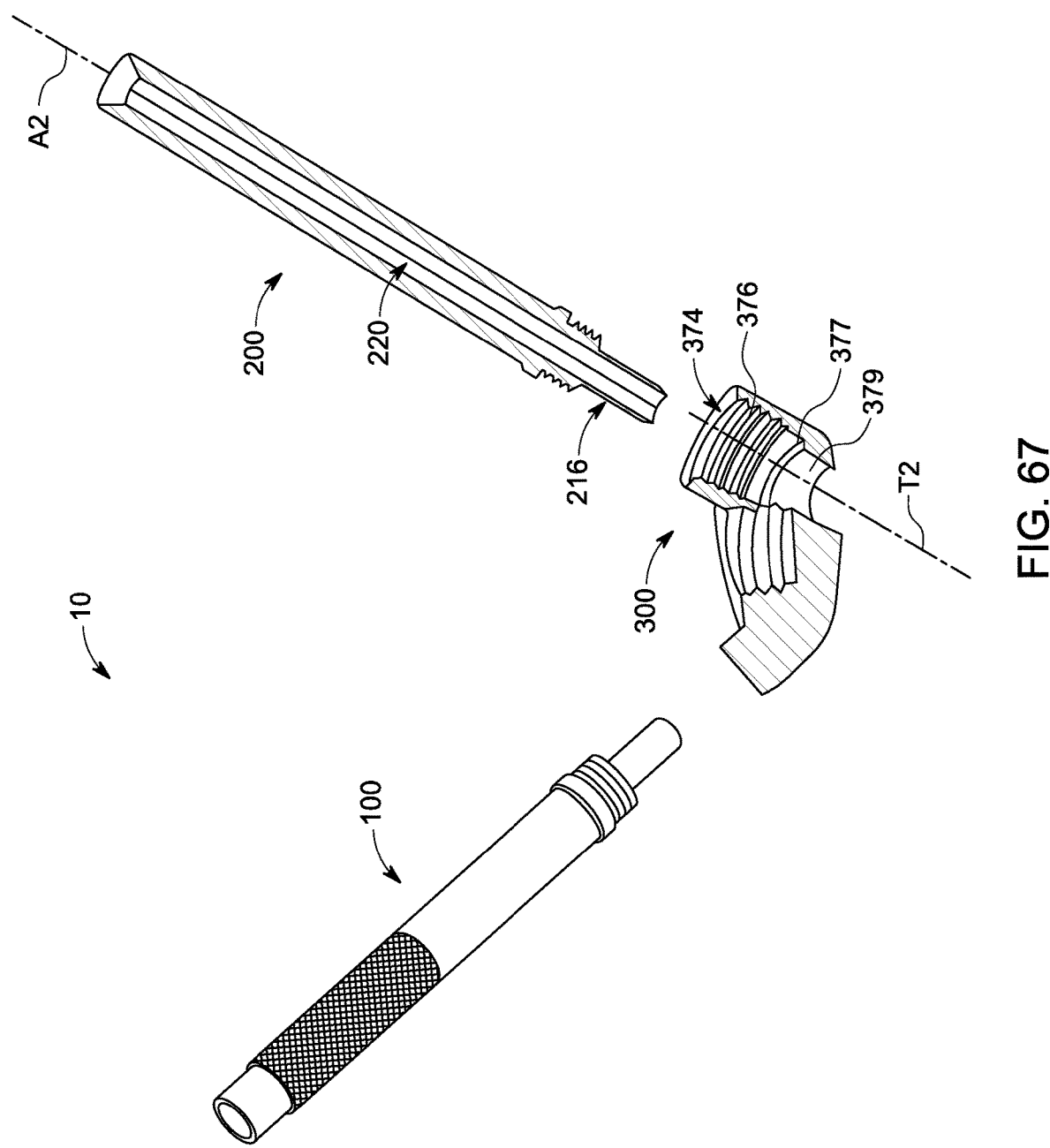
FIG. 67 is another exploded perspective view, in part cross-section, of the implant system of FIG. 65, according to an embodiment of the present disclosure.
Figure 77:
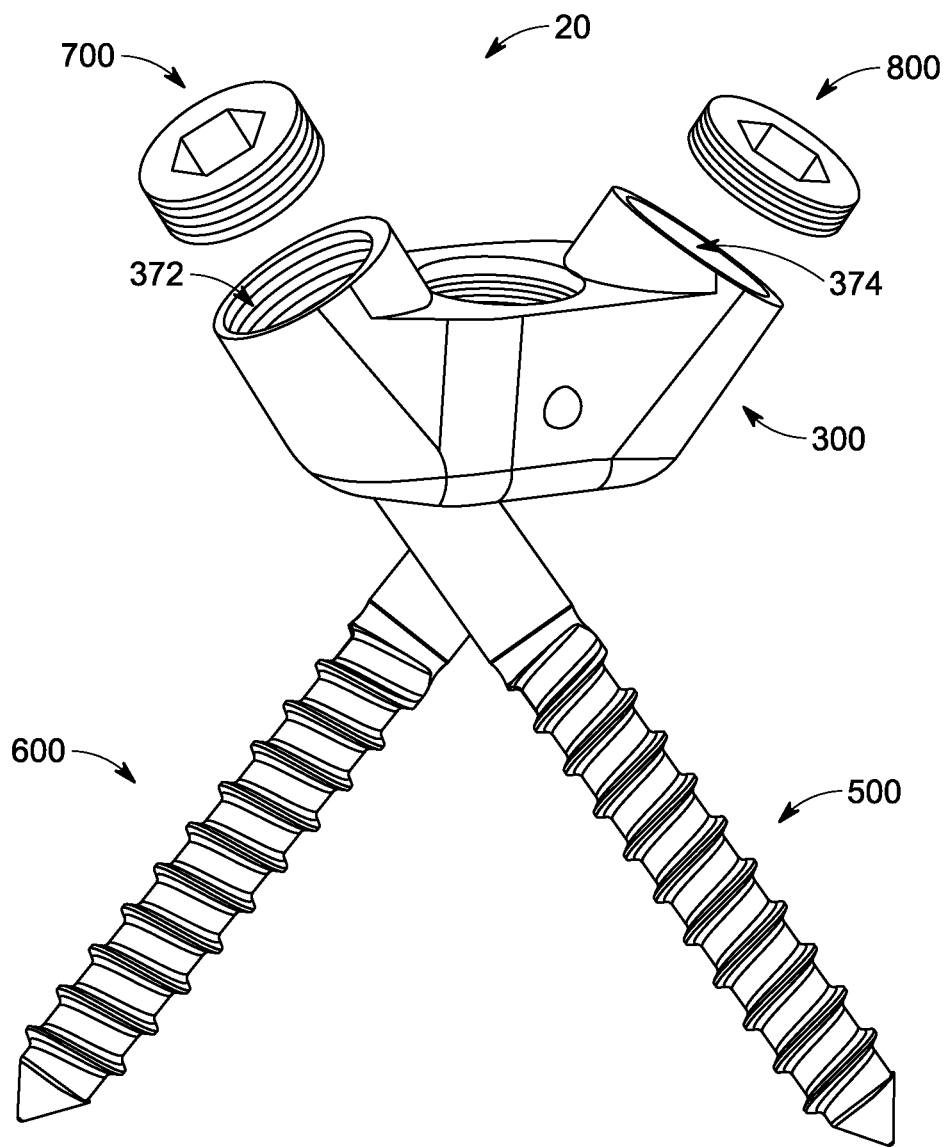
FIG. 77 is a front perspective view of a bone fusion system, according to an embodiment of the present disclosure.
Figure 78:
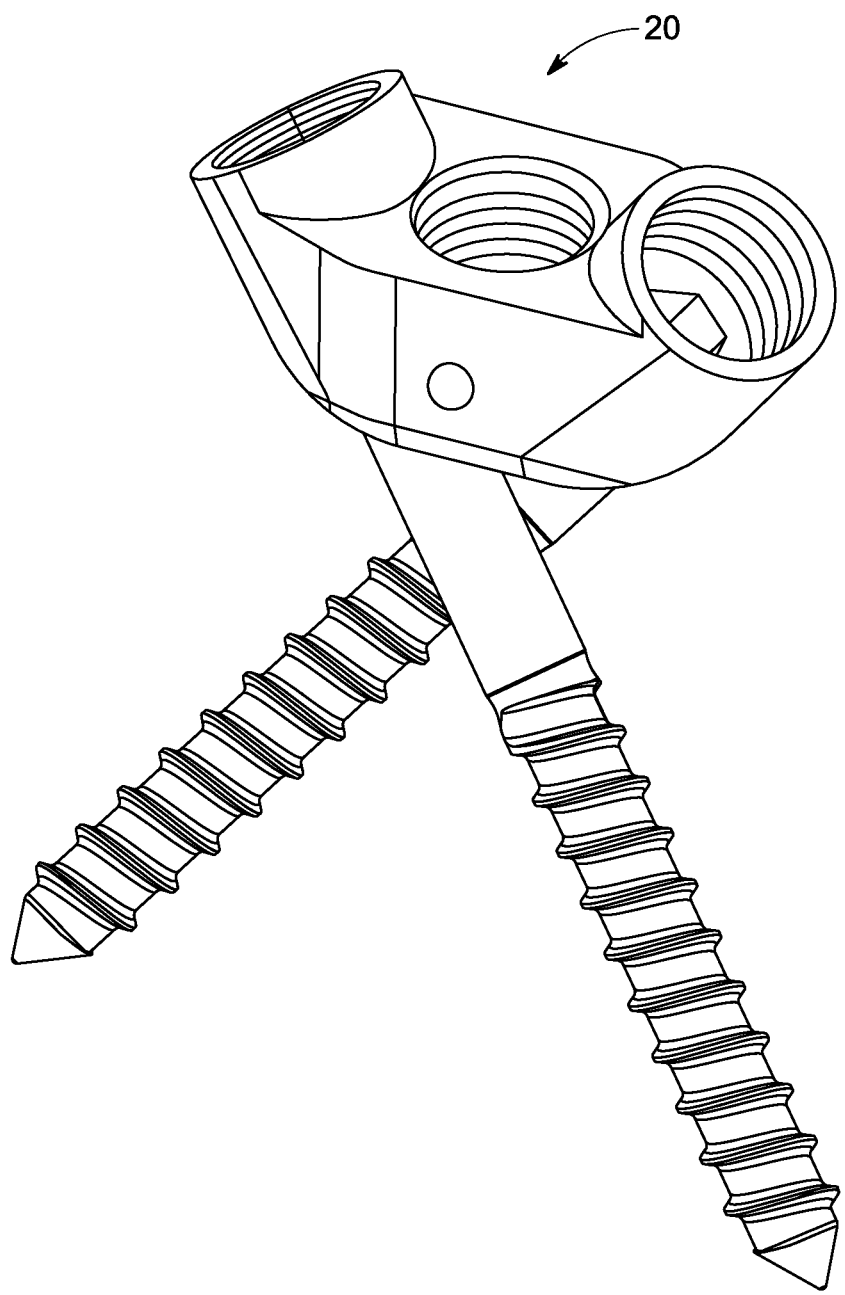
FIG. 78 is a top perspective view of the bone fusion system of FIG. 77, according to an embodiment of the present disclosure.
Figure 79:
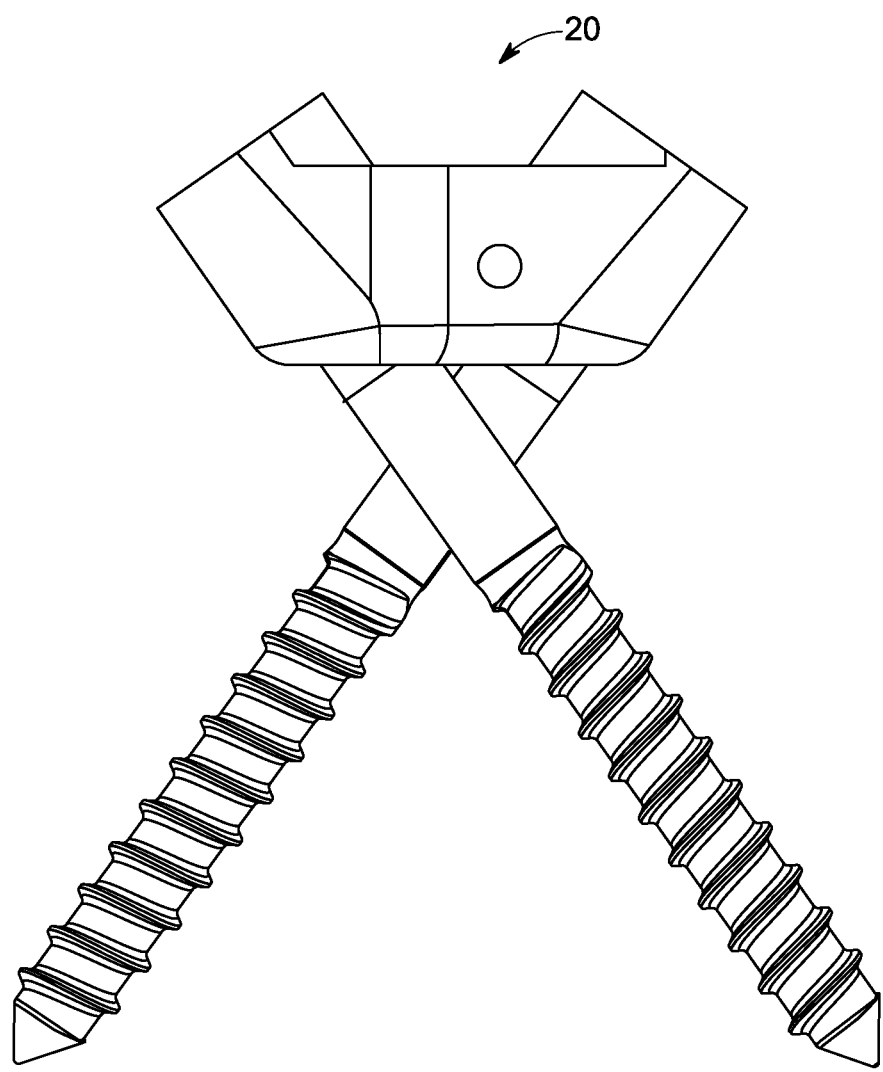
FIG. 79 is a front elevational view of the bone fusion system of FIG. 77, according to an embodiment of the present disclosure.
Figure 80:
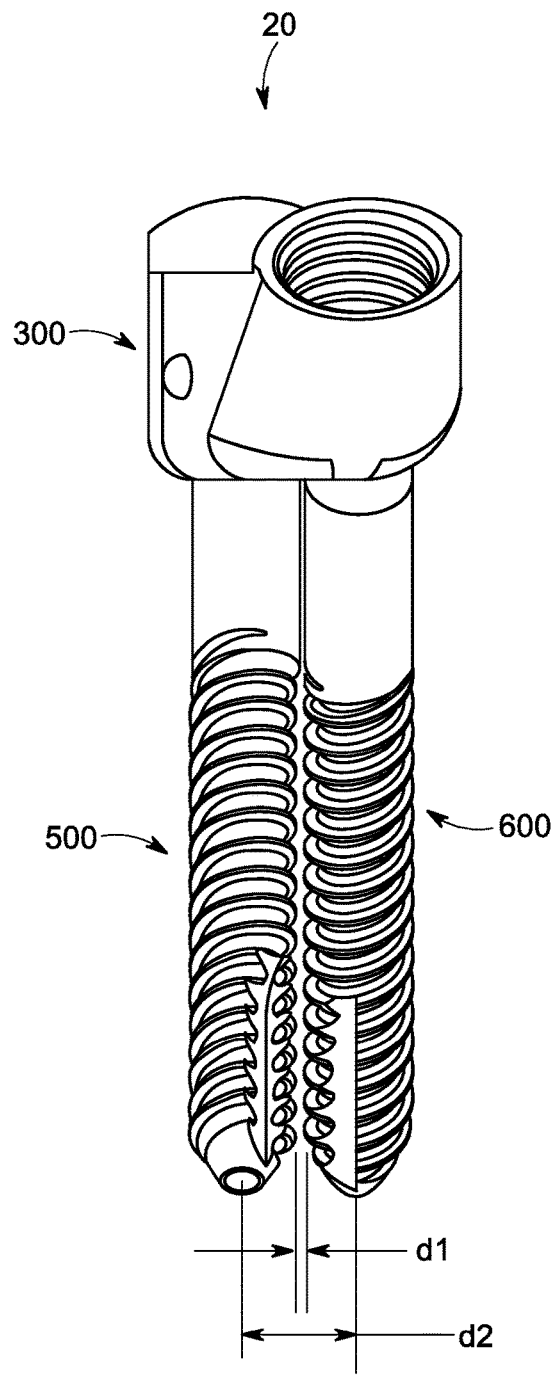
FIG. 80 is a left side elevational view of the bone fusion system of FIG. 77, according to an embodiment of the present disclosure.
Figure 81:
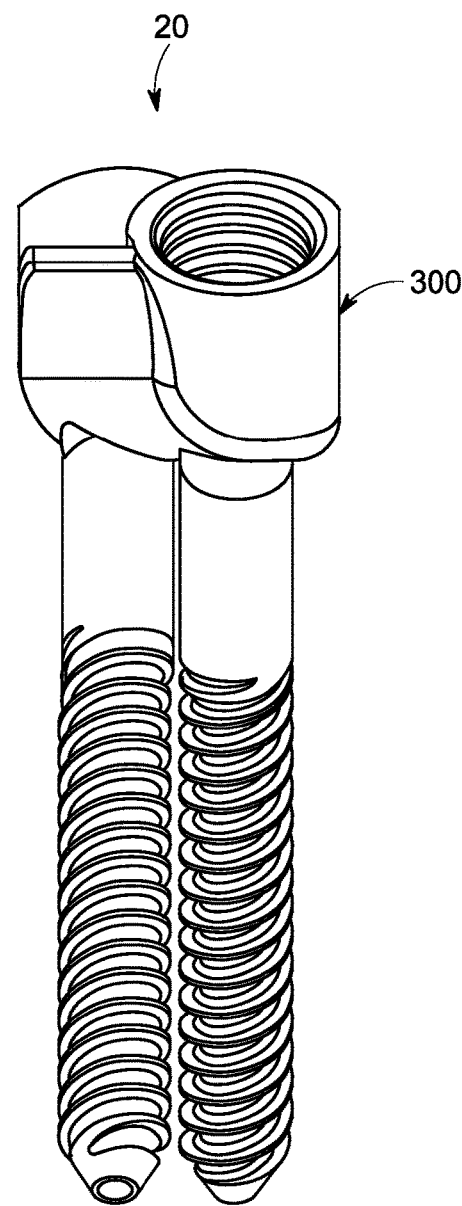
FIG. 81 is a right side elevational view of the bone fusion system of FIG. 77, according to an embodiment of the present disclosure.
Figure 82:
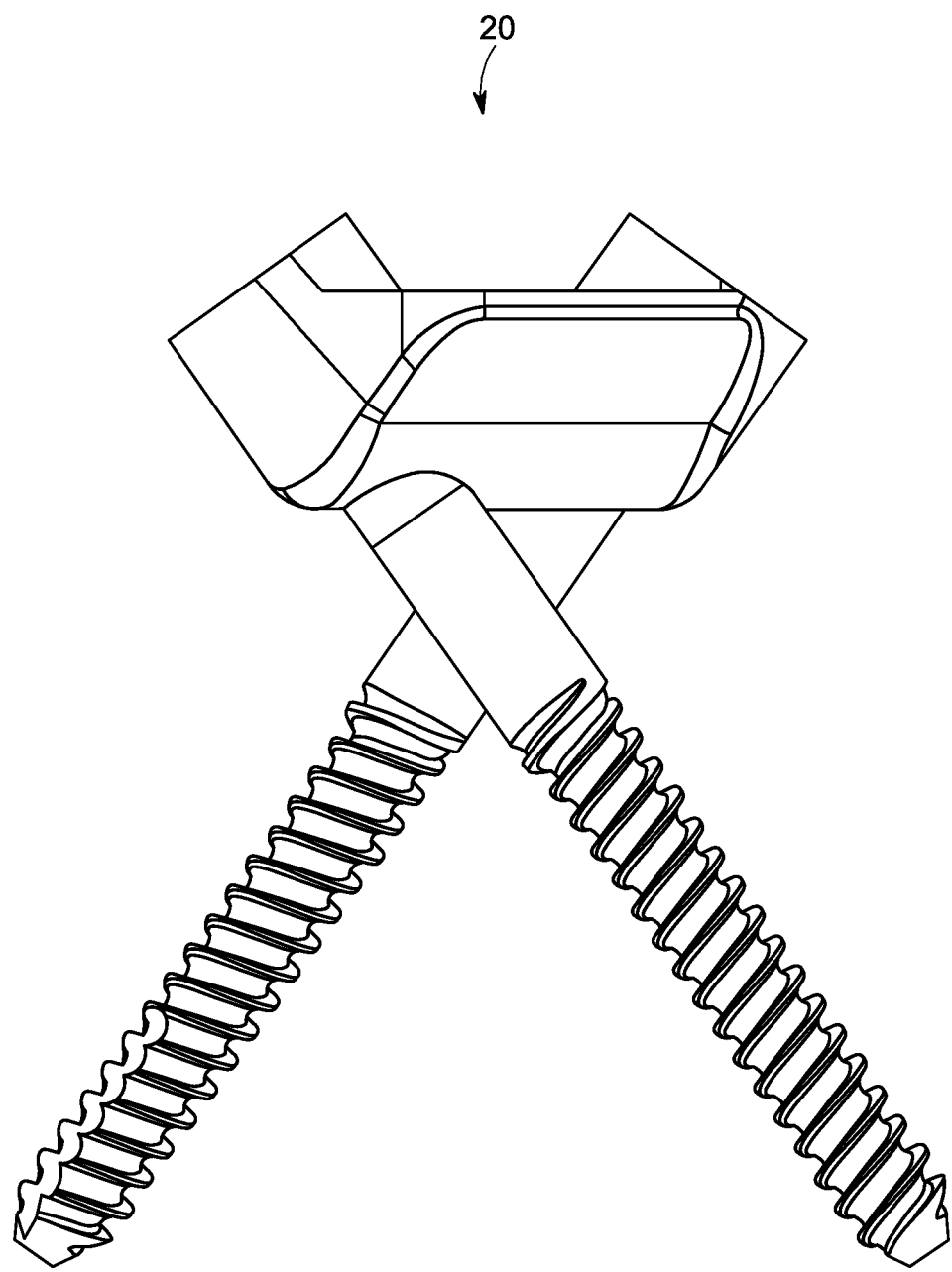
FIG. 82 is a rear elevational view of the bone fusion system of FIG. 77, according to an embodiment of the present disclosure.
Figure 83:
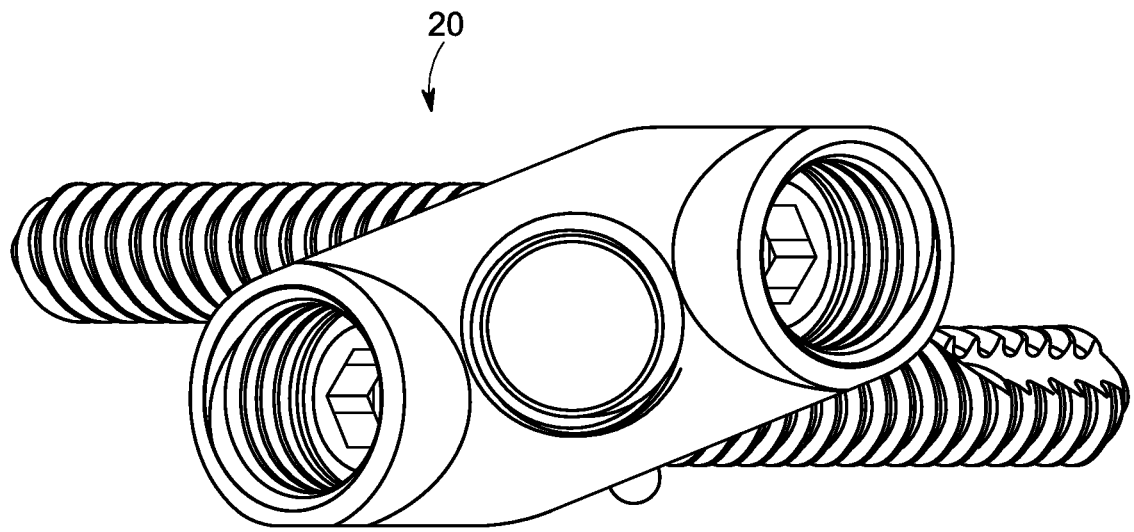
FIG. 83 is a top view of the bone fusion system of FIG. 77, according to an embodiment of the present disclosure.
Figure 84:
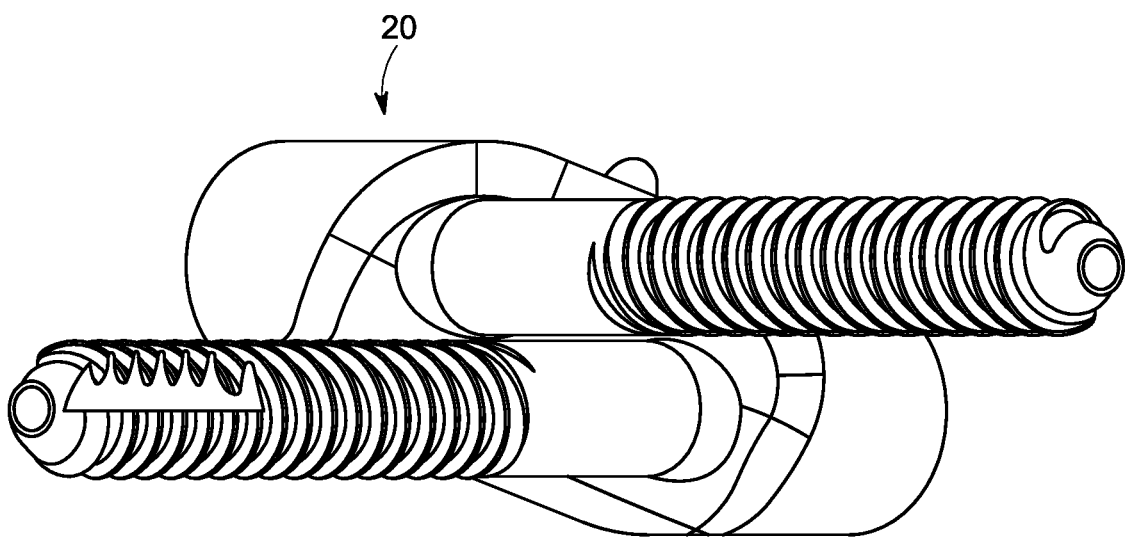
FIG. 84 is a bottom view of the bone fusion system of FIG. 77, according to an embodiment of the present disclosure.

Referring to the drawings, wherein like reference numerals are used to indicate like or analogous components throughout the several views, and with particular reference to FIGS. 65-67, there is illustrated an exemplary embodiment of the implant system 10, which may include the first insertion guide 100, the second insertion guide 200, and plate 300 according to the present disclosure. The insertion guides 100 and 200 of the implant system 10 may be secured to the plate 300 during a surgical procedure to establish fixation element trajectories above a surgical incision. As described in greater detail below, and as shown in FIG. 77, the plate 300 in addition to aiding guidance for providing fixation element trajectories, the plate 300 may be operable in a bone fusion system 20 for use in connection with a first plate fixation element 500 and second plate fixation element 600 to maintain or re-establish proper spacing and alignment within a patients spine.

With reference again to FIG. 66, the first insertion guide 100 may include, for example, a generally cylindrical hollow body 112 such as a cylindrical hollow elongated body having an upper end portion 114 and a lower end portion 116. The lower end portion 116 is operably attachable to the plate 300 as described below.

Figure 68:
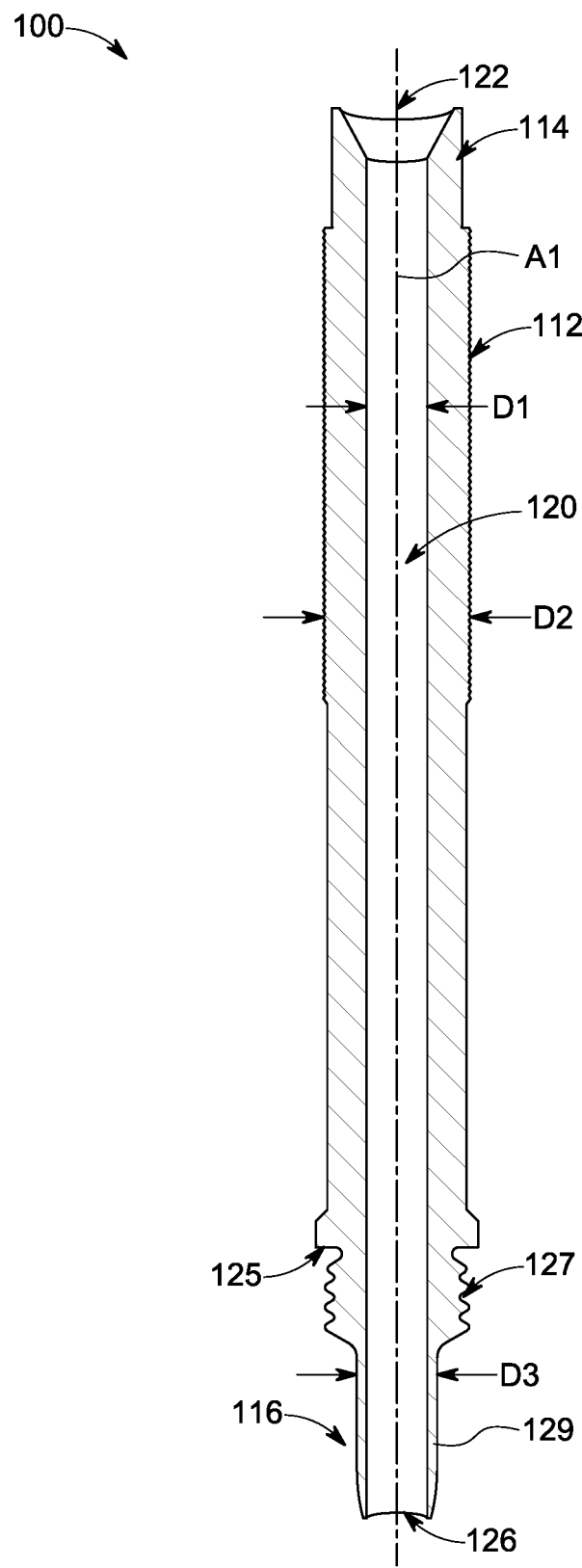
FIG. 68 is an enlarged cross-sectional view of the first insertion guide of the implant system of FIG. 65, according to an embodiment of the present disclosure.
Figure 69:
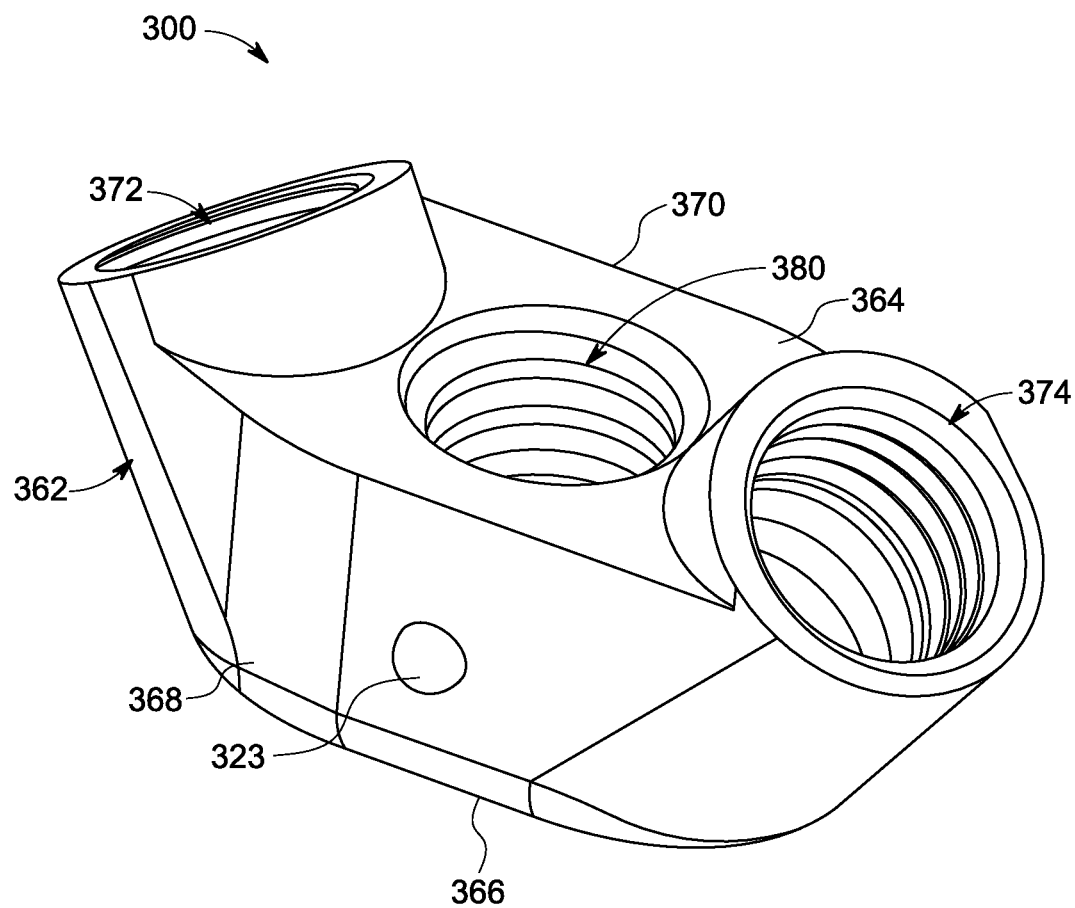
FIG. 69 is an enlarged top perspective view of the plate of FIG. 65, according to an embodiment of the present disclosure.
Figure 70:
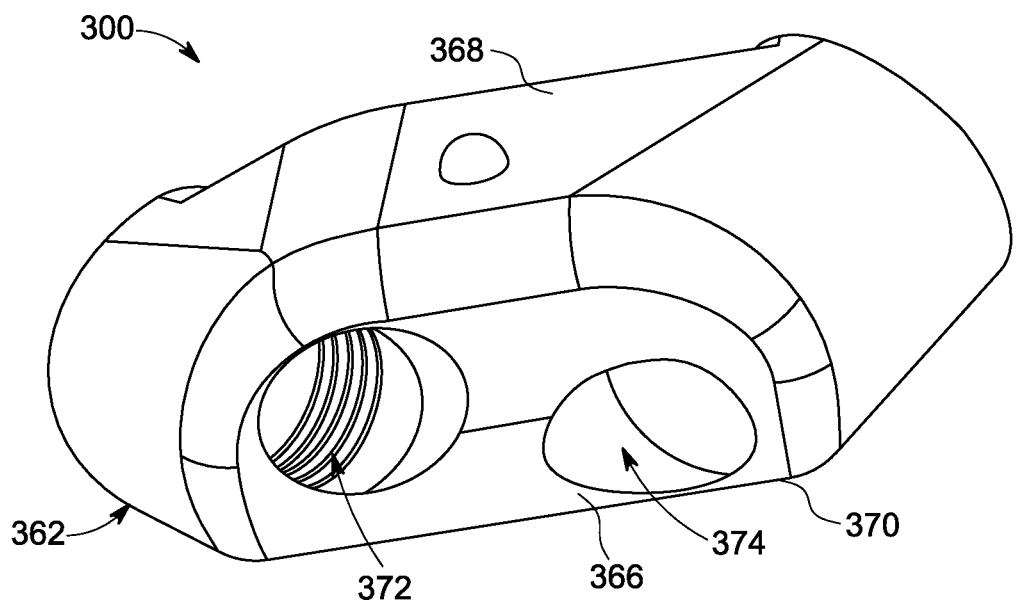
FIG. 70 is a bottom perspective view of the plate of FIG. 69, according to an embodiment of the present disclosure.
Figure 71:
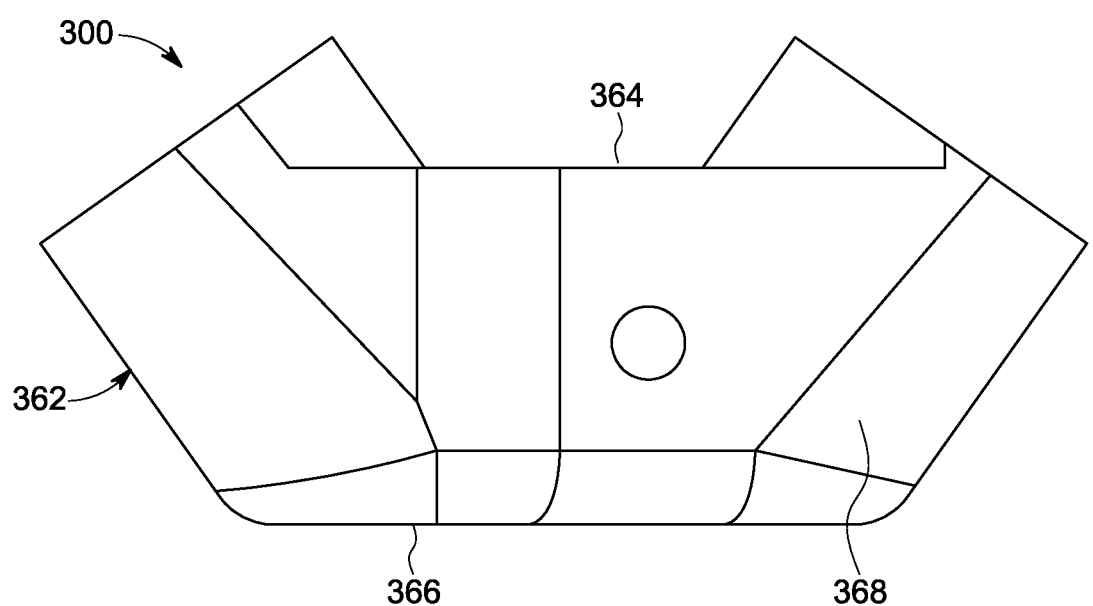
FIG. 71 is a front elevational view of the plate of FIG. 69, according to an embodiment of the present disclosure.

With reference to FIG. 68, the first insertion guide 100 may include, for example, a first passageway 120 having an axis A1 extending therethrough. The first passageway 120 has a first opening 122 opening onto the end portion 114 of the body 112, and a lower opening 126 opening onto the second end portion 116 of the body 112. The first passageway 120 may be a generally constant cylindrical passageway having a constant diameter D1. The upper end of the first passageway 120 may be countersunk having an upper enlarged opening that tapers to the constant diameter. The first passageway 120 may also extend, for example, generally parallel to the outer cylindrical surface of the first insertion guide 100. Alternative outer surfaces of the insertion guides may be employed other than cylindrical and are also contemplated including, for example, outer cross-sectional surfaces that are square, rectangular, polygonal, non-symmetric, or other shapes, and combination thereof.

The upper end portion 114 of the first insertion guide 100 may have an outer knurled surface 115 as best shown in FIG. 65. With reference again to FIG. 68, the lower end portion 116 of the first insertion guide 100 may have an outer cylindrical stop 125, outer threads 127, and a reduced size projection 129. For example, the outer cylindrical surface may have a diameter D2, and the projection 129 may have an outer cylindrical surface having a diameter D3 sized smaller than diameter D2. As described in greater detail below, the insertion guides are releasably attachable to the plate 300 (FIG. 65).

With reference again to FIG. 65, in some embodiments, the second insertion guide 200 may be, for example, the same as the first insertion guide 100. It will be appreciated the length, size of the passageway, the size of overall outer cylindrical surface may be appropriated selected. In other embodiments, the first and second insertion guides employed in the plate system may be sized and configured differently, e.g., having different sized passageways, having different outer cylindrical surfaces, and/or having different overall lengths. In some embodiments, an insertion guide may have a length of about 101.6 mm (4 inches), an outer cross-sectional diameter of about 7.92 mm (0.3125 inches), and an internal passageway cross-sectional diameter of about 1.6 mm (0.063 inches). The first and second insertion guides 100, 200 may be various lengths to accommodate a patient.

As shown in FIG. 65, the plate 300 may also include at least one lateral side indicator 323. The at least one lateral side indicator 323 may be, for example, at least one protrusion, extension or a like feature extending away from a side of the body 362 or alternatively, a slot, recess, grooves, machine marking or a like feature inset into the side of the body 362, to indicate the lateral side of the plate 300 and e.g., a visual reference point for determining the position of the plate 300. Further, the at least one lateral side indicator 323 may further designate whether the plate 300 is a left or right plate. The at least one lateral side indicator 323 may provide, for example, a point of reference for the surgeon for the position or location of the plate 300. The plate 300 may include a center hole 380 such as an internally threaded hole. In some embodiments, a plate may not include a center hole or may include a center hole not having internal threads.

Figure 75:
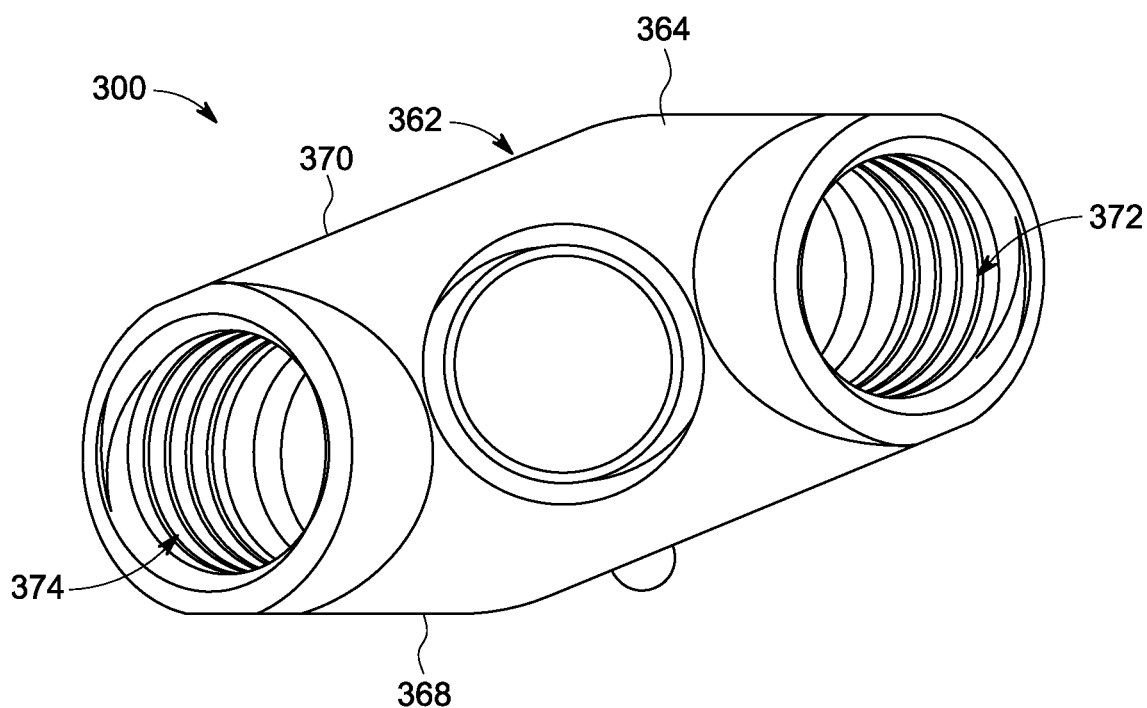
FIG. 75 is a top view of the plate of FIG. 69, according to an embodiment of the present disclosure.
Figure 76:
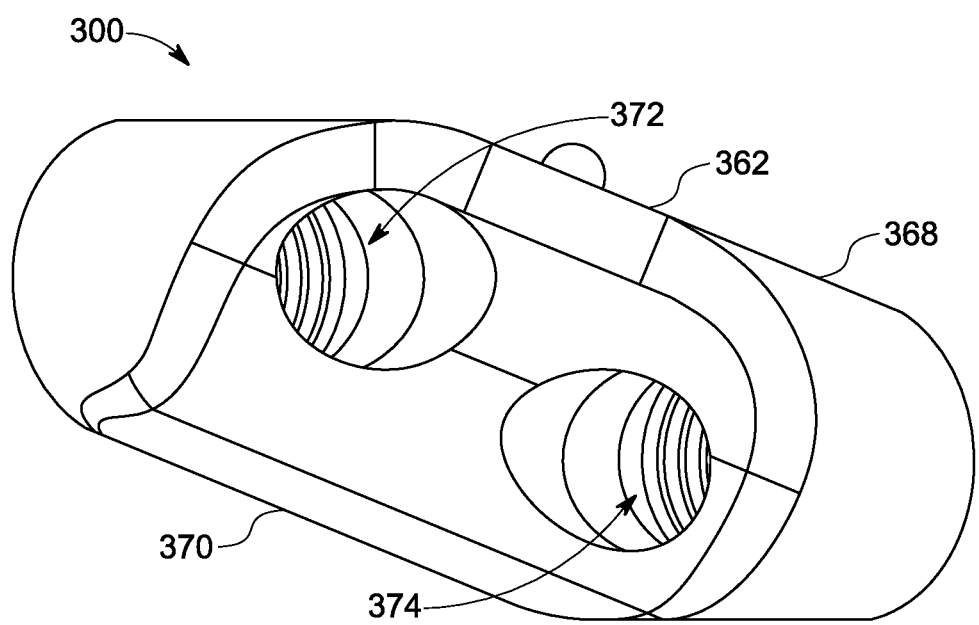
FIG. 76 is a bottom view of the plate of FIG. 69, according to an embodiment of the present disclosure.

Referring now to FIGS. 69-76, the plate 300 includes a body 362 with a top surface 364 opposite a bottom surface 366, and a first side 368 opposite a second side 370. The plate 300 may be, for example, a three-dimensional misshapen parallelogram which may be rounded on the ends, bottom surface and at least one side. The length of the top surface 364 may be, for example, longer than the length of the bottom surface 366 forming tapered ends. The plate 300 may have a radius on the outer diameter of the first or medial side 368 to accommodate the spinal anatomy. In one embodiment, for example, the first side 368 of the plate 300 may have approximately a 15 degree angle transitioning into a 10 mm radius, although other angles and radius dimensions are contemplated. The plate 300 may also be, for example, shaped to have a low profile to avoid bone and tissue impingement. In addition, the plate 300 may be, for example, generally symmetric, for example, when viewed from above as shown in FIG. 75. The body 362 of the plate 300 may also have, for example, additional smoothing or rounded edges to accommodate a feature of a patient's anatomy while maintaining the necessary wall thickness in critical areas of the body 362 to maintain strength while reducing the incident of bone or tissue impingement.

As shown in FIGS. 69, 70, 75, and 76, the plate 300 may also contain a first channel 372 and a second channel 374. The first channel 372 may extend through the body 362 from the top surface 364 to the bottom surface 366. The second channel 374 may extend through the body 362 from the top surface 364 to the bottom surface 366.

As best shown in FIG. 66, the first channel 372 may define a first axis or first trajectory T1. The first channel 372 may include upper internal threads 373, a conical seat 371, and a lower cylindrical guide 375. As best shown in FIG. 67, the second channel 374 may define a second axis or second trajectory T2. The second channel 374 may include upper internal threads 376, a conical seat 377, and a lower cylindrical guide 379. The first channel 372 (FIG. 66) may receive the lower end portion 116 (FIG. 66) of first insertion guide 100 (FIG. 66). The second channel 374 may receive the lower end portion 216 of the second insertion guide 200.

With reference again to FIG. 66, when first insertion guide 100 is operably connected to plate 300, axis A1 of the passageway 120 of the first insertion guide 100 is aligned with the first trajectory T1, which may be angled in a first direction. With reference again to FIG. 67, when the second insertion guide 200 is operably connected to the plate 300, the axis A2 of the second passageway 220 of the second insertion guide 200 is aligned with the second trajectory T2, which may be angled in a second direction. The second direction of the second passageway 220 may be opposite the first direction of the first passageway 120. The first and second trajectories may be positioned to extend past each other to allow for guiding a Jamshidi needle, k-wire, screw, or the like through the insertion guides into the trajectory into, for example, the divergent aspect of the vertebrae. For example, the first trajectory T1 may be oriented, for example, on the cephalad end for guiding a Jamshidi needle, k-wire, screw, or the like into the cephalad to caudal trajectory for placement in the pedicle. The second trajectory T2 may be oriented, for example, on the caudal end for guiding a Jamshidi needle, k-wire, screw, or the like into the desired caudal to cephalad facet/pedicle trajectory. In one embodiment, for example, the facet/pedicle trajectory extends along the first passageway A1 and moves in a caudal direction and the pedicle trajectory enters in the second passageway A2 and moves in a cephalad direction.

As described below, once the insertion guides are removed, the alignment and insertion of fixation may be made in a crossed or X-shaped arrangement as described below.

With reference to FIG. 77, a bone fusion system 20 may be, for example, a five piece construct including the plate 300, a first fixation element 500, the second fixation element 600, a first set screw 700, and a second set screw 800. The fixation elements may be cannulated fasteners, fixation screws, bone screws, fixation members, fasteners, screws, pegs, pins, and the like as known by one of ordinary skill in the art. The fixation elements may be, for example smooth or threaded. The two fixation elements are configured or sized and shaped to provide a non-co-planar screw trajectory while allow for or achieving fusion. The plate 300 is sized and shaped or configured to assist or aid with the positioning of the two insertion guides as described above, and also with aiding and guiding the two fixation elements into a patient's vertebrae. For example, the plate 300 may be used to aid the guiding of the fixation elements into divergent aspects of the vertebrae and to lock the two divergent fixation elements into place. Specifically, the plate 300 may be used to aid in the guiding of a first fixation element into a patient's pedicle and a second fixation element into the patient's facet/pedicle of a vertebrae, or vice versa.

With reference still to FIG. 77, the bone fusion system 20 may include the first set screw 700 and the second set screw 800. First set screw 700 may be, for example, sized and shaped or configured to be receive in the threaded portion of the channel 372. Second set screw 800 may be, for example, sized and shaped or configured to be receive in the threaded portion of the channel 374. The first set screw 700 may be used to place pressure on first fixation element 500 inserted through the channel 372 and the second set screw 800 may be used to place pressure on the second fixation element 600 inserted through the channel 374 and into the facet/pedicle and/or pedicle, thereby securing or locking the bone fusion device.

First set screw 700 may include a threaded body, and may also include a drive opening at a first end and an engagement protrusion (not shown) at a second end. The drive opening may be, for example, hexagonal, square, Phillips or another multi-lobed configuration for coupling with an insertion instrument. The engagement protrusion may be tapered as the engagement protrusion extends away from the threaded portion of the threaded body. Second set screw 800 may be similarly configured.

Figure 85:
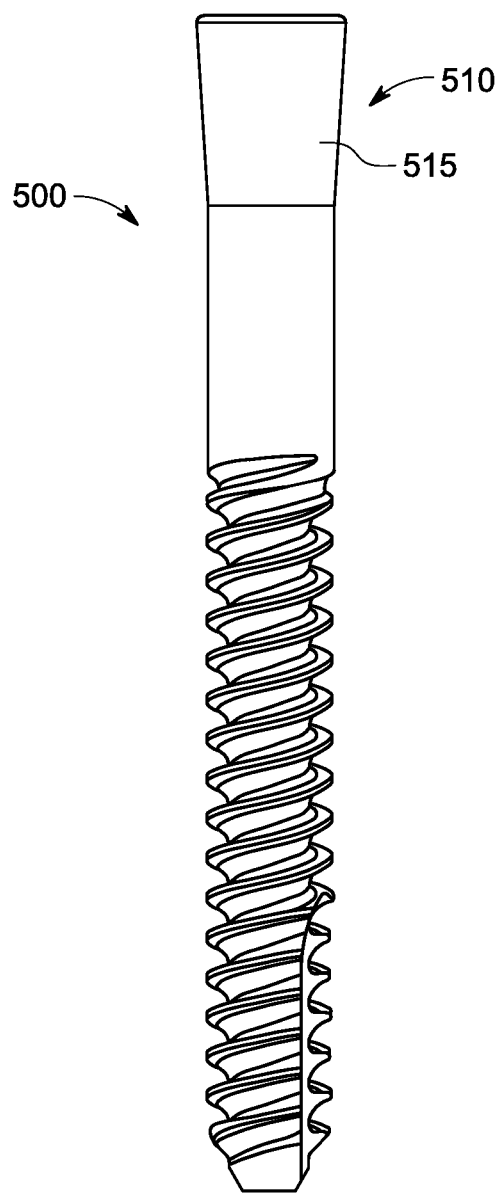
FIG. 85 is an enlarged front elevational view of one of the fixation elements of the fusion system of FIG. 77, according to an embodiment of the present disclosure.
Figure 86:
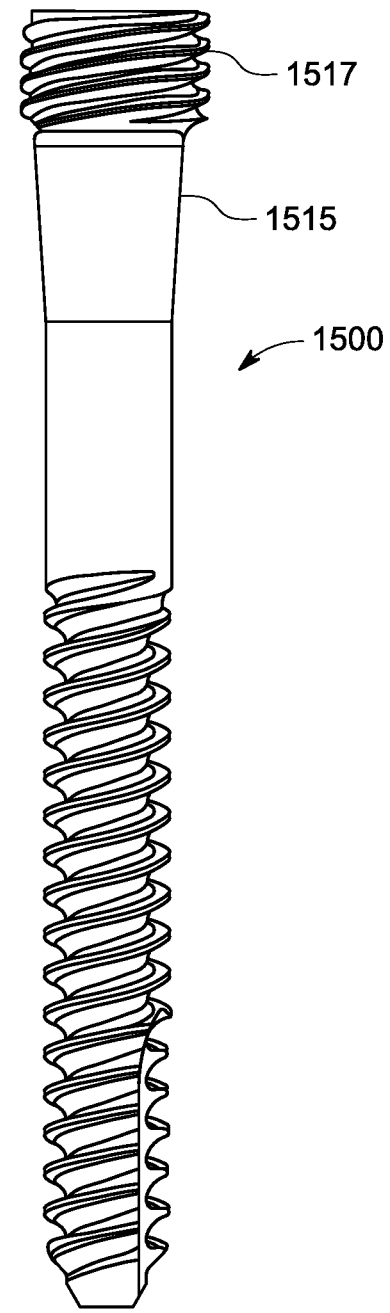
FIG. 86 is a front elevational view of a fixation element, according to an embodiment of the present disclosure.
Figure 87:
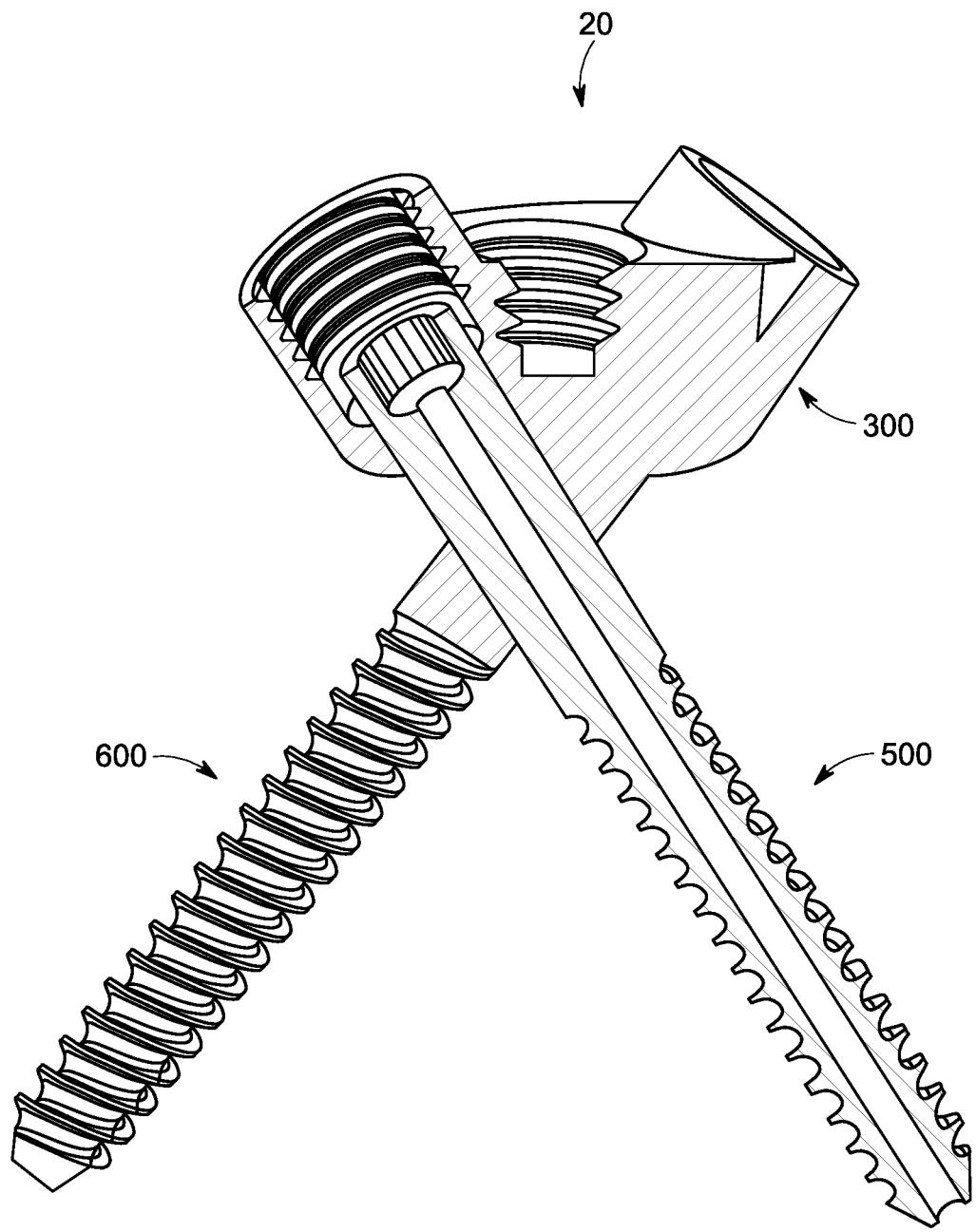
FIG. 87 is a perspective view, in part cross-section, of the fusion system of FIG. 77, according to an embodiment of the present disclosure.

As shown in FIG. 85, the first fixation element 500 may include an upper potion 510 having a taper 515 that matches the taper of the lower cylindrical guide 375 (FIG. 66) of the first channel 372 in the plate 300. Once the first fixation element 500 is implanted in a bone and the taper on the upper portion 510 of the first fixation element 500 makes contact with the taper of the lower portion of the first channel 372 of the plate 300, the taper of the first fixation element 500 will lock to the plate. The taper may be between 1 degree and 8 degrees, or any suitable taper and form a Morse taper connection. Other connections such as snap fit connections (whether using snap rings or not), and the like may be suitably employed. The first fixation element 500 may include a drive opening at an upper end for use in installation in plate 300 as shown in FIG. 87. The second fixation element 600 may be similarly attached to the plate 300. FIG. 86 illustrates another embodiment of a fixation element 1500 having a tapered portion 1515 and a threaded portion 1517. The threaded portion 1517 may be readily engageable with the internal threads of the implant channels.

Figure 88:
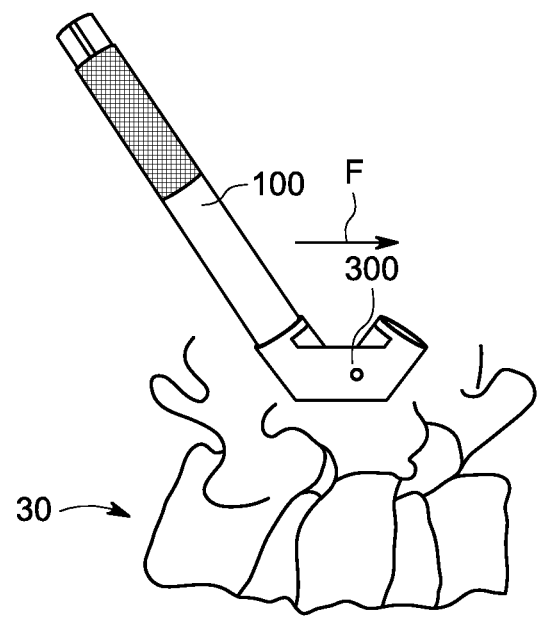
FIGS. 88-90 are side views of a process of positioning the implant system of FIG. 65 on a vertebrae, according to an embodiment of the present disclosure.
Figure 89:
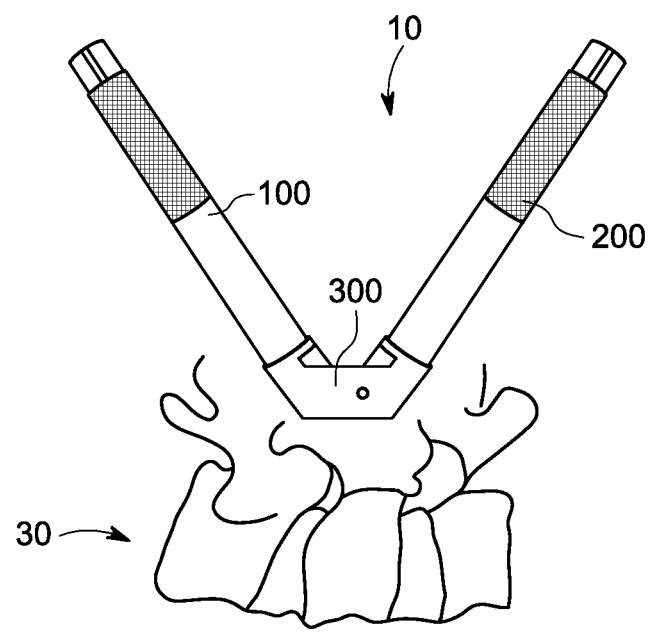
Figure 90:
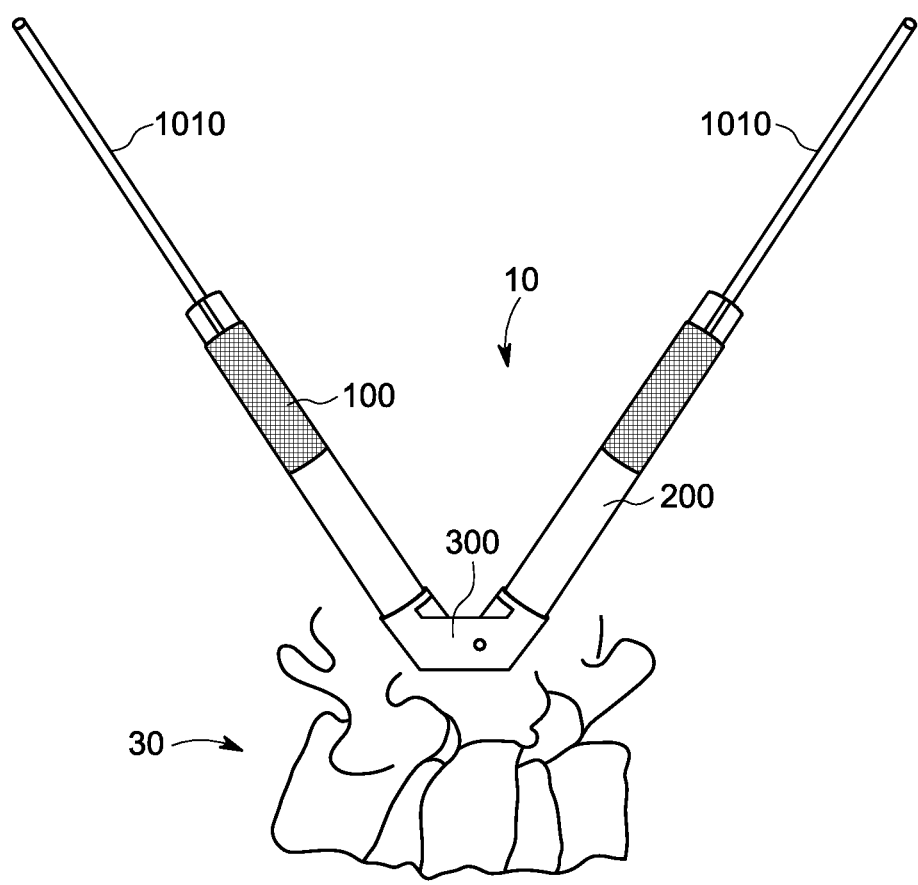

FIGS. 88-90 illustrate a method of using implant system 10 (FIGS. 89 and 90) in accordance with the present disclosure. For example, the method may include operably assembling and attaching first insertion guide 100 to plate 300. After determining an initial incision using lateral fluoroscopy, an appropriate caudal incision is made to enable dissection of the plate through the muscle so that plate 300 may be placed onto the lamina/facet directly over the vertebrae 30 or disc space, e.g., using the first insertion guide 100 to rock and slide the plate 300 in the direction of arrow F under the soft tissue, as shown in FIG. 88. Using lateral fluoroscopy, a second incision is made to enable inserting the cephalad or second insertion guide 200 toward the plate so that the lower end of the second insertion guide 200 is insertable into in cephalad channel 374 (FIG. 67) and operably attachable to the plate 300 as shown in FIG. 89. Using lateral fluoroscopy, the position of insertion assembly 10 is checked. With reference to FIG. 90, a first Jamshidi (not shown) is tapped in lightly through first insertion guide 100 and a second Jamshidi (not shown) is tapped in lightly through second insertion guide 200, and check the lateral position. Implant system 10 is moved back and forth with the two Jamshidis to a desired position and confirmed with lateral flouro, i.e., position the plate 300 over the disc space and almost resting on the lamina. Once the positioned is confirmed with the lateral flouro, further confirmation is made with AP fluoro to ensure the trajectories are going to engage the pedicles. The optional, empty center hole 380 (FIG. 69) in the plate is helpful for visualization during imaging.

The method may then include removing the Jamshidi needle stylets when the correct position is achieved. With reference still to FIG. 90, the method may further include inserting k-wires 1010 through the insertion guides and confirming the desired k-wire 1010 placement with fluoroscopy. Next, the method may include removing the insertion guides 100 and 200 from the plate 300 and the k-wires 1010 leaving the plate 300 and k-wires 1010 in place within the patient. Then, the method may include sliding a cannulated facet/pedicle fixation element over the facet/pedicle k-wire, driving the facet/pedicle fixation element into the bone, for example, the facet and pedicle, and confirming the placement with fluoroscopy. The method may also include sliding a cannulated fixation element over the k-wire, driving the pedicle fixation element into the pedicle, and confirming the placement with fluoroscopy. Next, the method may include removing the k-wires and inserting the set screw 700, 800 until the set screw pushes the facet/pedicle and pedicle fixation elements slightly. Finally, the method may include confirming the correct placement of the bone fusion device with fluoroscopy. The above method may be performed by a surgeon by suitably grasping and positioning the insertion guides and plate relative to the patient's vertebrae during the above steps.

Figure 91:
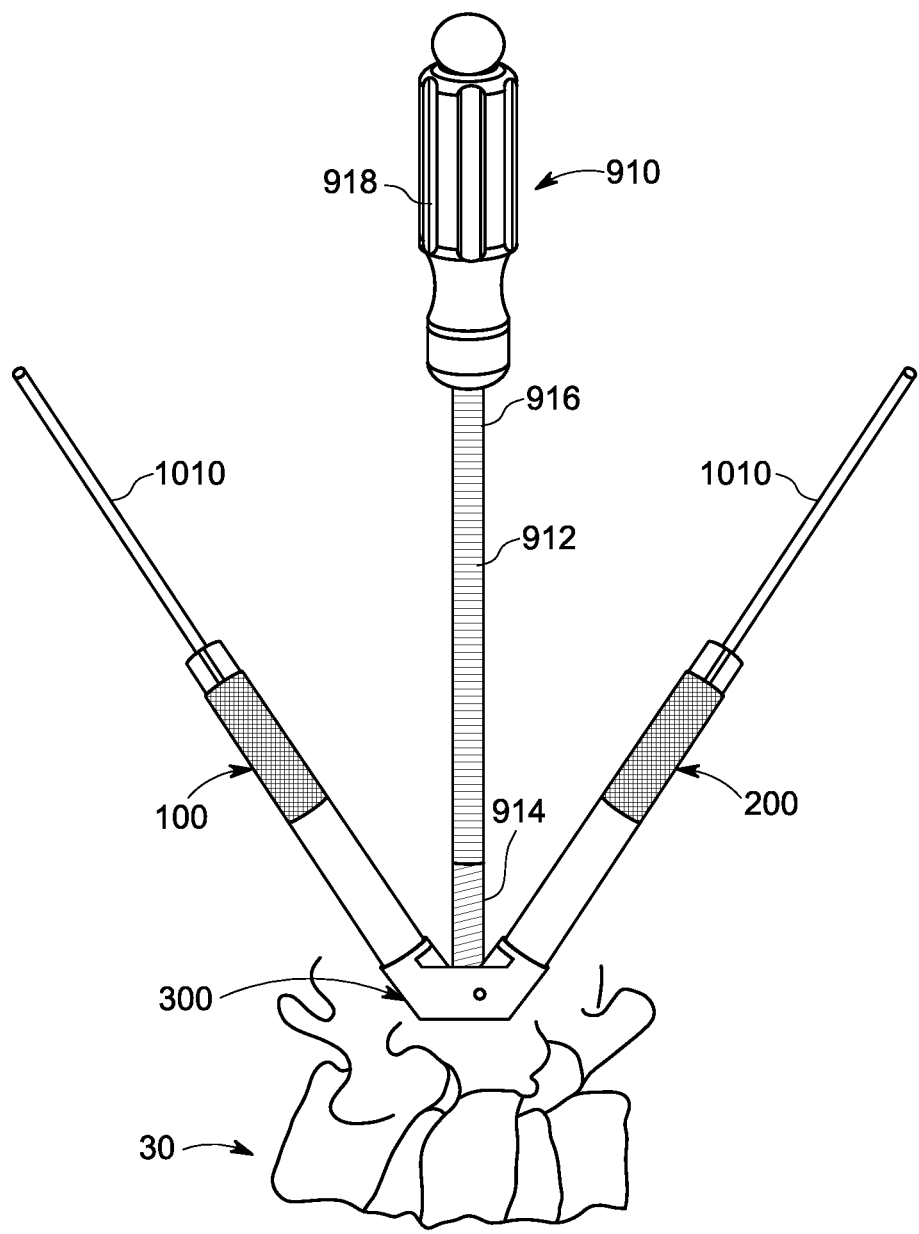
FIG. 91 is a side view of the implant system of FIG. 65 positioned on the vertebrae, according to an embodiment of the present disclosure.

As shown in FIG. 91, a handle member 910 may be operably attached to implant system 10. The handle member 910 may include a rod or shaft 912 with a distal end 914 and a proximal end 916. The distal end 914 may be configured or sized and shaped to engage the plate 300. The proximal end 916 may be configured or sized and shaped to couple to a handle 918. The distal end 914 may be threaded and receivable in an internally threaded opening 380 (FIG. 69) disposed along the top surface 364 between the first channel 372 and the second channel 374. It will be appreciated that in another embodiments, a handle member may have a passageway therethrough that is operable for receiving a docking pin as described above.

Another method of using implant system 10 may include, for example, making a mid-line incision large enough for portions of the pre-assembled plate 300 and the insertions guides 100 and 200 to fit as it is placed along the vertebrae 30. The plate 300 may be coupled to the handle member 910. Next, the method may include placing the implant system 10 and positioning the plate 300 on the appropriate side of the vertebrae 30, as shown in FIG. 91. The method may also include inserting a first Jamshidi needle (not shown) through the first passageway in first insertion guide 100 and confirming the Jamshidi needle placement using fluoroscopy. The method may further include inserting a second Jamshidi needle (not shown) through the second passageway in the second insertion guide 200 and confirming the Jamshidi needle placement using fluoroscopy. Next, the method may include confirming the trajectories of both Jamshidi needles with anteroposterior (AP) and lateral fluoroscopy. Then, the method may include removing the Jamshidi needle stylets when the correct position is achieved. The method may further include inserting k-wires 1010 through the insertion guides 100, 200 and confirming the desired k-wire 1010 placement with fluoroscopy. Next, the method may include removing the insertion guides 100, 200 and disengaging the insertion guides 100, 200 from the k-wires 1010 and the plate 300 leaving the plate 300 and k-wires 1010 in place within the patient. Then, the method may include sliding a cannulated facet/pedicle fixation element over the facet/pedicle k-wire, driving the facet/pedicle fixation element into the bone, for example, the facet and pedicle, and confirming the placement with fluoroscopy. The method may also include sliding a cannulated fixation element over the k-wire, driving the pedicle fixation element into the pedicle, and confirming the placement with fluoroscopy. Next, the method may include removing the k-wires and inserting the set screw 700, 800 (FIG. 77) until the set screw pushes the facet/pedicle and pedicle fixation elements slightly. Finally, the method may include confirming the correct placement of the bone fusion device with fluoroscopy.

Figure 92:
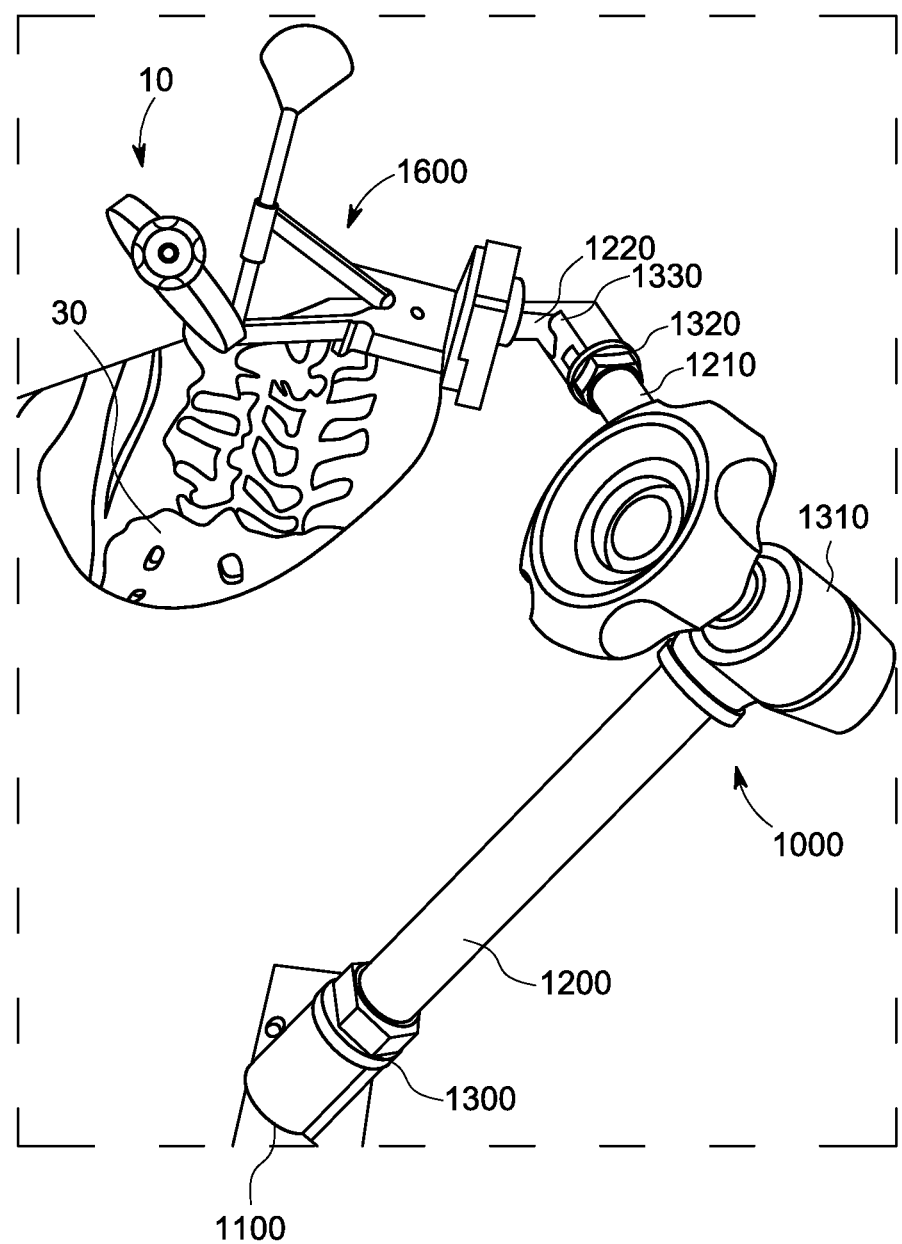
FIGS. 92-93 are perspective views of the implant system of FIG. 65 supported by a support assembly, according to an embodiment of the present disclosure.
Figure 93:
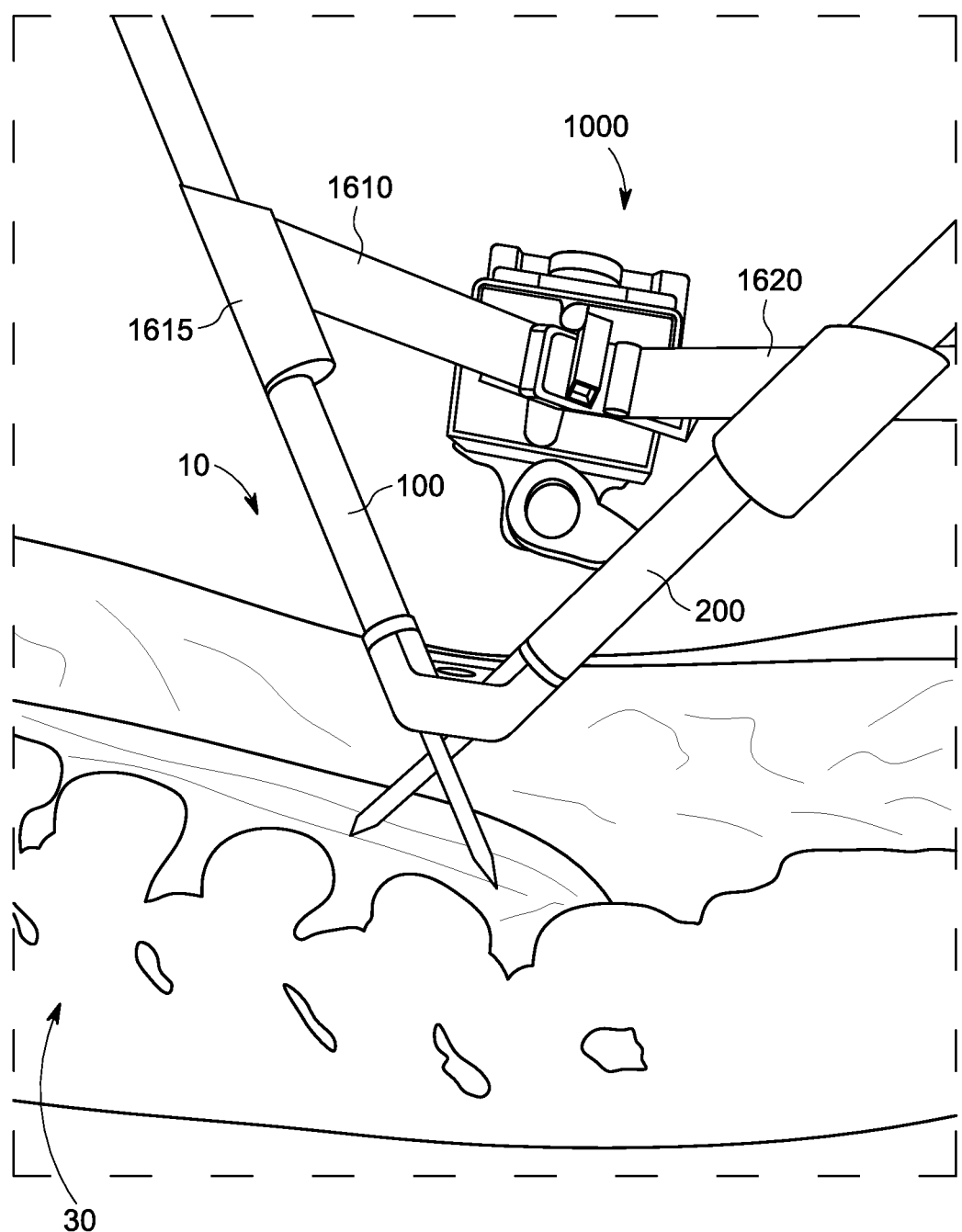

FIGS. 92 and 93 illustrates the implant system 10 supported by a support assembly 1000 in accordance with an embodiment of the present disclosure. The support assembly 1000 may allow a surgeon to operably fixedly position the assembled implant system 10, e.g., the assembled insertion guides 100, 200 (FIG. 93) and plate 300 (FIG. 93), relative to the patient's vertebrae 30 during the above method steps. For example, as best shown in FIG. 92, the support assembly 1000 may include a table mount 1100, a plurality of connection rods 1200, 1210, and 1230, a plurality of movable joints 1300, 1310, 1320, and 1340, and an arm assembly 1600. The table mount may be fixedly secured to a suitable structure fixed relative to a patient. As best shown in FIG. 93, arm assembly 1600 may include a first arm 1610 and a second arm 1620 that are disposed in a fixed orientation relative to each other. Attached to the distal end of the first arm 1610 is a first guide connector 1615. Attached to the distal end of the second arm 1620 is a second guide connector 1625. The guide connectors may have suitable passageways for receiving the first insertion guide 100 and the second insertion guide. The combination of the arm assembly and the assembled implant system 10 form a fixed structure that may be fixedly positioned relative to the patient during the various method steps noted above.

The bone fixation element insertion angle may be, for example, predetermined by the plate 300 and targets the fixation element trajectory via channels in the plate. The fixation elements are implanted in such a fashion as to accomplish a non co-planer, axial divergent fixation element trajectory.

With reference again to FIG. 80, in an embodiment, the first fixation element 500 will be guided by the plate 300 and secured into bone through one of the through hole features or guide holes. The second fixation element 600 is implanted at the opposite angle through one of the guide holes in the plate 300 and may be offset by a distance d1 such as to allow the screws to pass to their desired final position. The compound angle of the fixation elements generally forms a "V" shape, where the fixation elements are at opposing angles and where one fixation element may be medial or lateral to the opposite fixation element by a distance d2 of the diameter of the fixation element. The compound angle may be, for example, approximately 50-85 degrees. The two fixation elements that form the "V" shape are then securely locked into place by the set screws that are tightened until contact is made with each fixation element, thus locking the fixation elements to prevent rotation and axial displacement to secure the entire rigid construct.

The plate 300 itself is not fixed to bone. The plate 300, two fixation elements and set screws form a construct, which construct is fixed to bone via the fixation elements.

The implant guide channels for fixation element delivery are positioned at an optimum insertion based on anatomical and surgical data. The guide channels may be sized to be slightly larger than the outer diameter of the screws. The plates of the present disclosure may be configured as a right or left plate.

The medial aspect of the plate 300 is configured to enable insertion with respect to the anatomy of the spinous process and the radial transition into the lamina.

While the plate 300 as described above for fixation using one facet and one pedicle location, this is an exemplary embodiment. The plate 300 could also be used to fix or span different anatomic locations of bone fracture segments to facilitate a surgical correction, fracture healing or bone fusion. While the descriptions utilized are for screw fixation, the fixation elements could be, for example, smooth rods, splined or fluted rods, pins, or a combination of the elements described above, as would be known by one of ordinary skill in the art.

Figure 94:
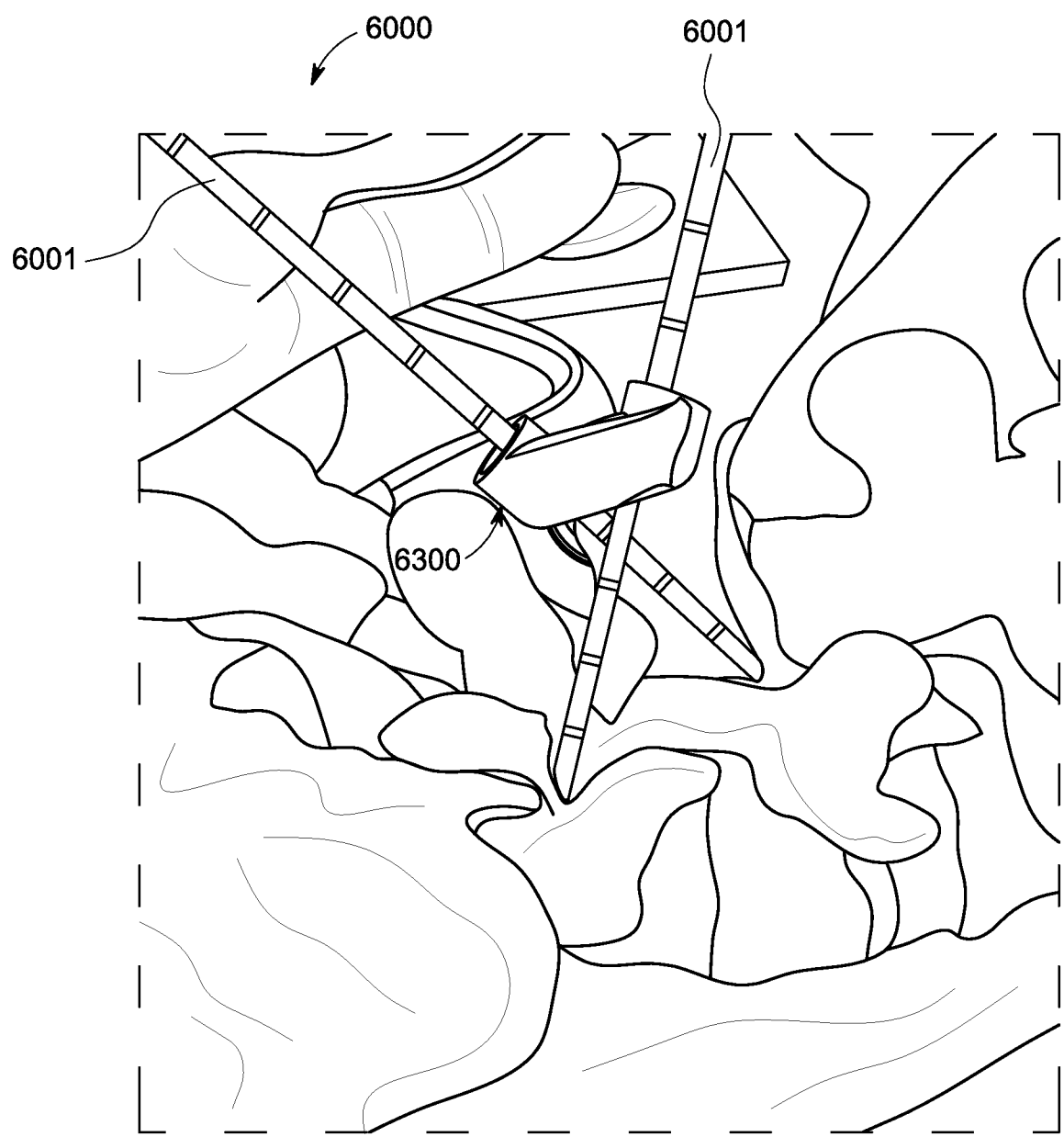
FIG. 94 is a perspective view of a midline incision implant system, according to an embodiment of the present disclosure.

FIG. 94 is a perspective view of a midline incision implant system 6000, according to an embodiment of the present disclosure. For example, a surgeon may be operable using the plate 2300 and a pair of cannulas to align and position the implant system 6000 in a proper location and orientation for use in installing the fixation elements and forming a bone fusion system as described below in connection a surgical method 7000 illustrated in FIG. 95 below. In this illustrated embodiment, such an implant system and method need not employ an insertion guide assembly, and instead rely on the surgeon and the plate for providing the proper location, alignment, and/or orientation of the plate and the fixation element.

Figure 95:
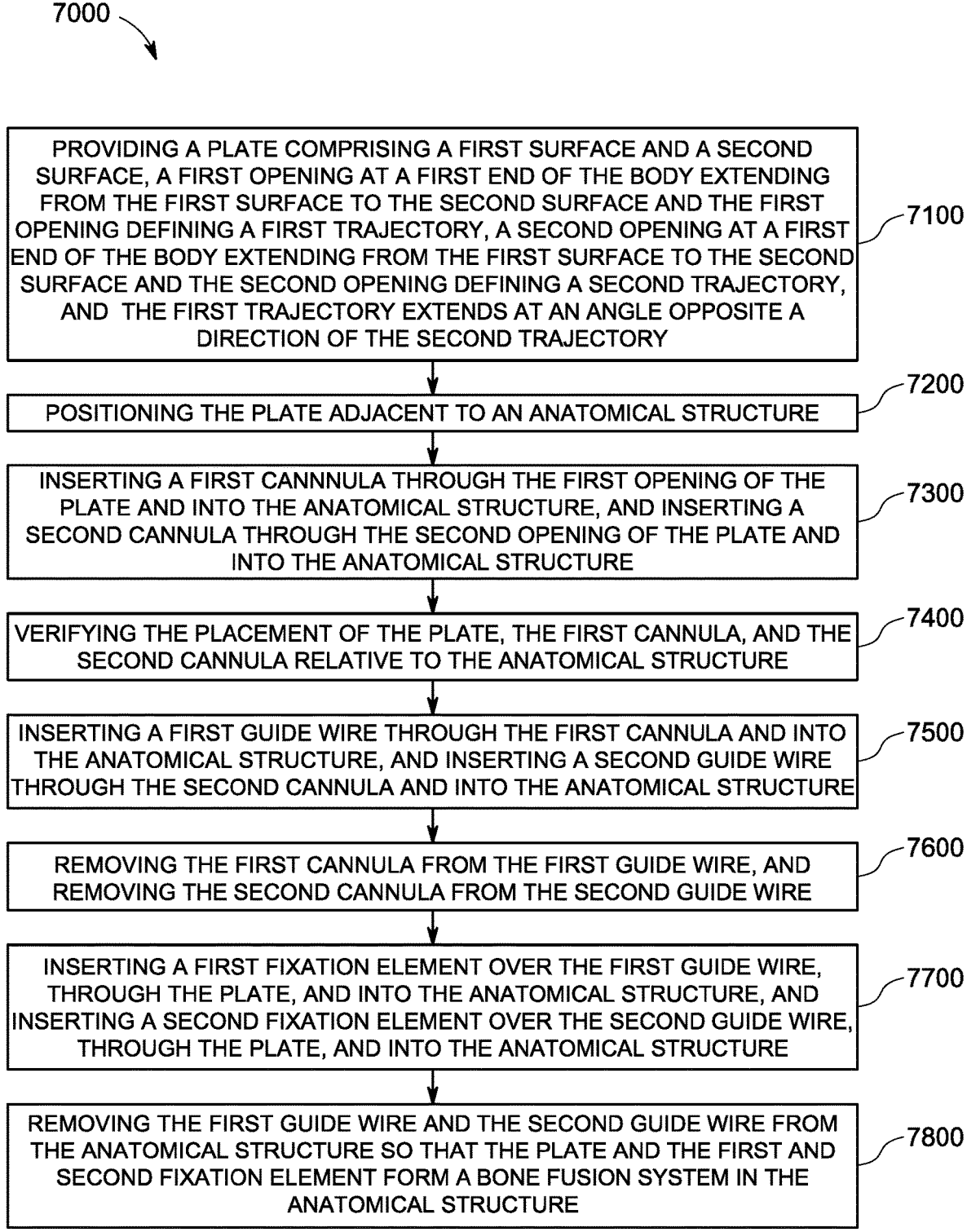
FIG. 95 is a flowchart of a surgical method, according to an embodiment of the present disclosure.

As shown in FIG. 95, therein illustrated is the surgical method 7000, according to an embodiment of the present disclosure. For example, the method 7000 may include at 7100 providing a plate having a first surface and a second surface, a first opening at a first end of the body extending from the first surface to the second surface and the first opening defining a first trajectory, a second opening at a first end of the body extending from the first surface to the second surface and the second opening defining a second trajectory, and the first trajectory extends at an angle opposite a direction of the second trajectory. At 7200, the plate is positioned adjacent to an anatomical structure, and at 7300 a first cannula is inserted through the first opening of the plate and into the anatomical structure, and a second cannula is inserted through the second opening of the plate and into the anatomical structure. At 7400, the placement of the plate, the first cannula, and the second cannula are verified relative to the anatomical structure. At 7500, a first guide wire is inserted through the first cannula and into the anatomical structure, and a second guide wire is inserted through the second cannula and into the anatomical structure. At 7600, the first cannula is removed from the first guide wire, and the second cannula is removed from the second guide wire. At 7700, a first fixation element is inserted over the first guide wire, through the plate, and into the anatomical structure, and a second fixation element is inserted over the second guide wire, through the plate, and into the anatomical structure. At 7800, the first guide wire and the second guide wire are removed from the anatomical structure so that the plate and the first and second fixation element form a bone fusion system in the anatomical structure.

The present disclosure may be operable in connection with an expandable interbody fusion system.

In the various embodiments, the insertion guides may be formed from a biocompatible polymeric or metallic, or combinations thereof. The insertion guides may be a one-piece or monolithic structure. The plate and fixation elements may be formed from a metallic or other suitable material. The insertion guides and the plates may include marking or other indicia for allowing a surgeon to visually align or reposition the insertion guide and/or plate, and/or or using fluoroscopy align or reposition the insertion guide and/or plate.

As may be recognized by those of ordinary skill in the art based on the teachings herein, numerous changes and modifications may be made to the above-described and other embodiments of the present disclosure without departing from the scope of the disclosure. The plates, screws, and other components of the devices and/or systems as disclosed in the specification, including the accompanying abstract and drawings, may be replaced by alternative component(s) or feature(s), such as those disclosed in another embodiment, which serve the same, equivalent or similar purpose as known by those skilled in the art to achieve the same, equivalent or similar results by such alternative component(s) or feature(s) to provide a similar function for the intended purpose. In addition, the devices and systems may include more or fewer components or features than the embodiments as described and illustrated herein. Accordingly, this detailed description of the currently-preferred embodiments is to be taken as illustrative, as opposed to limiting the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has", and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The present disclosure has been described with reference to the preferred embodiments. It will be understood that the architectural and operational embodiments described herein are exemplary of a plurality of possible arrangements to provide the same general features, characteristics, and general system operation. Modifications and alterations will occur to others upon a reading and understanding of the preceding detailed description. It is intended that the present disclosure be construed as including all such modifications and alterations.

We claim:

1. An implant system comprising:
   a plate comprising:
      a first surface opposite a second surface;
      a first channel extending therethrough having a first axis defining a first trajectory, wherein the first channel includes a first opening at the first surface and a second opening at the second surface, and wherein the first opening is offset from the second opening;
      a second channel extending therethrough having a second axis defining a second trajectory, wherein the second channel includes a first opening at the first surface and a second opening at the second surface, and wherein the first opening is offset from the second opening;
      the first trajectory extending at an angle opposite a direction of the second trajectory, wherein the first trajectory overlaps with the second trajectory directly inferior to the second surface;
   a first insertion guide comprising a first passageway therethrough, wherein the first insertion guide comprises a lower portion comprising a stop, an external threaded portion, and a lower cylindrical portion;
   a second insertion guide comprising a second passageway therethrough, wherein the second insertion guide comprising a lower portion comprising a stop, an external threaded portion, and a lower cylindrical portion; and
   wherein a lower end of the first insertion guide being releasably attachable to the plate so that the first passageway is alignable with the first trajectory, and a lower end of the second insertion guide being releasably attachable to the plate so that the second passageway is alignable with the second trajectory, and
   wherein the lower cylindrical portion of the first channel receives the lower cylindrical portion of the first insertion guide and an internal threaded upper portion of the first channel receives the external threaded portion of the first insertion guide, and wherein the lower cylindrical portion of the second channel receives the lower cylindrical portion of the second insertion guide and the internal threaded upper portion of the second channel receives the external threaded portion of the second insertion guide.

2. The implant system of claim 1, wherein the lower end of the first insertion guide is releasably receivable in the first channel of the plate, and the lower end of the second insertion guide is releasably receivable in the second channel of the plate.

3. The implant system of claim 1, wherein the first channel of the plate comprises the internal threaded upper portion, a seat, and a lower cylindrical portion, wherein the seat is positioned between the internal threaded upper portion and the lower cylindrical portion, and the second channel of the plate comprises a threaded upper portion, a seat, and a lower cylindrical portion, wherein the seat is positioned between the internal threaded upper portion and the lower cylindrical portion.

4. The implant system of claim 1, wherein the plate comprises a means for connecting to a handle.

5. The implant system of claim 1, wherein the plate comprises a threaded opening disposed between the first channel and the second channel.

6. The implant system of claim 1, wherein the first trajectory is disposed at a first end of the plate, and the second trajectory is disposed at a second end of the plate.

7. A method for using the implant system of claim 1.

8. An implant system comprising:
   a plate comprising:
      a first surface opposite a second surface;
      a first channel extending therethrough having a first axis defining a first trajectory, wherein the first channel includes a first opening at the first surface and a second opening at the second surface, and wherein the first opening is offset from the second opening;
      a second channel extending therethrough having a second axis defining a second trajectory, wherein the second channel includes a first opening at the first surface and a second opening at the second surface, and wherein the first opening is offset from the second opening;
      the first trajectory extending at an angle opposite a direction of the second trajectory, wherein the first trajectory overlaps with the second trajectory directly inferior to the second surface;
   a first insertion guide comprising a first passageway therethrough;
   a second insertion guide comprising a second passageway therethrough; and
   wherein a lower end of the first insertion guide being releasably attachable to the plate so that the first passageway is alignable with the first trajectory, and a lower end of the second insertion guide being releasably attachable to the plate so that the second passageway is alignable with the second trajectory, and
   wherein the plate has a polygonal shape.

9. A surgical method comprising:
   providing a plate the plate comprising:
      a body comprising:
         a first surface and a second surface, wherein the second surface is a bone contacting surface;
         a first opening at a first end of the body extending from the first surface to the second surface;
         a second opening at a second end of the body extending from the first surface to the second surface;
         a third opening positioned between the first opening and the second opening and extending from the first surface to the second surface;
         the first surface defining a first boss extending around at least a portion of the first opening and wherein the first boss extends away from at least a portion of the first surface; and
         the first surface defining a second boss extending around at least a portion of the second opening and wherein the second boss extends away from at least a portion of the first surface;
   positioning the plate adjacent to an anatomical structure of a spine;
   inserting a first elongated member through the first opening of the plate and into a first pedicle of the spine, wherein the first elongated member comprises a first cannula;
   inserting a second elongated member through the second opening of the plate and into at least one of a facet or a second pedicle of the spine, wherein the second elongated member comprises a second cannula;

verifying the placement of the plate, the first elongated member, and the second elongated member relative to the anatomical structure;

inserting a first fixation element through the plate and into first pedicle;

inserting a second fixation element through the plate and into the at least one facet or second pedicle; and removing the first elongated member and the second elongated member from the first pedicle and the at least one facet or second pedicle so that the plate and the first fixation element and the second fixation element form a bone fusion system in the spine.

10. The surgical method of claim 9, further comprising inserting a first cannula through the first opening in the plate and into the first pedicle, and wherein the inserting the first elongated member comprises inserting the first elongated member through the first cannula, and further comprising inserting a second cannula through the second opening in the plate and into the at least one facet or second pedicle, and wherein the inserting the second elongated member comprise inserting the second elongated member through the second cannula.

11. The surgical method of claim 10, wherein the inserting the first fixation element comprises inserting the first fixation element over the first elongated member, and the inserting the second fixation element comprises inserting the second fixation element over the second elongated member.

12. The surgical method of claim 9, wherein the fixation elements form a V-shape configuration in the bone fusion system.

13. A surgical method comprising:
 providing a plate, the plate comprising:
  a body comprising:
   a first surface and a second surface, wherein the second surface is a bone contacting surface;
   a first opening at a first end of the body extending from the first surface to the second surface;
   a second opening at a second end of the body extending from the first surface to the second surface;
   a third opening positioned between the first opening and the second opening and extending from the first surface to the second surface;
   the first surface defining a first boss extending around at least a portion of the first opening and wherein the first boss extends away from at least a portion of the first surface; and
   the first surface defining a second boss extending around at least a portion of the second opening and wherein the second boss extends away from at least a portion of the first surface;
 positioning the plate adjacent to an anatomical structure of a spine;
 inserting a first elongated member through the first opening of the plate and into a first pedicle of the spine, wherein the first elongated member comprises a first guide wire;
 inserting a second elongated member through the second opening of the plate and into at least one of a facet or a second pedicle of the spine, wherein the second elongated member comprises a second guide wire;
 verifying the placement of the plate, the first elongated member, and the second elongated member relative to the anatomical structure;
 inserting a first fixation element through the plate and into the first pedicle;
 inserting a second fixation element through the plate and into the at least one facet or second pedicle; and
 removing the first elongated member and the second elongated member from the first pedicle and the at least one facet or second pedicle so that the plate and the first fixation element and the second fixation element form a bone fusion system in the spine.

* * * * *